United States Patent [19]

Murakami et al.

[11] Patent Number: 4,670,851
[45] Date of Patent: Jun. 2, 1987

[54] VECTOR QUANTIZER

[75] Inventors: Tokumichi Murakami; Kohtaro Asai; Atsushi Itoh, all of Kanagawa, Japan

[73] Assignee: Mitsubishi Denki Kabushiki Kaisha, Tokyo, Japan

[21] Appl. No.: 663,436

[22] Filed: Oct. 22, 1984

[30] Foreign Application Priority Data

| Jan. 9, 1984 | [JP] | Japan | 59-1669 |
| Jan. 18, 1984 | [JP] | Japan | 59-6473 |
| Jan. 30, 1984 | [JP] | Japan | 59-14606 |
| Jan. 30, 1984 | [JP] | Japan | 59-14607 |
| Feb. 2, 1984 | [JP] | Japan | 59-17281 |
| Feb. 23, 1984 | [JP] | Japan | 59-32918 |
| Mar. 15, 1984 | [JP] | Japan | 59-49901 |

[51] Int. Cl.$^4$ .................. G06F 15/40; H04N 7/12
[52] U.S. Cl. ............... 364/518; 340/347 AD; 340/733; 358/12; 358/136
[58] Field of Search .......... 364/518, 745, 807; 358/21 R, 12, 133, 136; 340/732, 733, 347 AD, 347 M

[56] References Cited

U.S. PATENT DOCUMENTS

| 4,125,861 | 11/1978 | Mounts et al. | 358/133 |
| 4,375,650 | 3/1983 | Tiemann | 358/133 |
| 4,546,386 | 10/1985 | Matsumoto et al. | 358/136 |
| 4,558,350 | 12/1985 | Murakami | 358/12 |
| 4,560,977 | 12/1985 | Murakami et al. | 364/807 |
| 4,575,756 | 3/1986 | Furukawa | 358/136 |
| 4,591,908 | 5/1986 | Hirano | 358/136 |

FOREIGN PATENT DOCUMENTS 2097858  1/1984  European Pat. Off. .
59-34781  6/1984  Japan .
2003001  2/1979  United Kingdom .

OTHER PUBLICATIONS

IEEE Trans. Communication, Jan. 1980 (V28, N1), "An Algorithm for Vector Quantizer Design", Y. Linde et al; pp. 84–95.
IEEE Communications, Dec. 1983, "Vector Quantization: A Pattern Matching Technique", A. Gersho et al, pp. 15–21.
Proc. Int'l. Conf. on A.S.S.P., 1982, "Multiple Stage Vector Quantization for Speech Coding", B. Juang et al, pp. 597–600.
IEEE Trans. ASSP, Oct. 1980 (V28,N5), "Speech Coding Based Upon Vector Quantization", A. Buzo et al, pp. 562–574.
IEEE Trans. Info. Theory, Mar. 1982 (V28,N2), "On the Structure of Vector Quantizers", A. Gersho, pp. 157–166.

Primary Examiner—Gary Chin
Assistant Examiner—Kevin J. Teska
Attorney, Agent, or Firm—Bernard, Rothwell & Brown

[57] ABSTRACT

A vector quantizer for quantizing the vector of image and audio information, the vector quantizer being capable of efficiently encoding a compensation predictive error signal at a reduced bit rate by performing adaptive vector quantization after judging the significance of the compensation predictive error signal in blocks, and capable of movement compensation inter-frame vector encoding in which variable-length encoding of movement vector is facilitated and information production control is achieved easily.

7 Claims, 59 Drawing Figures

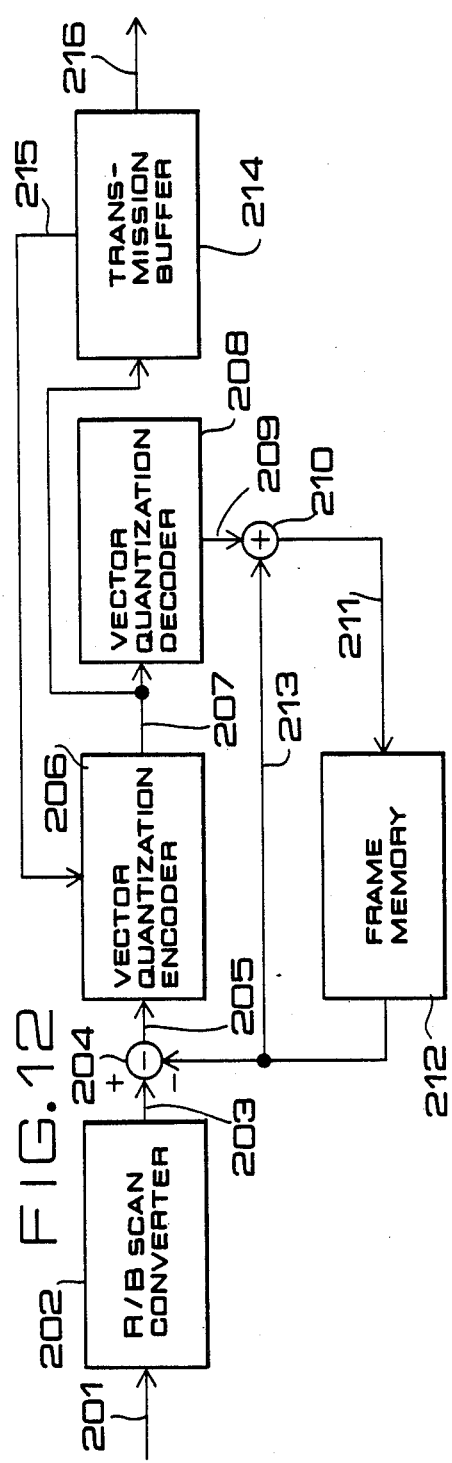
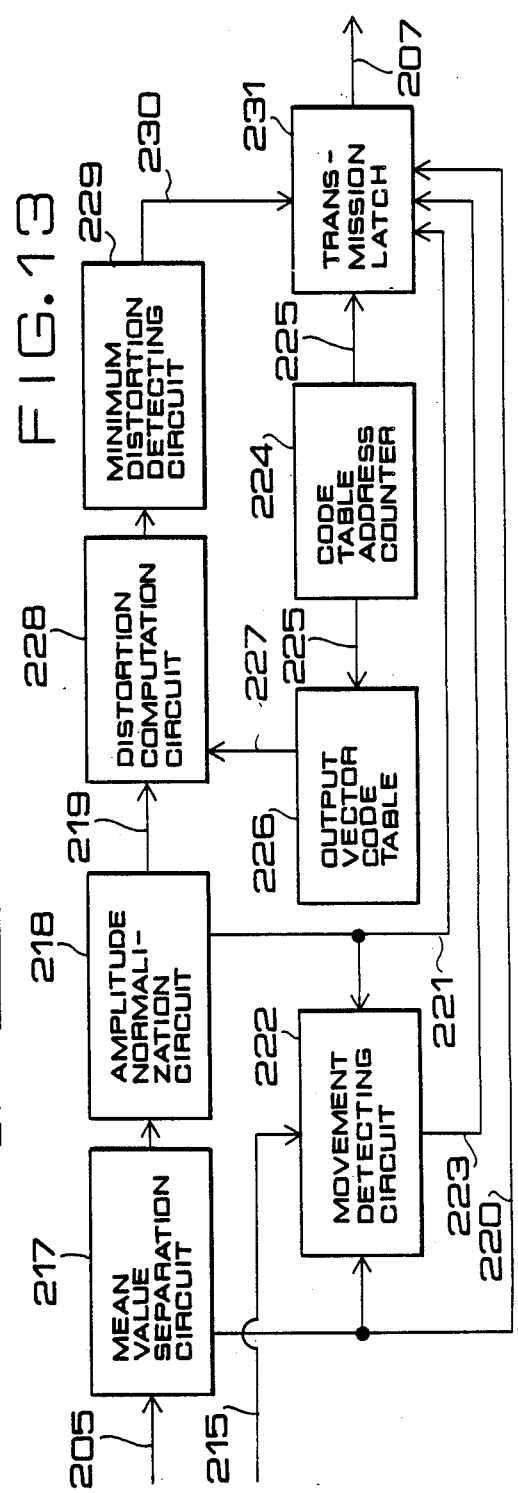

INPUT VECTOR (K=16)   INPUT SUBVECTOR (N=8)

OUTPUT VECTOR (K=16)   OUTPUT SUBVECTOR (N=8)

FIG. 32   ⟶ m
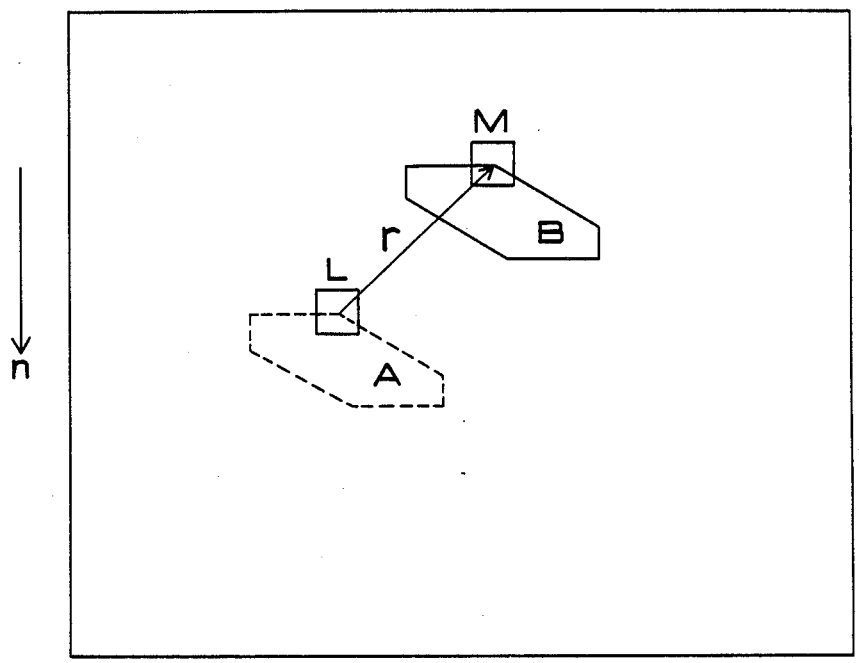
FIG. 33
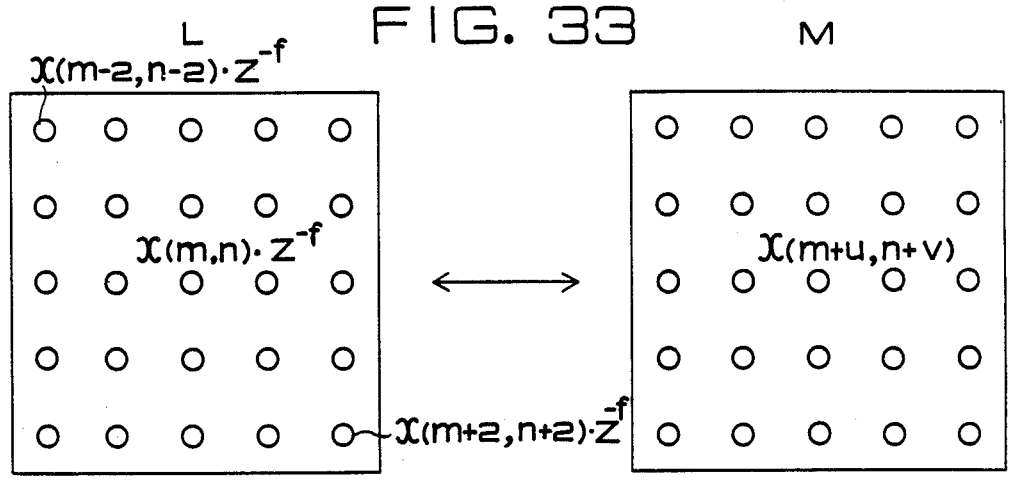

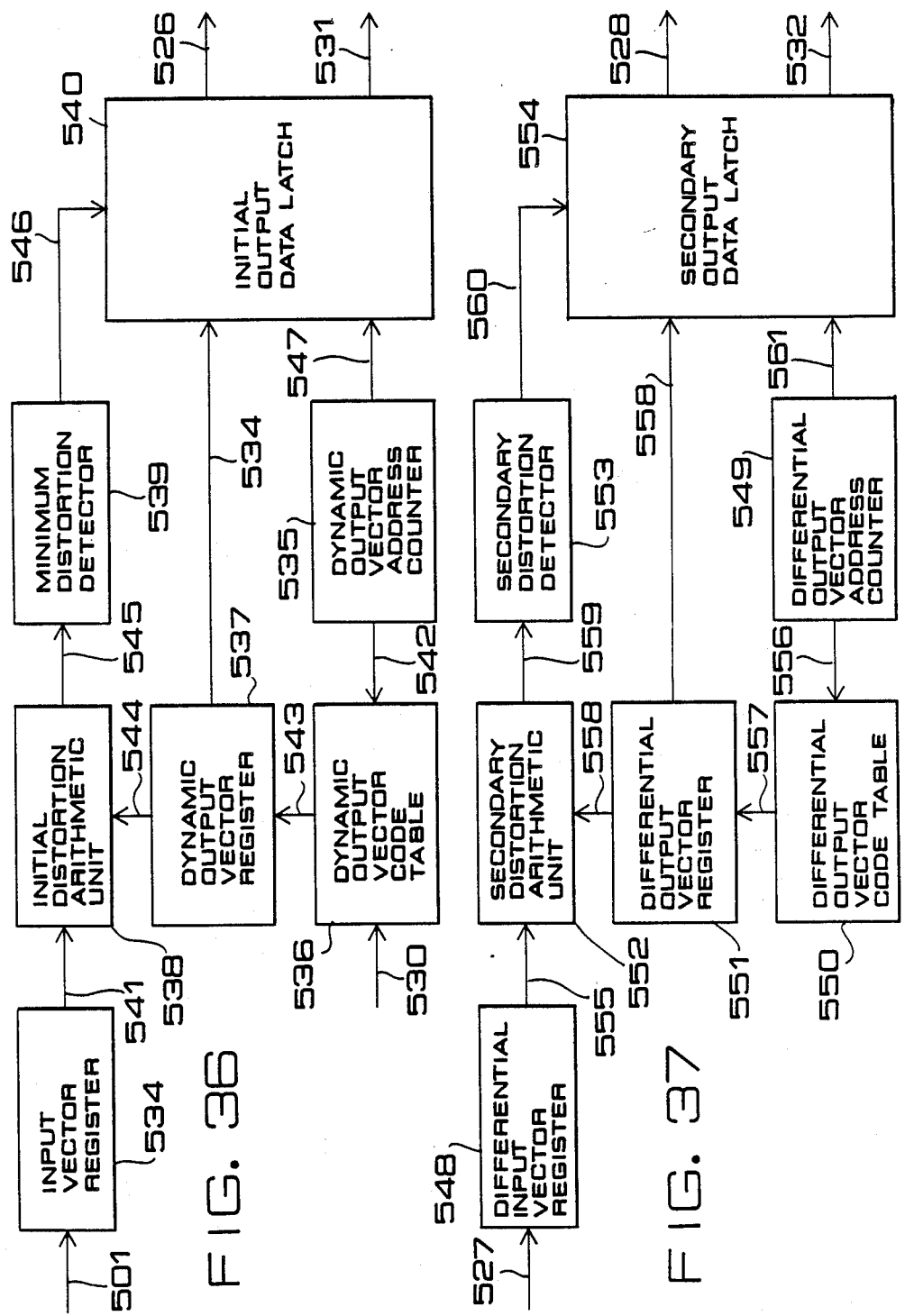

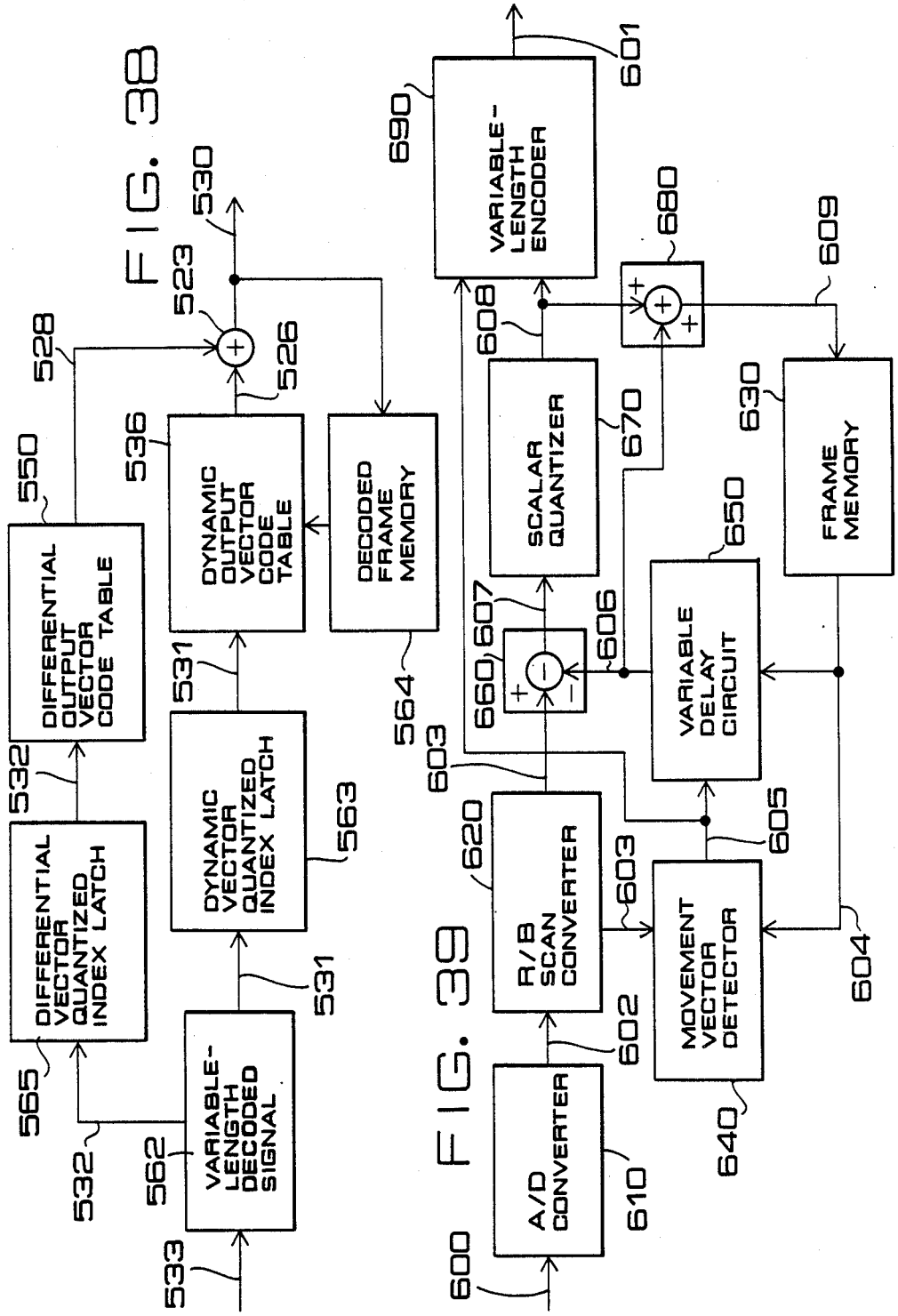

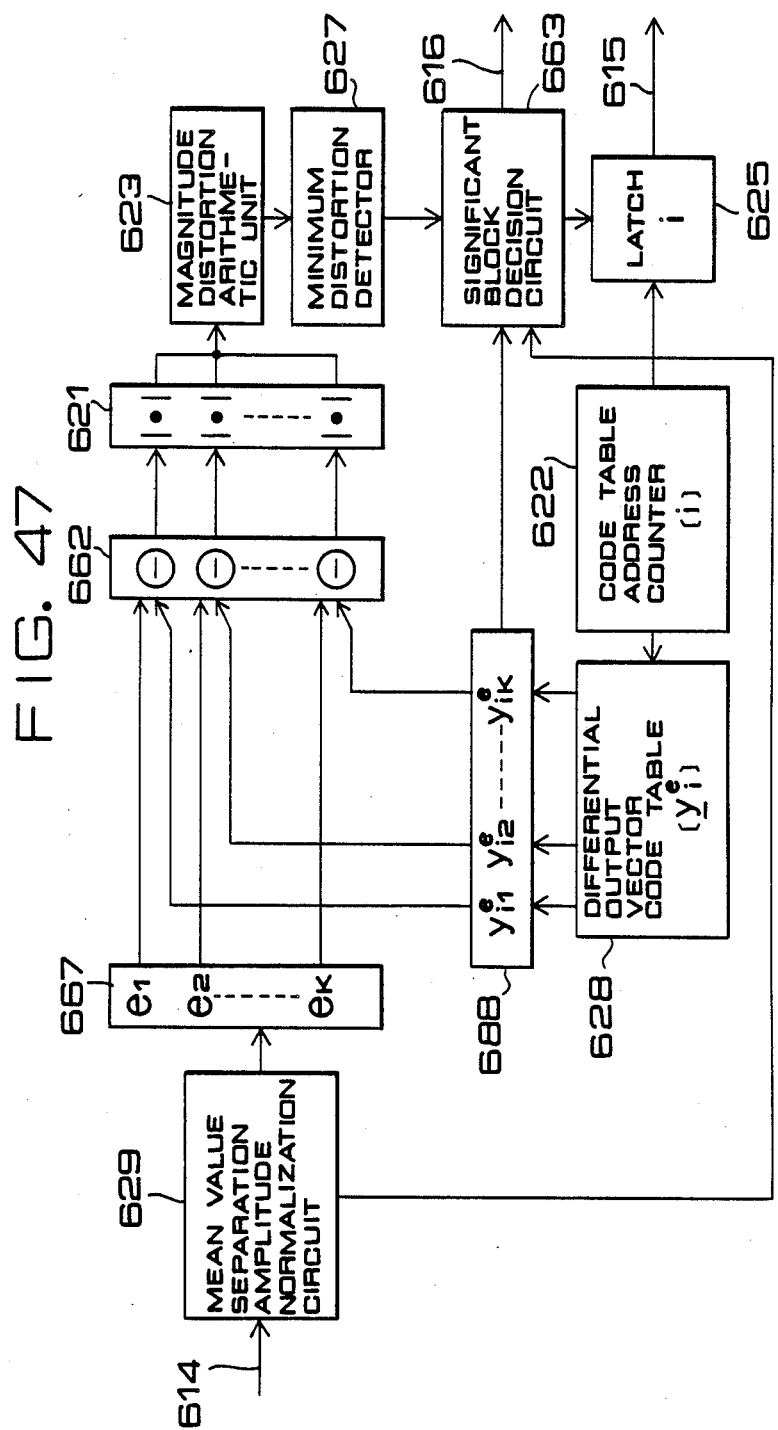

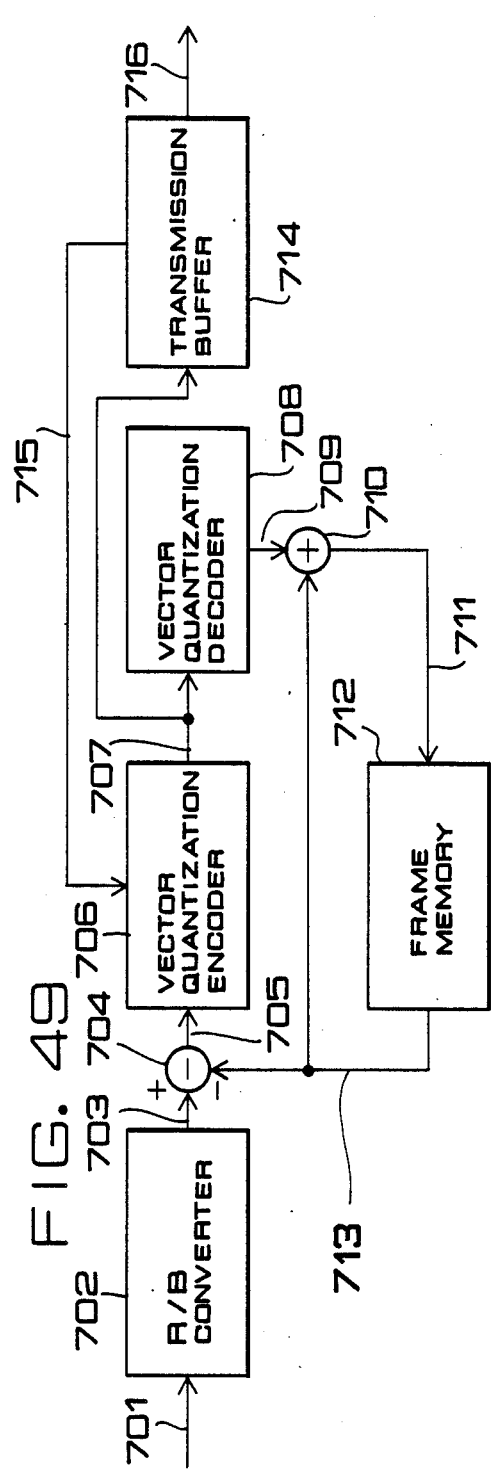
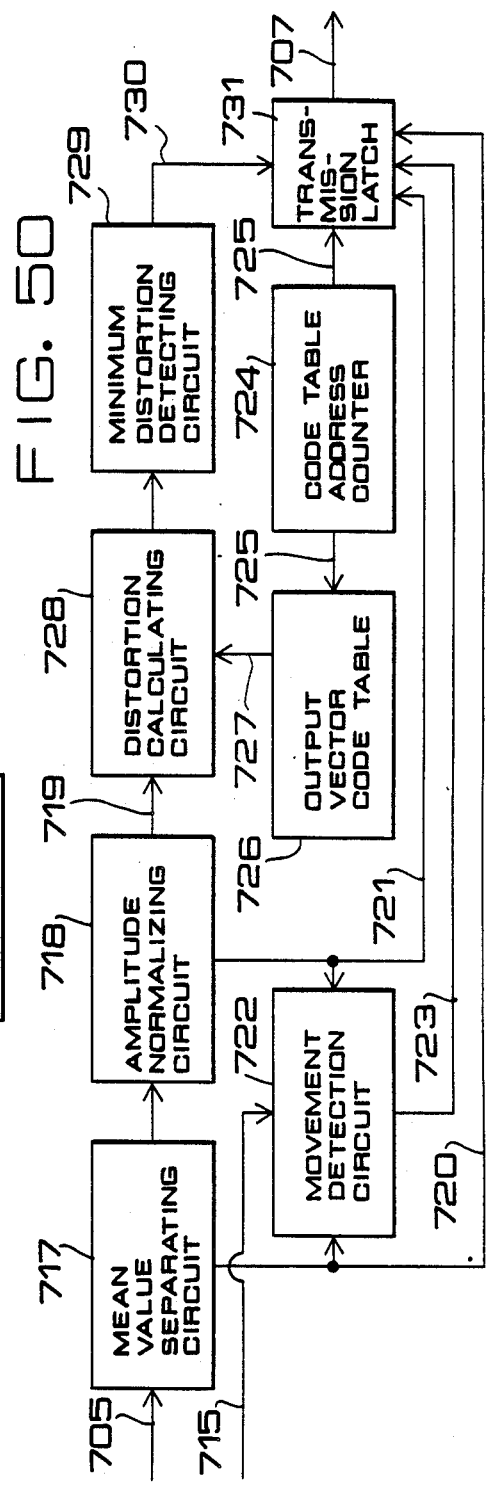

VECTOR QUANTIZER

BACKGROUND OF THE INVENTION

1. Field of the Invention

The present invention relates to a vector quantizer for quantizing the vector of image information and audio information.

2. Description of the Prior Art

The prior art relating to such a vector quantizer is described in literatures such as: Y. Linde, A. Buzo and R. M. Gray, "An Algorithm for Vector Quantizer", IEEE Trans., Com-28, pp. 84-95 (1980); A. Gersho, "On the Structure of Vector Quantizers", IEEE Trans., IT-82, pp. 157-166 (1982); A. Buzo and A. H. Gray, Jr, "Speech Coding Based Upon Vector Quantization", IEEE Trans., ASSP-28 (1980); B. H. Juang and A. H. Gray, Jr., "Multiple Stage Quantization for Speech Coding", Proc. Intl. Conf. on A.S.S.P., pp. 597-600, Paris (1982); and A. Gersho and V. Cuperman, "Vector Quantization: A Pattern Matching Technique for Speech Coding", IEEE, COMMUNICATION MAGAZINE, pp. 15-21, Dec. (1983).

A vector quantizer as shown in FIG. 3, which will be described later, is known in addition to those vector quantizers of the prior art. The principle of the vector quantizer will be described prior to the description of the vector quantizer of FIG. 3. Referring to FIG. 1, assuming that an object has moved on the screen during the period from a frame No. $f-1$ to a frame No. $f$ from a position A to a position B, then a block $S^f(R)$ including a plurality of the lattice samples of an image signal around a position vector R in the frame No. $f$ becomes approximately equal to the block $S^{f-1}(R-r)$ of the image signal at a position determined by subtracting a movement vector r from a position vector R in the frame No. $f-1$. As shown in FIG. 2, when the position vector $R=(m, n)$ and the movement vector $r=(u, v)$, $S^f(R) \approx S^{f-1}(R-r)$. Suppose the image signal at $R=(m, n)$ is $S(M, n)$ and $S^f(R)=[S(m-2, n-2), \ldots, S(m, n), \ldots, S(m+2, n+2)]$, the degree of analogy $L(n, v)$ between $S^f(R)$ and $S^{f-1}(R-r)$ is defined as the block unit matching scale of $5 \times 5$ picture element as follows;

$$L(u,v) = \sum_g \sum_h |S^f(m+g, n+h) - S^{f-1}(m+g-u, n+h-v)|$$

In this state, the movement vector r is expressed by $$r = [u, v \mid \min_{u,v} L(u,v)]$$

That is, the degree of analogy $L(u, v)$ of $S^f(R)$ and $S^{f-1}(R-r)$ is expected to be minimized by block matching. Therefore, in introducing movement compensation into inter-frame prediction coding, the use of a block which minimizes $L(u, v)$, extracted from image signal blocks of the frame No. $f-1$, as a prediction signal in giving the block $S^f(R)$ of the image signal of the position of R in the frame No. $f$ to an inter-frame prediction encoder, the power of prediction error signal will be reduced to the least and encoding efficiency is improved.

Referring to FIG. 3 showing an example of the constitution of a conventional vector quantizer of this kind, there are shown an A/D converter 1, a raster/block scan converter 2, a frame memory 3, a movement vector detector 4, a variable delay circuit 5, a subtractor 6, a scalar quantizer 7, an adder 8 and a variable-length encoder 9.

The manner of operation of this vector quantizer will be described hereinafter. First the A/D converter 1 converts an analog picture input signal 101 into the corresponding digital signal and gives a digital picture signal sequence 102 according to the sequence of raster scanning. The output procedure of the raster scan digital picture signal sequence 102 on the time series of the picture signal is converted into block scanning by the raster/block scan converter 2, and thereby the digital picture signal sequence is converted into a block scan picture input signal 103 arranged sequentially in lattice block units (the interior of the block is raster scanning) from the top to the bottom and from the left to the right on the screen. A regenerative picture signal 104 of one frame before regenerated according to interframe DPCM loop is read from the frame memory 3. The movement vector detector 4 executes the block matching of the present block scan picture input signal 103, the regenerative picture signal 104 of one frame before and the picture signal and gives the movement vector $r=(u, v)$ of the picture signal 104 of one frame before which minimizes the degree of analogy. The movement vectors (u, v) correspond to the horizontal and the vertical shifts of the picture element of the block of the regenerative picture signal 104 of one frame before. On the basis of the movement vector, the variable delay circuit 5 block-shifts the one-frame preceding regenerative picture signal 104 by the movement vector and gives a predictive picture signal 106 which is the closest to the present block scan picture input signal 103. The subtractor 6 calculates the differential between the block scan picture input signal 103 and the predictive picture signal 106 and gives a predictive error picture signal 107 to the scalar quantizer 7. The scalar quantizer 7 converts the predictive error picture signal 107 into a predictive error quantization picture signal 108 reduced in quantization level at picture element unit. The adder 8 adds the predictive error quantization picture signal 108 and the predictive picture signal 106 and gives a regenerative picture signal 109 including scalar quantization error to the frame memory 3. The frame memory performs delaying operation to delay the present regenerative picture signal 109 by one frame. In the movement compensation interframe DPCM loop, supposing that the picture input signal 103 is $S^f(m, n)$, the predictive picture signal 106 is $P^f(m, n)$, the predictive error signal 107 is $e^f(m, n)$, scalar quantization noise is $Q_s^f(m, n)$, the predictive error quantization signal 108 is $\hat{S}^f(m, n)$ and the one-frame preceding regenerative picture signal 104 is $\hat{S}^{f-1}(m, n)$, then $e^f(m, n) = S^f(m, n) - P^f(m, n),$ $\hat{e}^f(m, n) = e^f(m, n) + Q_s^f(m, n),$ $\hat{S}^f(m, n) = P^f(m, n) + \hat{e}^f(m, n) = S^f(m, n) + Q_s^f(m, n),$
and $\hat{S}^{f-1}(m, n) = \hat{S}^f(m, n) \cdot Z^{-f}.$ where $Z^{-f}$ denotes delay corresponding to one frame.

$P^f(m, n)$ is expressed through movement compensation on the basis of $\hat{S}^{f-1}(m, n)$ by the following formula:

$$P'(m, n) = \hat{S}^{f-1}(m-u, n-v).$$

FIG. 5 shows an example of the constitution of the movement vector detector 4 for carrying out movement compensation.

Referring to FIG. 5, there are shown an analogy degree computation circuit 10, a movement region line memory 11, a line memory control circuit 12, an analogy degree comparator 13 and a movement vector latch 14.

The movement vector detector 4 gives $S^f(R)$ produced by blocking a plurality of the sequences of the present picture input signal 103 to the analogy degree computation circuit 10. At this moment, the lines of the one-frame preceding regenerative picture signal 104 stored in the frame memory 3 corresponding to the tracking range of the movement region of $S^f(R)$ are stored in the movement region line memory 11. The line memory control circuit 12 sends sequentially the blocks adjacent to a plurality of blocks $S^{f-1}(R+r)$ of the one-frame preceding regenerative image signal 104 to the analogy degree computation circuit 10. The analogy degree computation circuit 10 computes the analogy degree L(u, v) of the blocks in the neighborhood of $S^f(R)$ and $S^{f-1}(R-r)$ and the analogy degree comparator 13 determines the minimum analogy degree min L(u, v). Since u and v correspond to the horizontal and the vertical address shifts of blocks in the movement region line memory 11 respectively, the analogy degree comparator 13 gives a movement detection strobing signal 111 to the movement vector latch 14 when the analogy degree is minimized, to take in a movement vector address 112. The movement vector latch 14 sends the displacement r of $S^{f-1}(R-r)$ relative to $S^f(R)$ minimizing the analogy degree L(u, v) as a movement vector 105 to the variable delay circuit 5 and the variable-length encoder 9 of FIG. 3.

The variable-length encoder 9 of FIG. 3 processes the movement vector 105 and the predictive error quantization signal 108 through variable-length encoding to reduce the amount of information of the picture signal. The variable-length encoding enables the transmission of the movement compensation inter-frame encoding output 110 at a low bit rate.

Since the conventional movement compensation inter-frame encoder is constituted as described hereinbefore, the movement compensation operation is performed for every block and the inter-frame DPCM operation is performed for every picture element. Accordingly, the identification between the minute variation of the screen and noise is impossible and the variable-length encoding of the movement vector and the predictive error quantization signal is difficult. Furthermore, since the control of the variation of the quantity of produced information resulting from the variation of the movement scalar is difficult, a large loss is inevitable when transmission is carried out through a transmission channel of a fixed transmission capacity. Still further, encoding the predictive error quantization signal for every picture element is inefficient. Since the movement compensation system is liable to be affected by transmission channel error, the frame memory needs to be reset or the transmission repeated when transmission channel error occurs, which requires long resetting time.

SUMMARY OF THE INVENTION

An object of the present invention is to provide a vector quantizer capable of efficiently encoding a compensation predictive error signal at a reduced bit rate by performing adaptive vector quantization after judging the significance of the compensation predictive error signal in blocks, and capable of movement compensation inter-frame vector encoding in which variable-length encoding of movement vector is facilitated and information production control is achieved easily.

Further object of the present invention is to provide a vector quantizer capable of preventing the accumulation of vector quantization errors by inserting a low pass filter in the output of a frame memory and changing over the mode to vector-quantize the blocks themselves of a picture signal sequence instead of the blocks of a predictive error signal when the correlation between successive frames is very low, and capable of restricting the sudden increase of vector quantization error even when the frame changes greatly.

Still further object of the present invention is to provide a vector quantizer capable of improving dynamic picture encoding efficiency by processing an output vector constituted from the picture signal of the preceding frame by the use of the correlation between frames through dynamic vector quantization and processing the residual error signal further through fixed vector quantization.

Still further object of the present invention is to provide a vector quantizer having, in cascaded connection, a dynamic vector quantizer for quantizing dynamic vectors and the like and a differential vector quantizer each being constituted to perform coding by the use of a set of output vectors having the least distortion, and thereby capable of encoding periodic signals such as picture signals extremely efficiently.

Further object of the present invention is to provide a dynamic multi-stage vector quantizer capable of eliminating the redundant component between frames by providing a dynamic preliminary vector quantizer to perform vector quantization while updating a code table in blocks and capable of achieving highly efficient encoding at a further reduced bit rate through the average value separation and the amplitude normalization vector quantization of residual signals in blocks by a fixed last vector quantizer.

Still further object of the present invention is to provide a sequential approximation vector quantizer employing tree search vector quantization in the vector quantization segment and capable of preventing an unnatural regenerated picture when the picture changes suddenly even if the feedback control of the amount of data is performed, through sequential approximation at each stage, namely, through the variable control of the number of stages.

BRIEF DESCRIPTION OF THE DRAWINGS

FIG. 12 is a block diagram showing the constitution of the encoder of an inter-frame vector encoder for explaining the basic principle of another embodiment of the present invention;

FIG. 13 is a block diagram showing the constitution of the vector quantization encoder of FIG. 12;

FIG. 32 is a representation for explaining the principle of the front movement vector encoder of the vector quantization encoder of FIG. 31;

FIG. 33 is a representation explaining the inter-frame matching between the preceding frame and the present frame in movement vector coding;

FIG. 36 is a block diagram showing an exemplary constitution of the front vector quantization encoder of a vector quantization encoder according to the present invention;

FIG. 37 is a block diagram showing the constitution of the differential vector quantization encoder of FIG. 31;

FIG. 38 is a block diagram showing the constitution of a dynamc multistage vector quantization decoder embodying the present invention;

FIG. 39 is a block diagram showing an example of a movement compensation inter-frame encoder;

FIG. 47 is a block diagram showing the constitution of the fixed back vector quantizer of FIG. 42;

FIG. 49 is a block diagram showing the constitution of the encoder of an inter-frame vector quantizer;

FIG. 50 is a block diagram showing the constitution of the vector quantization encoder of FIG. 49;

DESCRIPTION OF THE PREFERRED EMBODIMENTS

Figure 6:
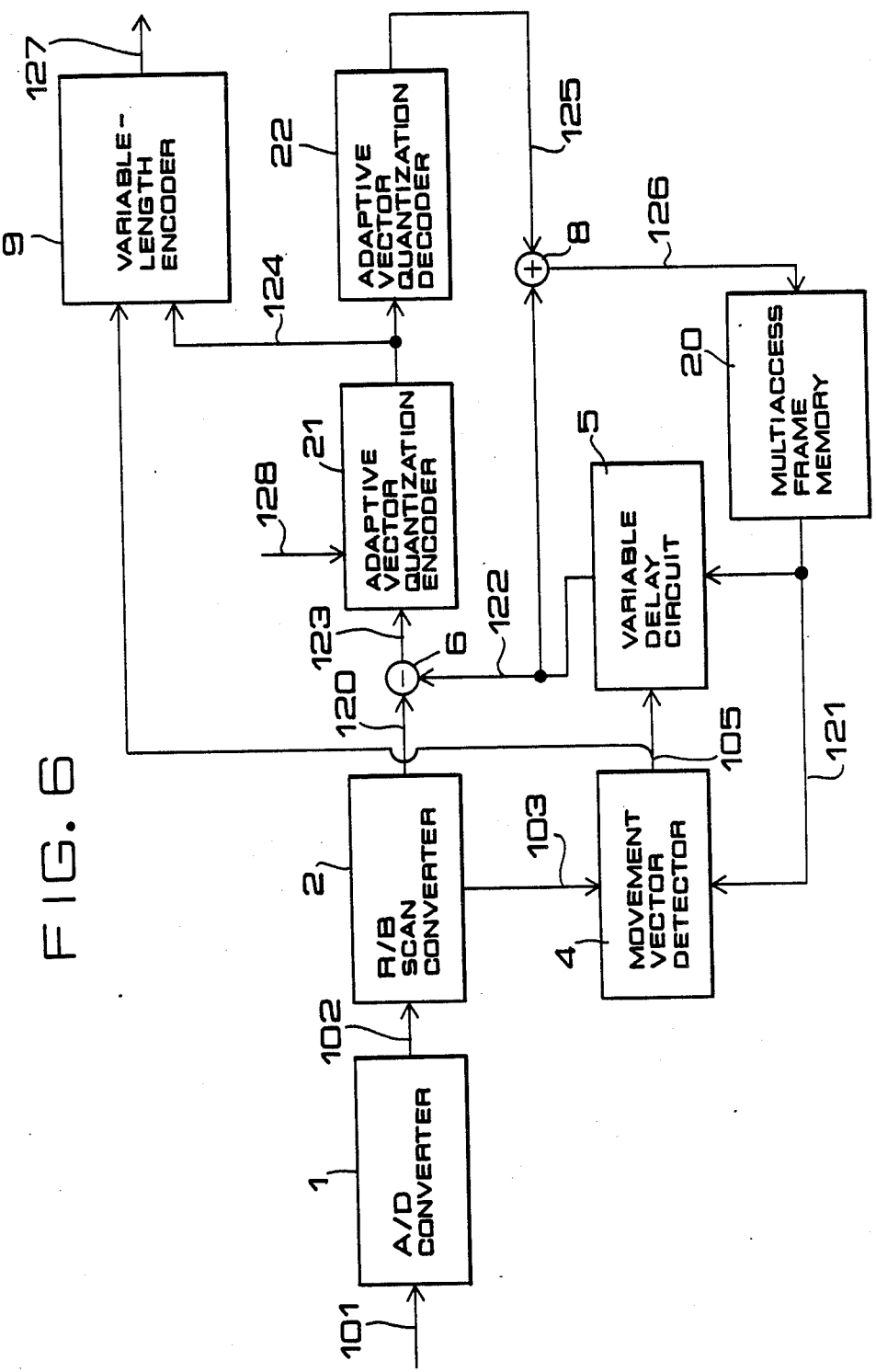
FIG. 6 is a block diagram showing the constitution of a vector encoder, in a preferred embodiment, according to the present invention.

FIG. 6 is a block diagram showing the constitution of an embodiment of the vector encoder according to the present invention.

Figure 1:
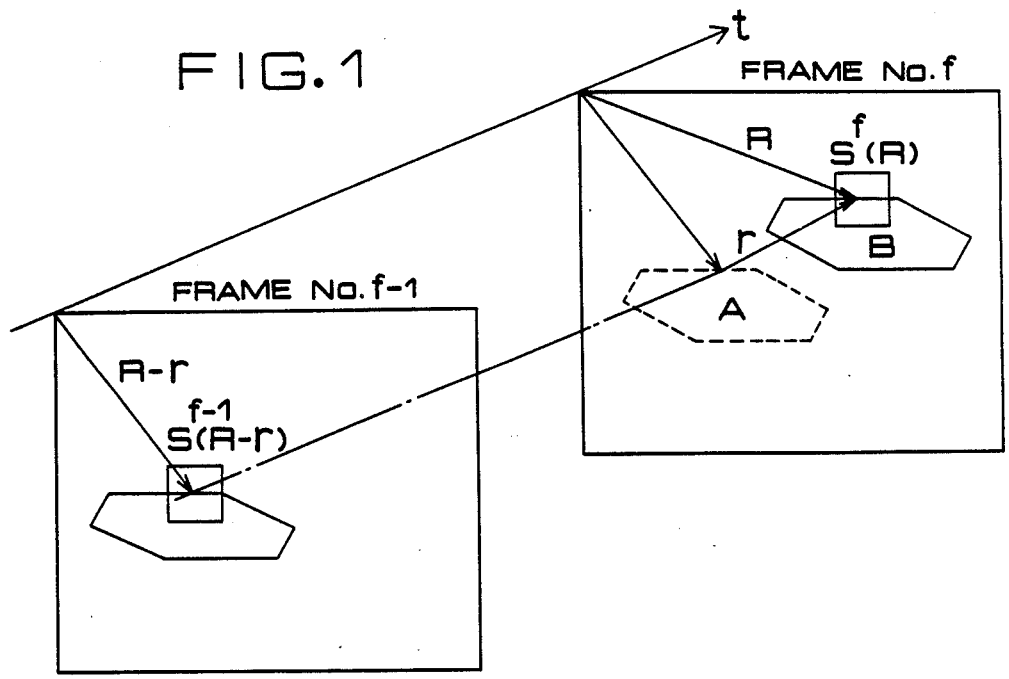
FIG. 1 is an explanatory pictorial view for facilitating the understanding of the definition of the movement of picture signals between frames by a movement vector.
Figure 2:
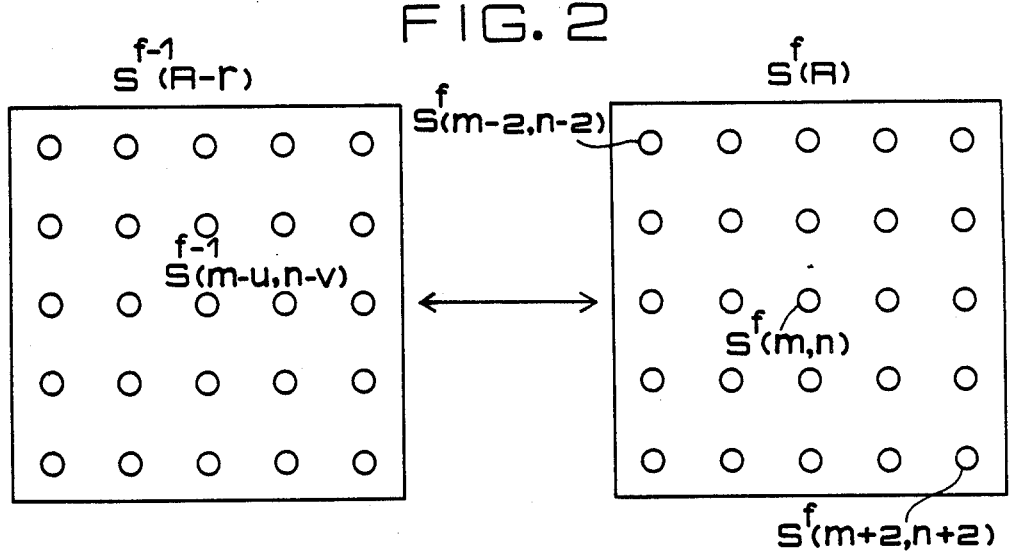
FIG. 2 is an explanatory view showing the relation between the movement vector and the arrangement of the picture elements of a moved block.
Figure 3:
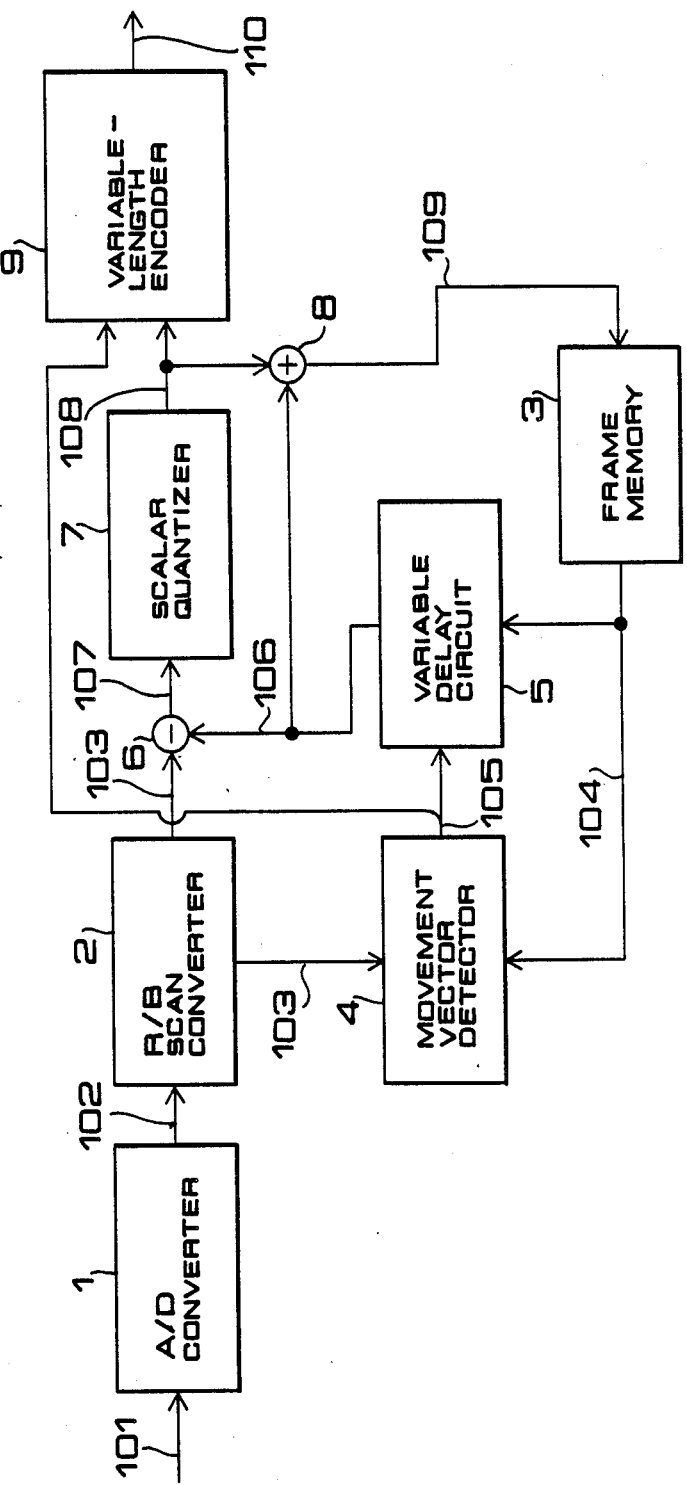
FIG. 3 is a block diagram showing a conventional movement compensation inter-frame encoder.
Figure 4:
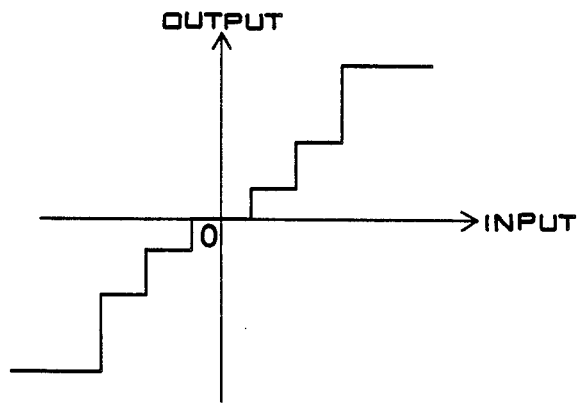
FIG. 4 is a graph showing the input-output characteristics of the scalar quantizer employed in the encoder of FIG. 3.
Figure 5:
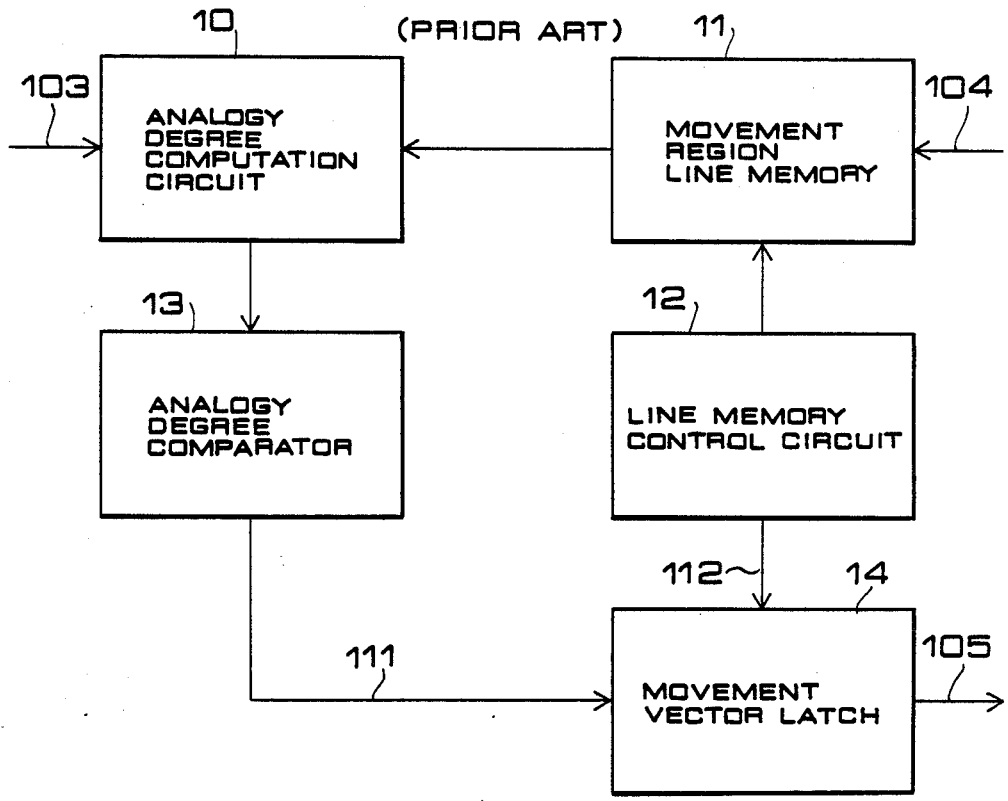
FIG. 5 is a block diagram of the movement vector detector employed in the encoder of FIG. 3.

Referring to FIG. 6, there are shown a multiaccess frame memory 20, an adaptive vector quantization encoder 21 and an adaptive vector quantization decoder 22. In FIG. 6, parts designated by the same reference characters as those used in FIG. 3 are the same or like parts as those of FIG. 3.

Figure 7:
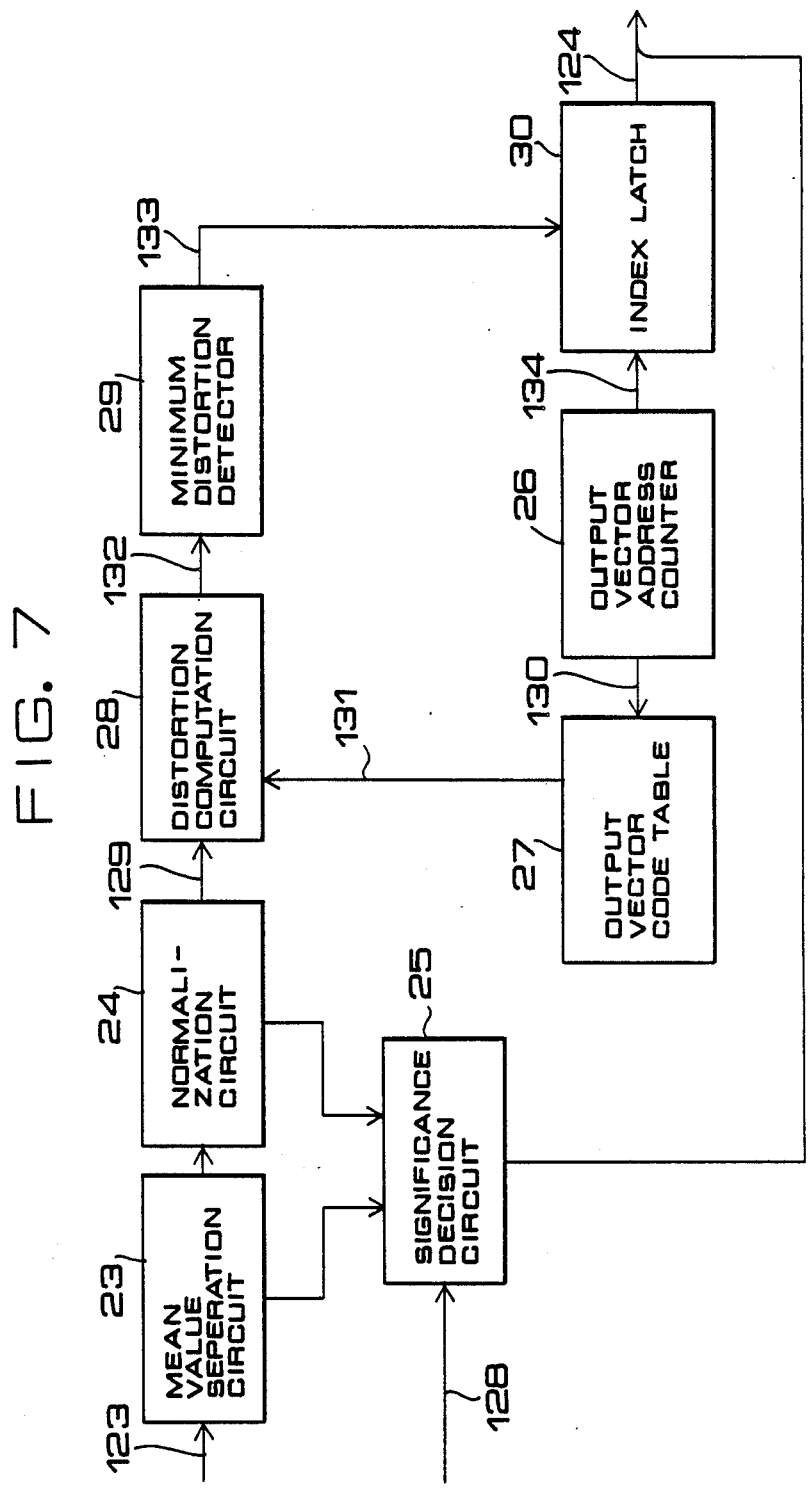
FIG. 7 is a block diagram showing the constitution of the adaptive vector quantization encoder employed in the encoder of FIG. 6.
Figure 8:
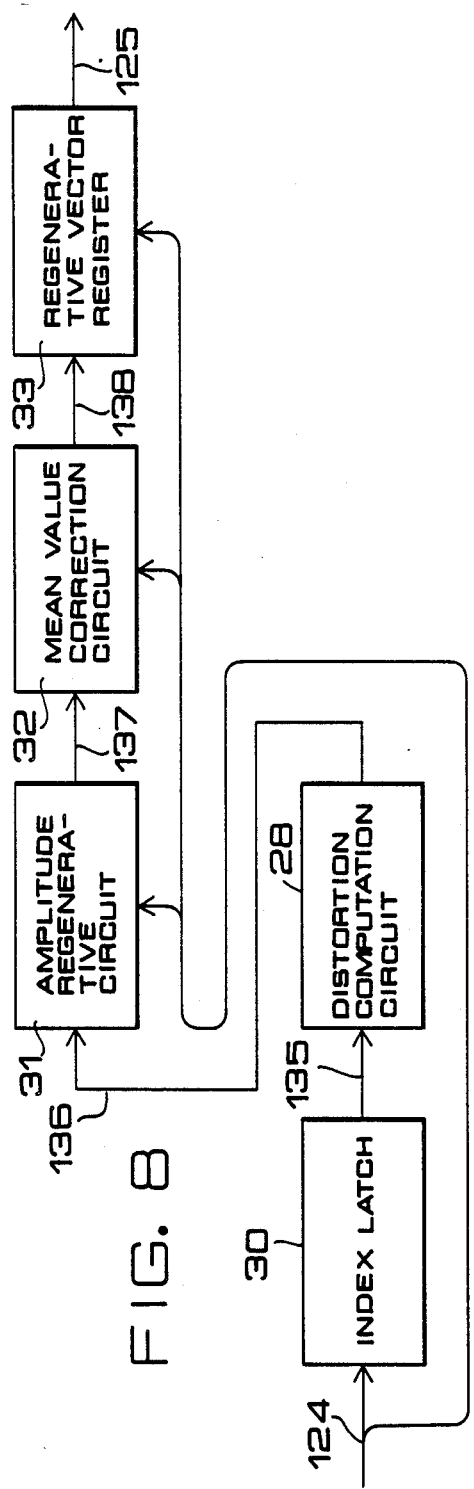
FIG. 8 is a block diagram showing the constitution of the adaptive vector quantization decoder employed in the encoder of FIG. 6.

FIGS. 7 and 8 are block diagrams showing the respective constitutions of embodiments of the adaptive vector quantization encoder and the adaptive vector quantization decoder which are applicable to the present invention respectively.

In FIGS. 7 and 8, there are shown a mean value separation circuit 23, a normalization circuit 24, a significance decision circuit 25, an output vector address counter 26, an output vector code table 27, a distortion computation circuit 28, a minimum distortion detector 29, an index latch 30, a mean value correction circuit 32, an amplitude regenerative circuit 31 and a regenerative vector register 33. Like or corresponding parts are designated by like reference characters throughout the drawings.

The manner of operation of a compensating interframe vector encoder according to the present invention will be described hereinafter in connection with FIG. 6.

A raster/block scanning convertor 2 gives a block scan picture input signal 103 to a movement vector detector 4 and a block scan picture input signal 120 delayed by several lines so that the block scan picture input signal will not overlap a movement compensation region to a subtractor 6, for inter-frame vector encoding. A movement vector detector 4 obtains a movement vector 105 through the same procedure as that of the movement detection on the basis of the picture input signal 103 and a preceding neighbor frame regenerative picture signal 121 and controls a variable delay circuit 5 so that the variable delay circuit 5 gives a predictive picture signal 122 corresponding to the position of the block scan picture input signal 120 to a subtractor 6. The output signals of the subtractor 6, i.e., predictive error picture signals 123 are blocked and are vector-quantized through the adaptive vector quantization encoder 21 and the adaptive vector quantization decoder 22. The predictive error picture signal 123 is vector-quantized to provide a predictive error vector quantization picture signal 125 containing vector-quantized noises. An adder 8 adds the predictive error vector quantization picture signal 125 and the predictive picture signal 122 and gives a regenerative picture signal 126. The regenerative picture signal 126 is written in the multiaccess frame memory 20 in a region which is not duplicated with a movement compensation execution region.

The above-stated inter-frame encoding process is executed for every block, therefore, each block is defined by a picture element vector. If the picture input signal 120 is $S_l^f$, the predictive picture signal 122 is $P_l^f$, the predictive error signal 123 is $\epsilon_l^f$, the predictive error vector quantization signal 125 is $\hat{\epsilon}_l^f$, the vector quantization noise is $Q_l^f$, the regenerative picture signal 126 is $\hat{S}_l^f$ and the preceding neighbor regenerative picture signal 121 is $\hat{S}_l^{f-1}$, where l indicates the block sequence number, then inter-frame encoding computation is expressed by $$\epsilon_l^f = S_l^f - P_l,$$

$$\hat{\epsilon}_l^f = \epsilon_l^f + Q_l^f,$$

$$\hat{S}_l^f 32 \hat{\epsilon}_l^f + P_l = S_l^f + Q_l^f, \text{ and}$$

$$\hat{S}_l^{f-1} = \hat{S}_l^f \cdot Z^{-f}.$$

The predictive picture signal 122 undergoes movement compensation process and is formed by cutting out a block shifted so that the analogy degree is minimized from the preceding neighbor regenerative signal 121. The block of the predictive picture signal 122 cut out and formed through movement compensation need not coincide with a block dealt with by inter-frame vector coding in boundary and block size. The movement compensation is performed in a sliding block matching mode while inter-frame vector encoding is performed in a fixed block mode.

Now, the manner of operation of the adaptive vector quantizer which achieves highly efficient encoding through the adaptive vector quantization as the predictive error picture signal 123 is subjected to significance decision in blocks. The adaptive vector quantizer comprises a cascaded connection of the adaptive vector quantization encoder 21 and the adaptive vector quantization decoder 22.

First the principle of the adaptive quantization of the predictive error signal, according to the present invention will be described.

Figure 9:
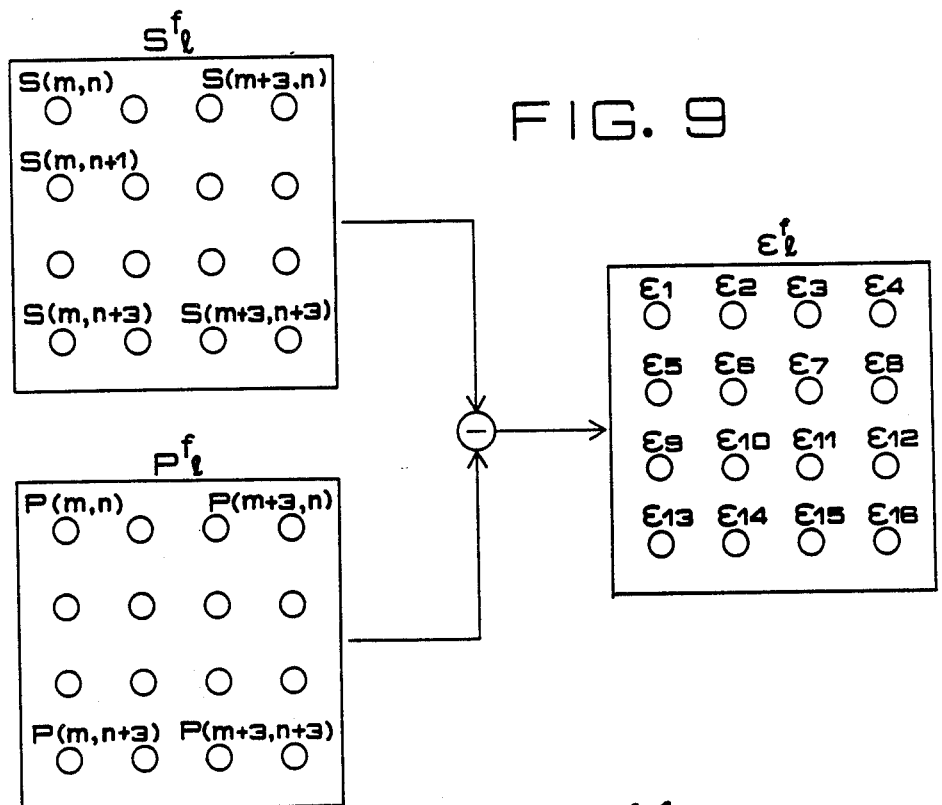
FIG. 9 is an explanatory representation showing a predictive error picture signal, namely, an adaptive vector quantization input signal, in the encoder of FIG. 6.

Suppose that the predictive error picture signal $\mathfrak{e}_l = [\epsilon_1, \epsilon_2, \ldots, \epsilon_k]$ arranged in blocks is obtained, as shown in FIG. 9, by subtracting each dimension of the blocks $P_l$ of the predictive picture signal from the blocks $S_l$ of the picture input signal. The predictive error picture signal $\mathfrak{e}_l$ is subjected to conversion to execute significance decision and adaptive vector quantization.

$$\mu_l = K^{-1} \sum_{j=1}^{k} \epsilon_j,$$

$$\delta_l = K^{-1} \sum_{j=1}^{k} |\epsilon_j - \mu_l|$$

$$X_j = (\epsilon_j - \mu_l)/\delta_l$$

$$X_l = [X_1, X_2, \ldots, X_k]$$

That is, the mean value $\mu_l$ is separated and normalized with respect to the amplitude $\delta_l$ to obtain the input vector $X_l$. The input vector $X_l$ is vector-quantized in a k-dimensional signal space and mapped into an output vector $y_i = [y_{i1}, y_{i2}, \ldots, y_{ik}]$ of the minimum distortion. The output vector $y_i$ is converted into a predictive error vector quantization picture signal $\hat{\epsilon}_l$ through the following reverse conversion.

$$\hat{\epsilon}_j = \delta_l \cdot y_{ij} + \mu_l$$

$$\mathfrak{e}_l = [\epsilon_1, \epsilon_2, \ldots, \epsilon_k]$$

where $\epsilon_l=$ when $\mu_l \leq T_1$ and $\delta_l \leq T_2$. $T_1$ and $T_2$ defines a threshold 128 for the level decision of $\epsilon_l$. The significance of the predictive error picture signal is decided in blocks and the predictive error picture signal is subjected to average value separation amplitude normalization to vector-quantize the signal only when the level of the picture signal changes between frames of a predetermined level after movement compensation. When the level of the picture signal is below the predetermined level, there is no movement or the picture can entirely be regenerated through movement compensation. When the significance decision identification code of the block $\epsilon_l$ of the predictive error picture signal is given by $\nu_l$ and $\nu_l=0$ when $\mu_l \leq T_1$ and $\delta_l < T_2$ and $\nu_l=1$ when $\mu_l > T_1$ or $\delta_l \geq T_2$, then, when insignificant, the block can be encoded by one bit. The information production can be held at a fixed amount by controlling the threshold 128 of $T_1$ and $T_2$.

Now, the principle of vector quantization for encoding the input vector of the predictive error picture signal at a very low bit rate and at a high efficiency will be described hereinafter.

Suppose that $X=[X_1, X_2, \ldots, X_k]$ is an input vector in k-dimensional signal space $R^k$, while $R_1, R_2, \ldots, R_N$ are N partitions of $R^k$ and $Y=[y_1, y_2, \ldots, Y_N]$ is a set of output vectors $y_i=[y_{i1}, y_{i2}, \ldots, y_{ik}]$, i.e., the representative points of the partial spaces $R_i$ and the index set of $y_i$ is $Y=[1, 2, \ldots, N]$. Then, vector quantization $V_Q$ is given by the cascaded connection of encoding C and decoding D.

$V_Q(x) = y_i$, if $x$ $R_i$

C: $X \rightarrow i$, if $d(x, y_i) < d(x, y_j)$ for all j

D: $i \rightarrow y_i$

Distortion measurement $d(x, y_i)$ indicates the separation between the input and the output vectors in the k-dimensional signal space and absolute distortion measurement is $$d(x, y_i) = \sum_{j=1}^{k} |x_j - y_{ij}|$$

Figure 10:
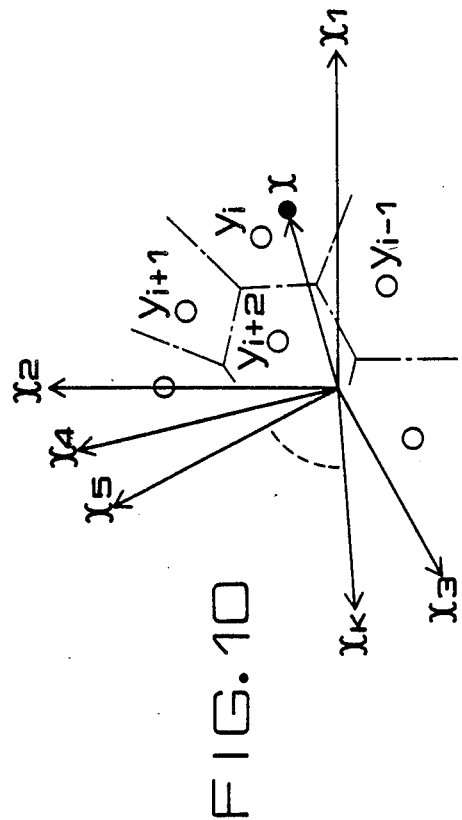
FIG. 10 is a graph explaining the relation between the input vector and the output vector in vector quantization.

The data rate of the index i, which is the vector quantization coding output at this time, is $K^{-1}\log_2 N$ bits/picture element. That is, highly efficient encoding is achieved by encoding vector quantization into the input vector x and the index i of output vector $y_i$ minimizing distortion to the minimum distortion min $d(x, y_i)$. Decoding is achieved simply by conversion into output vector $y_i$ corresponding to the index i. The set Y of output vectors $y_i$ may be obtained either by the clustering training of the actual input vectors x or by a predetermined input vector probability model. FIG. 10 shows the relation input vectors and output vectors. The adaptive vector quantization coding outputs are significance decision index $\nu_l$, mean value $\mu_l$, amplitude gain $\delta_l$ and output vector index i.

The manner of operation of the adaptive vector quantization encoder will be described in connection with FIG. 7.

The predictive error picture signal 123 is processed in blocks through the mean value separation circuit 23 and the normalization circuit 24 to be mean value separation normalized and input vector 129 is sent to the distortion computation circuit 28. At this time, the output vector address counter 26 counts up sequentially and reads the output vector 131 from the output vector code table 27. The distortion computation circuit 28 computes the distortion $d(x, y_i)$ between the input vector and the output vector and sends the distortion 132 from each output vector to the minimum distortion detector 29. The minimum distortion detector 29 gives strobing signal 133 so that the output vector address 134 of the output vector address counter 26 corresponding to the index of the output vector is stored in the index latch, when the minimum distortion between the output vector and the input vector is detected. The index latch 30 gives the index of the output vector which has the minimum distortion with respect to the input vector. The significance decision circuit 25 gives, on the basis of the mean value of the blocks of the predictive error picture signal 123 and the amplitude gain, a significance decision identification index and, when significant, the mean value and the amplitude gain. The output signals 124 of the adaptive vector quantization encoder are significance decision identification index, and the mean value of the predictive error picture signal, the amplitude gain and the output vector index when significant.

In the adaptive vector quantization decoder of FIG. 8, upon the reception of the output 124 of the adaptive vector quantization encoder, an output vector corresponding to the output vector index is read from the output vector code table 27 and the amplitude regenerative circuit 31 and the mean value correction circuit 32 compute a predictive error vector quantization picture signal when significant. The regenerative vector register 33 resets the contents to zero when the significance decision identification index indicates insignificance and finally gives the predictive error vector quantization picture signal 125.

Figure 11:
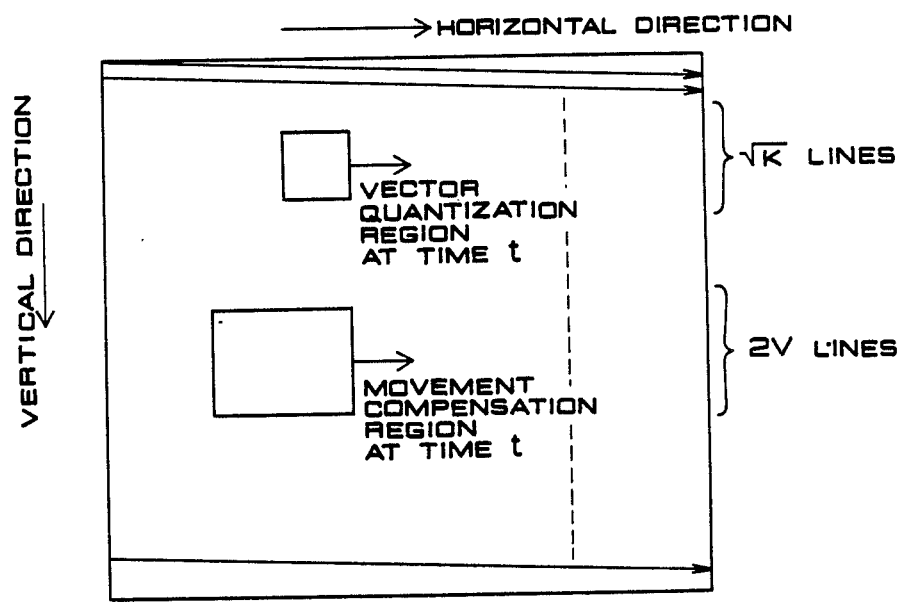
FIG. 11 is a view explaining the time relation between movement compensation and vector quantization process on a scene.

As shown in FIG. 11, it is desirable that the inter-frame vector encoding process and the movement compensation process are controlled by the multi-access frame memory 20, the movement vector detector 4 and the variable delay circuit 5 so that those processes do not overlap each other in respect of time.

As described hereinbefore, the movement compensation inter-frame adaptive vector quantized coded data are the movement vector, the significance decision identification index, and the predictive error picture signal mean value, the amplitude and the output vector index when significant. These data are subjected to variable-length encoding in the variable-length encoder 9 of FIG. 6 and sent out as the movement compensation inter-frame vector coded output 127 to the transmission segment. Block size for executing the block matching of movement compensation and block size for vector quantization desirably are the same both in horizontal direction and in vertical direction or are related by integer multiple. In such a condition, it is advantageous that the movement vector and the adaptive vector coded output can be subjected to variable-length coding together in block to block correspondence. Furthermore, since the amount of information produced becomes more correspondent to movement, coding is facilitated. Still further, the transmission of a fixed amount of information is possible through the feedback control of the significance decision threshold for adaptive vector quantization.

Another embodiment of the present invention will be described hereinafter.

This embodiment is a vector quantizer capable of highly efficiently encoding picture signals by utilizing the correlation between successive picture frames according to the vector quantization method.

Prior to the concrete description of this embodiment, the basic principle of this embodiment will be described.

Figure 14:
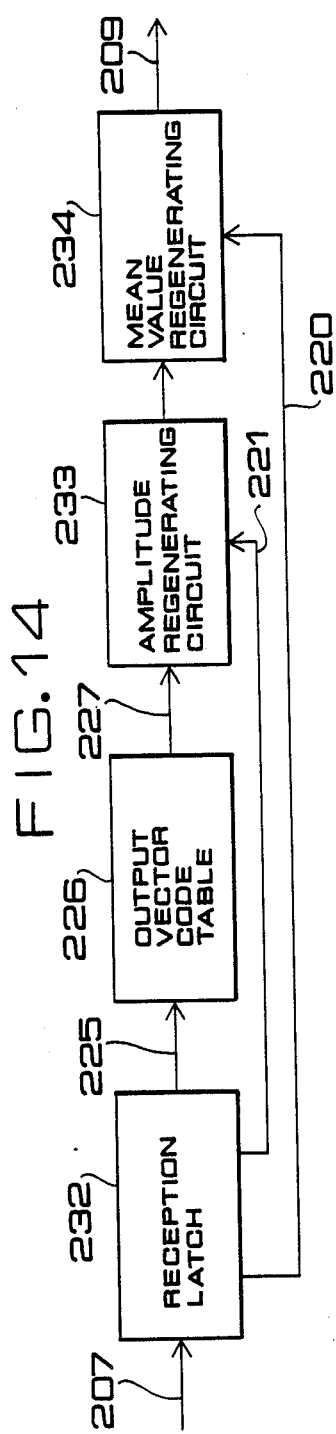
FIG. 14 is a block diagram showing the constitution of the vector quantization decoder of FIG. 12.

A device capable of attaining inter-frame encoding of such a kind has a constitution as shown in FIGS. 12, 13 and 14. An example of concrete constitution will be described hereinafter in connection with the drawings. FIG. 12 is a block diagram showing an encoder. In FIG. 12, there are indicated a digitized picture signal at 201, a raster/block scan converter 202 for blocking the picture signal sequence arranged along the direction of raster scanning into blocks each including a plurality of samples, blocked picture signal sequence at 203, a subtractor at 204, the predictive error signal sequence of the blocked picture signal at 205, a vector quantization encoder at 206, a vector quantization coded output at 207, a vector quantization decoder at 208, vector quantization decoded output, i.e., regenerative predictive error signal sequence, at 209, an adder at 210, the block of regenerated picture signal sequence at 211, a frame memory at 212, the block of regenerative picture signal sequence delayed by one frame cycle, which also is the block of predictive signal sequence for predicting the block of the picture signal sequence 203, at 213, a transmission buffer at 214, feedback control signal at 215 and encoder output at 216. FIG. 13 shows an exemplary constitution of the vector quantization encoder 206 in detail. In FIG. 13, there are indicated a mean value separation circuit at 217, an amplitude normalization circuit at 218, the inter-frame difference of the block of the picture signal sequence normalized with respect to amplitude after mean value has been separated at 219, mean value calculated by the mean value separation circuit 217 at 220, amplitude calculated by the amplitude normalization circuit 218 at 221, a movement detecting circuit which decides, on the basis of the mean value 220 and the amplitude 221, whether or not the blocked picture signal sequence being processed presently has made significant change with respect to the block of the one-frame cycle preceding picture signal sequence of the same position at 222, the result of decision of the movement detecting circuit 222 at 223, code table address counter at 224, code table index at 225, output vector code table memory at 226, code table output vector at 227, a distortion computation circuit at 228, a minimum distortion detecting circuit at 229, a minimum distortion indicating signal at 230 and a transmission latch 231.

FIG. 14 shows an exemplary constitution of the vector quantization decoder 208 in detail. In FIG. 14, there are indicated a reception latch at 232, an amplitude regenerating circuit at 233 and a mean value regenerating circuit at 234.

Figure 15:
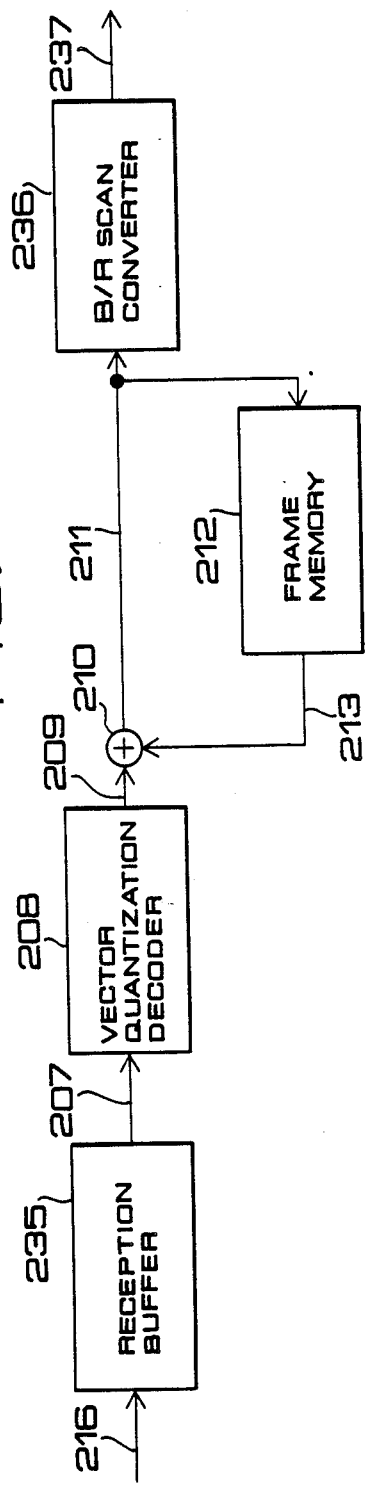
FIG. 15 is a block diagram showing the constitution of the decoder of an inter-frame vector encoder.

FIG. 15 shows an exemplary constitution of the decoder. In FIG. 15, indicated at 235 is a reception buffer, at 236 is a block/raster scan converter functioning reciprocally to the raster/block scan converter 202 and at 237 is regenerative picture signal sequence.

The manner of operation of the vector quantizer will be described hereinafter. First the general action of the encoder will be described in connection with FIG. 12.

Figure 16:
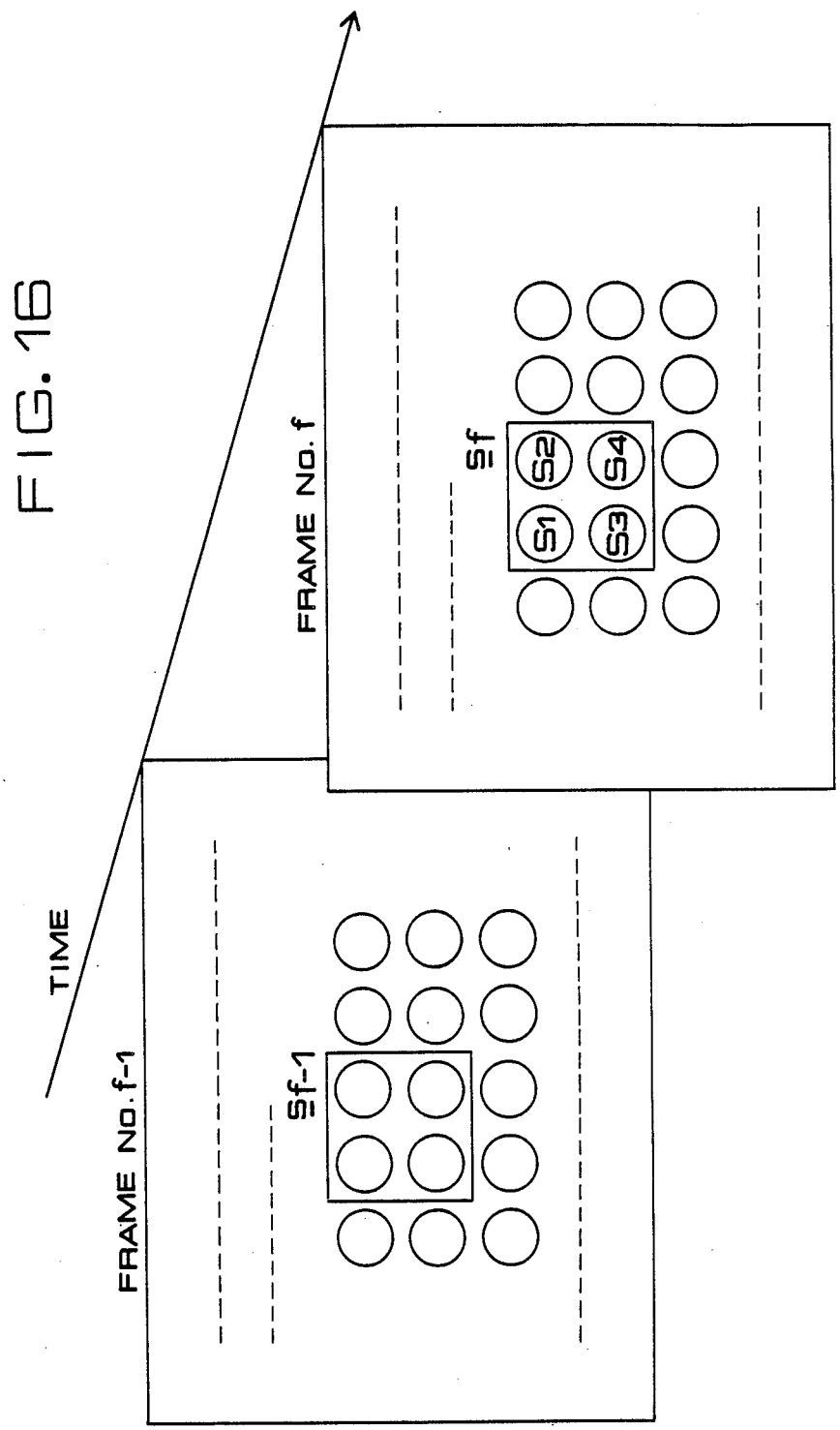
FIG. 16 is a view explaining the mode of picture signal sequence blocking.

Basically, the encoder is based on the conception of the inter-frame DPCM system. On the frame, the digitized picture signal sequence 201 is regarded as a group of samples arranged in a square lattice, however, input is given in the order of raster scanning. The raster/block scan converter 202 partitions the picture signal sequence 201 into blocks as shown in FIG. 16 and gives output signals corresponding to the blocks. Suppose that a blocked picture signal sequence 203 in a frame No. f is expressed by a signal source vector $S_f = \{S_1, S_2, \ldots, S_k\}_f$. FIG. 16 shows an example where k=4. Further, suppose that $\varepsilon_f$ is the difference 205 between the signal source vector 203 calculated by the subtractor 204 and the block 213 of the predictive signal sequence, $\hat{\varepsilon}_f$ is the block 209 of the regenerative differential signal sequence formed by the vector quantization encoder 206 and the vector quantization decoder 208, $\hat{S}_f$ is the block 211 of the regeneration signal sequence, and $P_f$ is the predictive signal sequence 213 given by the frame memory 212. Then, the general action of the encoder shown in FIG. 12 is expressed by $$\varepsilon_f = S_f - P_f,$$

$$\hat{\varepsilon}_f = \varepsilon_f + Q,$$

$$\hat{S}_f = P_f + \hat{\varepsilon}_f = S_f + Q,$$

$$P_f = \hat{S}_f Z^{-f},$$

where $Q$ is vector quantization error and $Z^{-f}$ is delay of one-frame cycle caused by the frame memory 212. Accordingly, $P_f$ is equal to the regenerative signal sequence of one-frame cycle before, namely, equal to the generative signal sequence $\hat{S}_{f-1}$ of the block $S_{f-1}$ of the picture signal sequence at the corresponding position in the frame No. f−1. The vector quantization coded output 207 obtained through the process stated above is the difference between the signal source vector 203 and the block 213 of the predictive signal sequence, namely, the result obtained by data-compressing the block 205, $\varepsilon_f$, of the predictive error signal by the vector quantization encoder 206. The vector quantization coded output 207 is sent to the transmission buffer 214, and then given to the transmission channel as the encoder output. The actions of the vector quantization encoder 206 and the vector quantization decoder 208 will be described hereinafter in connection with FIGS. 13 and 14. In the vector quantization process, a block consisting of k pieces of samples (k: the plural number) is given as an input vector in a k-dimensional signal space, output vectors having minimum distortion with respect to the input vectors given sequentially are selected among a set of output vectors prepared beforehand on the basis of the probability distribution density of the input vector the distortion with respect to the input vector will generally be minimized, and the index attached to the selected output vector is given as a quantized output. In decoding, it is only to read an output vector corresponding to the index from the same set provided also in the decoder. The input vector given is the block $\varepsilon_f = \{\epsilon_1, \epsilon_2, \ldots, \epsilon_k\}_f$ of the predictive error signal sequence 205. A mean value 220 $\mu$ calculated by the use of formula $$\mu = K^{-1} \sum_{j=1}^{k} \epsilon_j$$

is subtracted from the block 205 $\epsilon_j$, and then the remainder of the block 205 is normalized with respect to amplitude $\sigma$ calculated by the use of formula $$\sigma = K^{-1} \sum_{j=1}^{k} |\epsilon_j - \mu|$$

by the amplitude normalization circuit 218 to give a mean value separation normalized input vector $\underline{x} = \{x_1, x_2, \ldots, x_k\}$ 219. That is, $$x_j = (\epsilon_j - \mu)/\sigma \quad (j=1, 2, \ldots, k).$$

In addition to the above-mentioned formula for calculating amplitude, the following formulas, for instance, may be employed.

$$\sigma = [K^{-1} \sum_{j=1}^{k} |\epsilon_{ij} - \mu|^2]^{\frac{1}{2}}$$

$$\sigma = \max_{j} |\epsilon_j - \mu|$$

The mean value separation normalization process distributes the input vector random within a limited range in the k-dimensional signal space, which improves the efficiency of vector quantization. This process requires the preparation of the set of output vector on the basis of the input vector distribution processed through the mean value separation normalization and the process reverse to the mean value separation normalization including amplitude regeneration and mean value regeneration, after reading the output vector in the decoding process. Naturally, vector quantization without this process also is possible. Mean value separation normalizing output vector prepared on the basis of the probability distribution density of the mean value separation normalizing input vector so that the distortion from the mean value separation normalizing input vector is generally minimized is stored in the code table memory 226.

When the mean value separation normalizing input vector 219 x is given, the code table address counter 224 sequentially gives indices of vectors stored in the code table memory 226, i.e., code table addresses, and reads mean value separation normalizing output vectors 227 $\underline{y}_i = \{y_{i1}, y_{i2}, \ldots, y_{ik}\}$ (i: indices) from the code table memory 226. The distortion computation circuit 228 computes the distortion of the mean value separation normalizing input vector $\underline{x}$ from the mean value separation normalizing output vectors 227 $y_i$. Several distortion computation methods as shown below are available. When the distortion is expressed by $d(\underline{x}, \underline{y}_i)$, $$d(\underline{x}, \underline{y}_i) = \sum_{j=1}^{k} |x_j - y_{ij}|,$$

$$d(\underline{x}, \underline{y}_i) = \sum_{j=1}^{k} |x_j - y_{ij}|^2,$$

$$d(\underline{x}, \underline{y}_i) = \max_{j} |x_j - y_{ij}|.$$

The minimum distortion detecting circuit 229 calculates $d(\underline{x}, \underline{y}_i)$ sequentially and gives a strobing signal 230 when a value smaller than the past minimum distortion is obtained. At the same time, the latch 231 stores the index 225. At a stage where the code table address counter 224 has given all the indices, the index i of a mean value separation normalizing output vector which has the minimum distortion with respect to the mean value separation normalizing input vector is stored in the latch 231. This index, the mean value 220 ($\mu$) and the amplitude 221 ($\sigma$) are the vector quantization coded outputs, however, the data is compressed further by utilizing the correlation between successive picture frames. Since the input vectors are blocked predictive error signals, the center of the distribution thereof is a zero vector. Therefore, the amount of data is reduced greatly by regarding the input vectors distributed in the vicinity of the zero vector as the zero vector and without sending out indices, the mean value and the amplitude. The movement detecting circuit 222 receives the mean value 220 $\mu$ and the amplitude 221 $\sigma$ and decides whether or not the blocks of the predictive error signal sequence can be regarded as zero vectors, namely, whether or not any significant change (movement) as compared with the one-frame cycle preceding frame has occurred in the present block, for example, according to the following criterion:

when $\mu \leq T_\theta$ and $\sigma \leq T_\theta$, significant change has not occurred, and when $\mu > T_\theta$ and $\sigma > T_\theta$, significant change has occurred, where $T_\theta$ is a threshold. Accordingly, the latch 231 gives only a signal indicating "no movement" when a code indicating "no movement" is given as the result of movement detection and gives the index 225, the mean value 220 and the amplitude 221 in addition to a signal indicating "movement" when a code indicating "movement" is given, as a vector quantization coded output 207. The transmission buffer 214 monitors the amount of information transmitted and controls the threshold $T_\theta$ on the basis of the feedback control signal 215. Thus the amount of information to be transmitted is controlled. In the vector quantization decoder 208, upon the reception of the signal indicating "movement" included in the vector quantization coded output 207 by the reception latch 232, mean value separation normalizing output vectors 227 $y_i$ are read out according to the index i from the code table memory 236 and are multiplied by the amplitude 221 at the amplitude regenerating circuit 233. At the mean value regenerating circuit 234, the mean value 220 is added to the multiplied mean value separation normalizing output vectors to give output vectors, namely, a regenerative predictive error signal sequence 209 $\hat{\epsilon}_j$. That is, $$\hat{\epsilon}_j = \sigma \cdot y_{ij} + \mu, \quad (j=1, 2, \ldots, k).$$

When the signal indicating "no movement" is given by the transmission latch, the output signals of the transmission latch 231 for the mean value 220 and the amplitude 221 are zero and the output vector of the mean value regenerating circuit 234 is a zero vector.

The actions of the decoder will be described hereinafter in connection with FIG. 15.

The reception buffer 235 receives the output 216 of the encoder and decodes the vector quantization coded output signal 207. The vector quantization decoder 208 decodes, as mentioned above, the output vectors, i.e., the predictive error signal sequence 209 $\hat{\epsilon}_j$ and the adder 210 and the frame memory 212 regenerate the block 211

$\hat{S}_f$ of the regenerative picture signal through a process expressed by $$\underline{\hat{S}}_f = \underline{P}_f + \underline{\hat{\varepsilon}}_f = \underline{S}_f + Q, \text{ and } \underline{P}_f = \underline{\hat{S}}_f Z^{-f}.$$

where Q is vector quantization error and $Z^{-f}$ is delay of one-frame cycle. The block/raster converter 236 scans blocked regenerative picture signal sequence 211 $\underline{\hat{S}}_f$ along the raster scanning direction to convert the same into a regenerative picture signal sequence 237.

Now, the embodiment constituted on the basis of the above-mentioned principle will be described hereinafter in connection with the drawings.

Figures 17, 18:
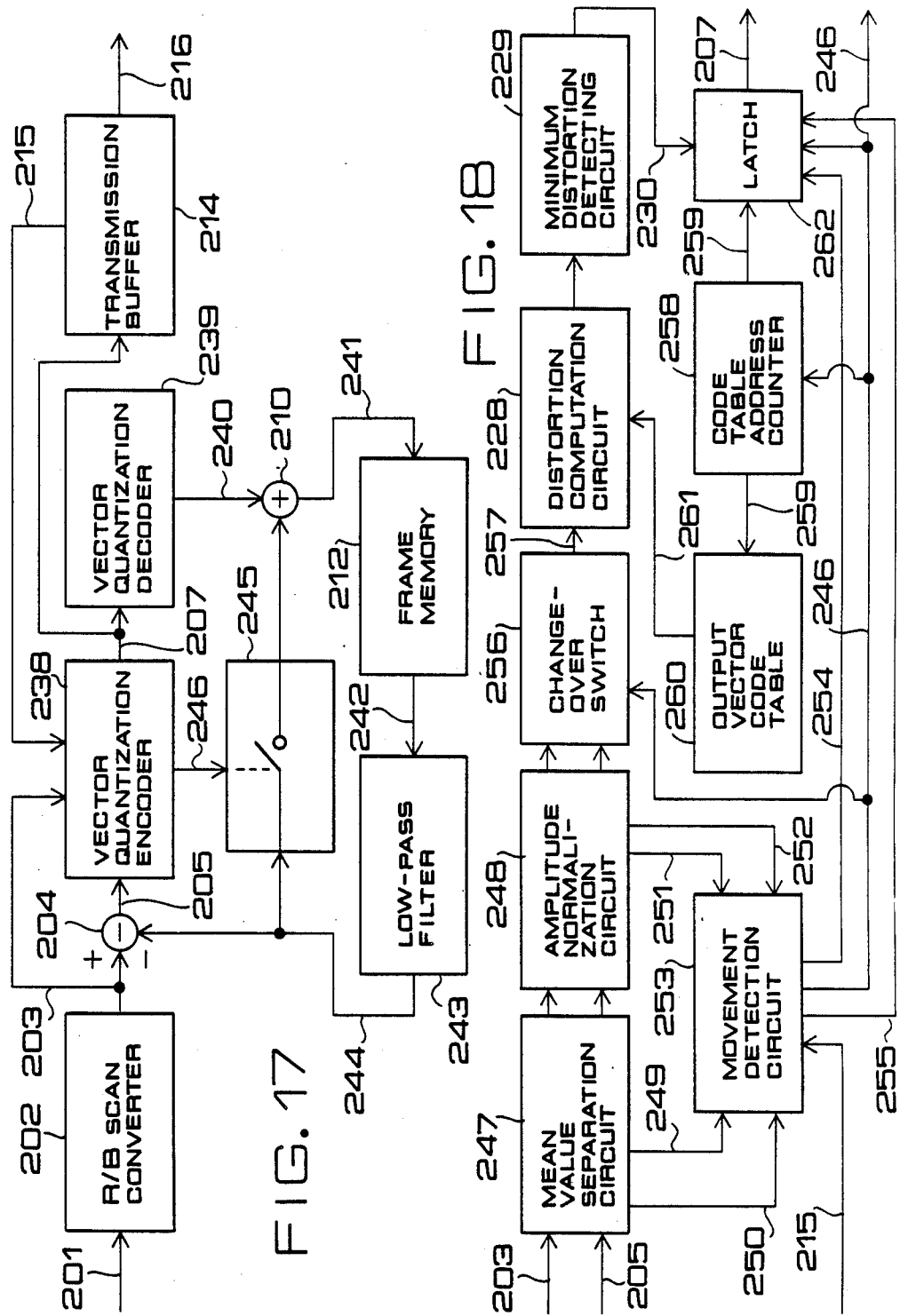
FIG. 17 is a block diagram of an encoder of an inter-frame vector encoder, in another embodiment, according to the present invention.
FIG. 18 is a block diagram showing the constitution of a movement detection vector quantization encoder of FIG. 17.

FIG. 17 shows an exemplary constitution of the embodiment of an encoder according to the present invention. In FIG. 17, indicated at 201 is a digitized picture signal, at 202 is a raster/block scan converter, at 203 is a blocked picture signal sequence, at 204 is a subtractor, at 205 is the predictive error signal sequence of the blocked picture signal, at 238 is a movement detection vector quantization encoder, at 207 is a vector quantization coded output, at 239 is a vector quantization decoder, at 240 is a vector quantization decoded output, at 210 is an adder, at 241 are blocks of regenerated picture signal sequence, at 212 is a frame memory, at 242 are blocks of a regenerated picture signal sequence delayed by one-frame cycle, at 243 is a low-pass filter, at 244 are blocks given by filtering the blocks 242 of the delayed regenerative picture signal sequence through the low-pass filter 243 and are also blocks of a predictive signal sequence for predicting the blocks 203 of the picture signal sequence, at 245 is a switch for interrupting or connecting a path for supplying the blocks 244 of the predictive signal sequence to the adder 210, at 246 is a signal which controls the switch 245 according to the result of movement detection, at 214 is a transmission buffer, at 215 is a feedback control signal and at 216 is the output of the encoder.

FIG. 18 shows the detail of an exemplary constitution of the movement detection vector quantization encoder 238. In FIG. 18, indicated at 247 is a parallel mean value separation circuit, at 248 is a parallel amplitude normalization circuit, at 249 is the mean value of the blocks 203 of the picture signal sequence, at 250 is the mean value of the blocks 205 of the predictive error signal sequence, at 251 is the intra-block amplitude of the blocks 203 of the picture signal sequence, at 252 is the intra-block amplitude of the blocks 205 of the predictive error signal sequence, at 253 is a movement detection circuit, at 254 is either the mean value 249 or the mean value 250 chosen by the movement detection circuit 253, at 255 is either the intra-block amplitude 251 or the intra-block amplitude 252, at 246 is a signal corresponding to the result of decision of the movement detection circuit 253, at 256 is a switch for changing over between the blocks of the picture signal sequence through mean value separation normalization and the blocks of the predictive error signal sequence according to the result 246 of decision of the movement detection circuit 253, at 257 are blocks of the picture signal sequence after mean value separation normalization or the blocks of the predictive error signal sequence, selected by the switch 256, at 258 is a code table address counter, at 259 is a code table index, at 260 is an output vector code table memory, at 228 is a distortion computation circuit, at 229 is a minimum distortion detection circuit, at 230 is a signal indicating the minimum distortion, at 261 is a code table output vector and at 262 is a transmission latch.

Figure 19:
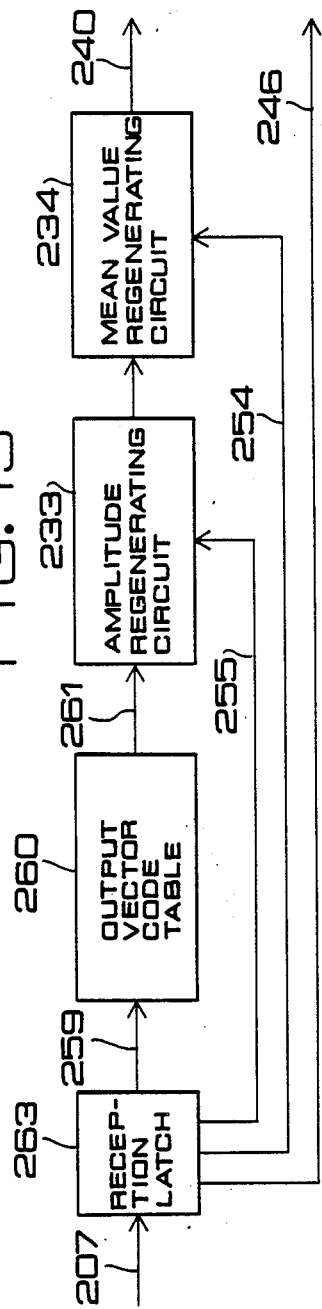
FIG. 19 is a block diagram showing the constitution of the vector quantization decoder of FIG. 17.

FIG. 19 shows the detail of an exemplary constitution of the vector quantization decoder 239. In FIG. 19, indicated at 263 is a reception latch, at 233 is an amplitude regenerating circuit and at 234 is a mean value regenerating circuit.

Figure 20:
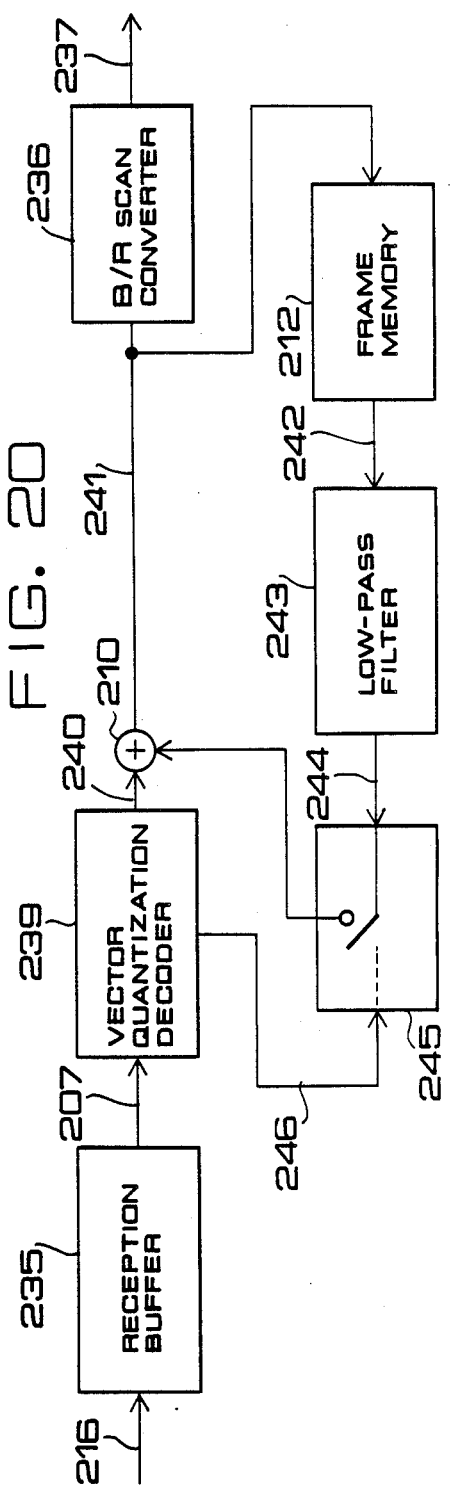
FIG. 20 is a block diagram showing an exemplary constitution of the decoder of the inter-frame vector encoder according to the present invention.

FIG. 20 shows an example of the constitution of the decoder included in this embodiment. In FIG. 20, indicated at 235 is a reception buffer, at 236 is a block/raster scan converter and at 237 is a regenerative picture signal sequence.

First, the general operation of the encoder will be described in connection with FIG. 17. Basically, this encoder is based on the conception of inter-frame DPCM. A digitized picture signal sequence 201 is a sequence of samples given sequentially along raster scanning direction. The raster/block scan converter 202 partitions the picture signal sequence into blocks and scans and converts the picture signal sequence sequentially in blocks. Suppose that a blocked picture signal sequence 203 in a frame No. f is expressed by a signal source vector $\underline{S}_f = \{S_1, S_2, \ldots, S_k\}_f$. Then, the basic operation of the encoder of FIG. 17, namely, the operation of the encoder when the switch 245 is closed and the blocks 244 of the predictive signal sequence is given to the adder 210, is expressed by the following formulas.

$$\underline{\varepsilon}_f = \underline{S}_f - \underline{P}_f$$

$$\underline{\hat{\varepsilon}}_f = \underline{\varepsilon}_f + Q$$

$$\underline{\hat{S}}_f = \underline{P}_f + \underline{\hat{\varepsilon}}_f = \underline{S}_f + Q$$

$$\underline{P}_f = F \cdot (\underline{\hat{S}}_f Z^{-f})$$

where $\underline{\varepsilon}_f$ is the difference 205 between a signal source vector 203 calculated by the subtractor 204 and the block 244 of the predictive signal sequence, $\underline{\hat{\varepsilon}}_f$ is the block 209 of the regenerative differential signal sequence formed by the vector quantization encoder 238 and the vector quantization decoder 239, $\underline{\hat{S}}_f$ is block 241 of the regenerative picture signal sequence, $\underline{P}_f$ is the predictive signal sequence 244, Q is vector quantization error, $Z^{-f}$ is delay of one-frame cycle caused by the frame memory 212 and F is the elimination of high frequencies by the low-pass filter 243. Therefore, $\underline{P}_f$ is a signal resulting from the elimination of high frequencies from the generative signal sequence $\underline{\hat{S}}_{f-1}$ of the blocks $S_{f-1}$ of the picture signal sequence at the same position in the frame one-frame cycle before the present frame, i.e., the frame No. $f-1$. The vector quantization errors are such as granular noises appearing in the high-frequency band. Therefore, the low-pass filter 243 prevents the accumulation of the quantization error and always acts so that high-quality pictures are obtained. In the process described above, the switch 245 is closed and the block 244 of the predictive signal sequence is applied to the adder 210. However, according to the operation in this process, the power of the block 205 of the predictive error signal sequence becomes very large when the picture changes greatly, which increases the vector quantization error.

To obviate such increase in vector quantization error, this embodiment is designed to subject the block $\underline{S}_f$ of the picture signal sequence to vector quantization encoding as it is instead of the block $\underline{\varepsilon}_f$ of the predictive error signal sequence, when the picture changes greatly, namely, when the power of the predictive error signal increases. To carry out this process, the control signal 246 opens the switch 245, the adder 210 allows substantially the vector quantization decoded output 240 to pass through and to become the block 241 of the regenerative picture signal sequence as it is. The movement detection vector quantization encoder 238 makes the decision of changeover and the changeover operation. These operations will be described in detail afterward. The vector quantization coded output 207 is sent to the transmission buffer 214 and is sent out to the transmission channel as the encoder output 216.

The actions of the vector quantization encoder 238 and the vector quantization decoder 239 will be described hereinafter in connection with FIGS. 18 and 19.

The block 203 $S_f$ of the picture signal sequence and the block 205 $P_f$ of the predictive error signal sequence are given as input signals. The parallel mean value separation circuit 247 subtracts the mean value 249 $\mu_s$ and $\mu_\epsilon$ operated by the use of the following formulas:

$$\mu_s = K^{-1} \sum_{j=1}^{k} S_j \text{ and}$$

$$\mu_\epsilon = K^{-1} \sum_{j=1}^{k} \epsilon_j$$

from the blocks $S_f$ and $P_f$ respectively. Furthermore, those blocks are normalized by the parallel amplitude normalizing circuit 248 with respect to the amplitudes 251 $\sigma_s$ and 252 $\sigma_\epsilon$ operated by the following formulas:

$$\sigma_s = K^{-1} \sum_{j=1}^{k} |S_j - \mu_s| \text{ and}$$

$$\sigma_\epsilon = K^{-1} \sum_{j=1}^{k} |\epsilon_j - \mu_\epsilon|.$$

These processes form mean value separation normalized vectors $\underline{x}_s$ and $\underline{x}_\epsilon$. That is, $$x_{sj} = (S_j - \mu_s)/\sigma_s \ (x_s = \{x_{s1}, x_{s2}, \ldots, x_{sk}\}) \text{ and}$$

$$x_{\epsilon j} = (\epsilon_j - \mu_\epsilon)/\sigma_\epsilon \ (x_\epsilon = \{x_{\epsilon 1}, x_{\epsilon 2}, \ldots, x_{\epsilon k}\}).$$

Amplitude calculating methods other than those described above are available. Those alternative methods are, for instance, $$\sigma_s = [K^{-1} \sum_{j=1}^{k} |S_j - \mu_s|^2]^{\frac{1}{2}}, \ \sigma_\epsilon = [K^{-1} \sum_{j=1}^{k} |\epsilon_j - \mu_\epsilon|^2]^{\frac{1}{2}},$$

$$\sigma_s = \max_j |s_j - \mu_s|, \text{ and } \sigma_\epsilon = \max_j |\epsilon_j - \mu_\epsilon|.$$

The mean value separation normalizing process distributes the input vectors randomly within a limited range in a k-dimensional signal space, which improves vector quantization efficiency. Although two sets of blocks are given as input vectors in this process, there is a process to subject the blocks of the predictive error signal sequence to vector quantization, basically, to utilize the correlation between successive pictures. Furthermore, to compress the data, the blocks of the predictive error signal sequence are regarded as zero vectors when those blocks are nearly zero. That is, it is decided that no significant change (movement) has occurred from the one-frame preceding frame. This decision is made also by the movement detector 253. The decision is made, for example, by comparing $\mu_\epsilon$ and $\sigma_\epsilon$ with a threshold $T_\theta$ that movement has occurred ($\epsilon_f \approx \underline{0}$) when $\mu_\epsilon \leq T_\theta$ and $\sigma_\epsilon \leq T_\theta$ and movement has not occurred ($\epsilon_f \not\approx \underline{0}$) when $\mu_\epsilon > T_\theta$ or $\sigma_\epsilon > T_\theta$.

The threshold $T_\theta$ is controlled by the feedback control signal 215 given by the transmission buffer 214 so that the amount of information to be transmitted is fixed. Furthermore, the movement detector 253 has, in addition to the above-mentioned function, a function to make decision for changing over the input vectors to the blocks $S_f$ of the picture signal sequence as described above when the movement is very large. This decision is made on an assumption that the movement has been detected through the above-mentioned process, on the basis of the following conditions:

$\epsilon_f$ is selected as input vector when $\sigma_\epsilon \leq \sigma_s$ and
$S_f$ is selected as input vector when $\sigma_\epsilon > \sigma_s$.

This changeover process is based on a conception that $\sigma_s$ and $\sigma_\epsilon$ represent approximately the respective powers of those signals. This is because the smaller the power of signal for vector quantization, the smaller is the vector quantization error of the regenerated signal. The movement detection circuit 253 gives the result of the decision as the signal 246 and the changeover switch 256 connects either the mean value separation normalized input vector $\underline{x}_s$ or e,uns/x/ $_\epsilon$ to the next distortion computation circuit 228 according to the signal 246. Suppose that the mean value separation normalized input vector 257 thus selected is expressed by $\underline{x} = \{x_1, x_2, \ldots, x_k\}$. The movement detection circuit 253 gives, according to the result of the decision, the mean value ($\mu$) 254 and the amplitude 255 of the selected vector. Mean value separation normalized output vectors prepared on the basis of the probability distribution density of the mean value separation normalized input vectors so that the distortion thereof from the mean value separation normalized input vectors is minimized generally are stored beforehand in the code table memory 260 at different addresses corresponding to the distributions of $S_f$ and $\epsilon_f$.

When the mean value separation normalized input vector 257 is given, the code table address counter 258 sequentially gives the indices of the corresponding vector groups, i.e., code table addresses, according to the signal 246 indicating the result of movement detection and reads mean value separation normalized output vectors $\underline{y}_i = \{y_{i1}, y_{i2}, \ldots, y_{ik}\}$ (i: index) 261 from the code table memory 260. The index i includes not only the information indicating the code table address but also the information indicating whether the vector indicated by the index i is for $S_f$ or for $\underline{\epsilon}_f$. The distortion computation circuit 228 computes the distortion of the mean value separation normalized input vector 257 $\underline{x}$ from the mean value separation normalized output vector 261 $\underline{y}_i$. Several computation processes are available. For example, the following processes are available. When the distortion is expressed by d($\underline{x}, \underline{y}_i$), $$d(\underline{x}, \underline{y}_i) = \sum_{j=1}^{k} |x_j - y_{ij}|,$$

$$d(\underline{x}, \underline{y}_i) = \sum_{j=1}^{k} |x_j - y_{ij}|^2, \text{ and}$$

-continued $$d(\underline{x}, \underline{y}_i) = \max_j |x_j - y_{ij}|.$$

The minimum distortion detection circuit 229 gives the strobing signal 230 when the distortions $d(\underline{x}, \underline{y}_i)$ calculated sequentially are smaller than the past minimum distortion. At a stage where the code table address counter 258 has given all the addresses of the vectors to be compared, the index i of a mean value separation normalized output vector which gives the minimum distortion for x is stored in the latch 262. The latch 262 gives, according to the output signal 246 of the movement detection circuit 253, a signal indicating "no movement" when the signal 246 indicates "no movement" and the index, the mean value 254 and the amplitude 255 in addition to a signal indicating "movement" as the vector quantization encoded output 207 when the signal 246 indicates "movement". The latch 263 of the vector quantization decoder 239 receives the vector quantization coded output 207. When the vector quantization coded output 207 indicates "movement", the latch 262 decides from the index i which one of $\underline{S}_f$ and $\underline{\epsilon}_f$ is vector-quantized and gives a signal equivalent to the output 246 of the movement detection circuit. At the same time, the latch reads, according to the index 259, the mean value separation normalized output vector 261 $y_i$ from the code table memory 260. The amplitude regenerating circuit 233 multiplies the output vector $y_i$ by the amplitude 255 and the mean value regenerating circuit 234 adds the mean value 254 to regenerate the output vector. This process is expressed by $$\hat{\epsilon}_j = \sigma \cdot y_{ij} + \mu (\sigma = \sigma_\epsilon, \mu = \mu_\epsilon) \text{ or}$$

$$\hat{S}_j = \sigma \cdot y_{ij} + \mu (\sigma = \sigma_s, \mu = \mu_s).$$

When the latch 262 receives the signal indicating "no movement", the latch 262 gives a code for "no movement" as the signal 246 and zero signals for the mean value 254 and the amplitude 255. Then, the output vector 40 becomes a zero vector.

The operation of the decoder of this embodiment will be described hereinafter in connection with FIG. 20.

The reception buffer 235 receives the encoder output 216 and decode the vector quantization encoder output signal 207. The vector quantization decoder 239 decodes, as mentioned above, the output vector 240. The switch 245 is closed when the signal 246 indicates "movement" or "no movement" and the coded vector is $\underline{\epsilon}_f$, and the block 241 $\underline{S}_f$ of the regenerative picture signal sequence by the adder 210 and the frame memory 212, in the manner as expressed by the following formulas:

$$\underline{S}_f = \underline{P}_f + \hat{\epsilon}_f = \underline{S}_f + \underline{Q}$$

$$\underline{P}_f = F \cdot (\underline{S}_f Z^{-f})$$

where $\underline{Q}$ is vector quantization error, $Z^{-f}$ is delay of one-frame cycle caused by the frame memory 212 and F is the elimination of high-frequency band by the low-pass filter 243. When the signal 246 indicates "movement" and that $\hat{S}_f$ is encoded, the switch 245 is opened to let the decoded $\underline{S}_f$ through the adder 210. The blocks/raster converter 236 scans the blocks 241 $\hat{S}_f$ of the blocked regenerative picture signal sequence along the raster scanning direction to convert the regenerative picture signal sequence into the regenerated picture signal sequence 237. In this embodiment, the respective amplitudes of $\underline{\epsilon}_f$ and $\underline{S}_f$ are compared to change over the input vector to be coded between $\underline{\epsilon}_f$ and $\underline{S}_f$, however, the input vector may be changed over between $\underline{\epsilon}_f$ and $\underline{S}_f$ by comparing the amplitude of $\underline{\epsilon}_f$ with that of $\underline{P}_f$. In the latter case, the input vector is $$\underline{\epsilon}_f \text{ when } \sigma_\epsilon \leq \sigma_p, \text{ or } \underline{S}_f \text{ when } \sigma_\epsilon > \sigma_p$$

where $\sigma_p$ is the amplitude of $\underline{P}_f$.

Naturally, a tree-search vector quantizer may be employed instead of the full-search vector quantizer employed herein. Furthermore, this invention is applicable to shortening the code length, namely, to preventing the increase of the amount of information, by limiting the code table address to be searched, when sudden movement is detected.

A third embodiment of the present invention will be described hereinafter. Prior to the concrete description of the embodiment, the principle of vector quantization employed by this embodiment will be explained briefly.

Suppose that k sets of input signal sequences are collectively expressed by an input vector $\underline{x} = [x_1, x_2, \ldots, x_k]$ and the set of N output vector points $y_i = [y_{i1}, y_{i2}, \ldots, y_{ik}]$ of k-dimensional Euclidean space $R^k$ ($\underline{x} \in R^k$) is $Y = [y_1, y_2, \ldots, y_N]$. If each partition of $R^k$ with the output vector $y_i$ as a representative point, for example, the center of gravity, is $R_1, R_2, \ldots, R_N$, vector quantization is a mapping of $R^k$ into Y. The encoder of a vector quantizer defines an output vector $y_i$ lying at the shortest distance from an input vector, namely, an output vector with a minimum distortion from the input vector, as follows and makes a search for the output vector $y_i$.

If $d(\underline{x}, \underline{y}_i) < d(\underline{x}, \underline{y}_j)$ for all J, $\underline{x} \in R_i$, that is, $\underline{x} \to \underline{y}_i$ where $d(\underline{x}, \underline{y}_i)$ is the distance (distortion) between the input vector and the output vector. The index i of the output vector is the output of the encoder. The decoder reads $y_i$ from a table storing Y beforehand and gives $y_i$ as an output. Thus, since the vector quantizer transmits or records the output i of the encoder, the coding efficiency thereof is very high. The set Y of the output vector $y_i$ can be obtained by clustering (repetition of the selection of representative point and the partition of the signal space until the total sum of distortions is minimized) using a picture signal sequence serving as a training model. Exemplary methods of calculating $d(\underline{x}, \underline{y}_i)$ are as follows.

① $d(\underline{x}, \underline{y}_i) = \sum_{j=1}^{k} (x_j - y_{ij})^2$ (squared distortion)

② $d(\underline{x}, \underline{y}_i) = \min_{\underline{j}} \max_j |x_j - y_{ij}|$ (maximum element distortion)

③ $d(\underline{x}, \underline{y}_i) = \sum_{j=1}^{k} |x_j - y_{ij}|$ (absolute distortion)

Figure 21:
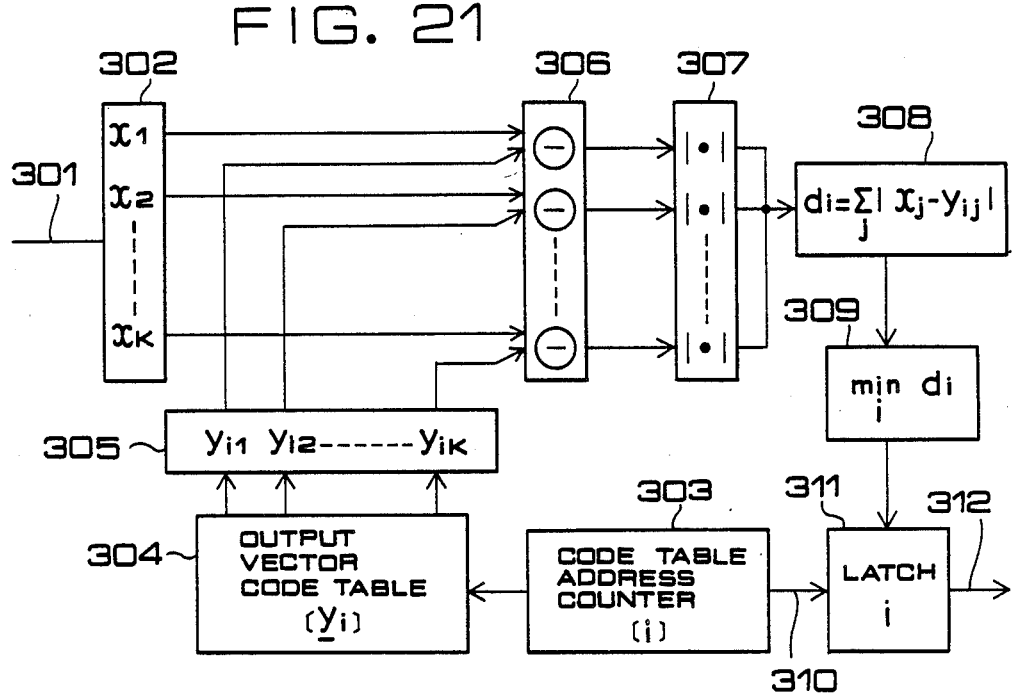
FIG. 21 is a block diagram showing a constitution of a picture signal vector quantization encoder.
Figure 22:
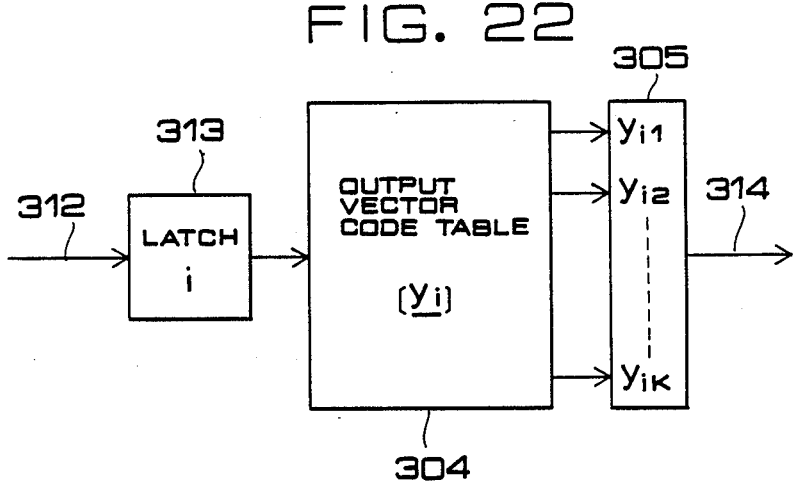
FIG. 22 is a block diagram showing a constitution of a picture signal vector quantization decoder.

A conventional vector quantizer will be described with reference to a concrete constitution thereof. FIG. 21 shows an example of an encoder. In this example, absolute distortion of the method ③ is used to define $d(\underline{x}, \underline{y}_i)$. In FIG. 21, indicated at 301 is an input vector, at 302 is an input vector register, at 303 is a code table address counter, at 304 is a code table memory, at 305 is an output vector register, at 306 is a parallel subtractor, at 307 is a parallel magnitude arithmetic unit, at 308 is a magnitude distortion arithmetic unit (adder), at 309 is a minimum distortion vector detector, at 310 is an index signal, at 311 is a latch and at 312 is an encoder output signal. FIG. 22 shows an example of a decoder. In FIG. 22, indicated at 313 is a latch and at 314 is an output vector.

The actions of this encoder and this decoder will be described hereinafter. A set of k picture signal sequences are blocked to provide an input vector $\underline{x}=[x_1, x_2, \ldots, x_k]$. First the register 302 latches the input vector. The code table address counter 303 reads output vectors $\underline{y}_i$ sequentially from the output vector code table memory 304. The output vectors read out is latched by the output vector register 305. The magnitude distortion arithmetic unit 308 receives $\underline{x}$ and $\underline{y}_i$ from the parallel subtractor 306 and the parallel magnitude arithmetic unit 307 and calculates the distortion $d_i$ by the use of formula $$d_i = d(\underline{x}, \underline{y}_i) = \sum_{j=1}^{k} |x_j - y_{ij}|.$$

Then, the minimum distortion detector 309 detects the minimum value among the distortions $d_i$ between $y_i$ and x which are read out sequentially. The minimum distortion is given by $$d = \min_i d_i.$$

The vector that gives the minimum distortion is the vector quantization output of the vector $\underline{x}$. Upon the detection of the minimum distortion vector, the minimum distortion detector 309 gives a strobing signal to the latch 311 and the latch 311 receives the index signal 310 indicating the address of the vector. The latch 311 gives the index as an output signal 312 of the encoder.

In the decoder, the latch 313 receives the encoder output signal 312. The index is decoded, an output vector $y_i$ is read from the code table 304 and latched by the output vector register 305 and an output vector 314 is given.

A fourth embodiment of the present invention, constituted on the basis of the above-mentioned principle will be described concretely hereinafter.

In this embodiment, the respective sizes of the input vector register 302, the output vector register 305, the code table memory 306 and the parallel subtractor 304 are reduced to half by the use of subsamples, latches and adders are added to the parallel magnitude arithmetic unit 307 and the magnitude distortion arithmetic unit 308 and those components are connected in a cascade connection of the pipeline system to reduce the circuit scale of the encoder and to solve the problems of real-time processing.

Figure 23:
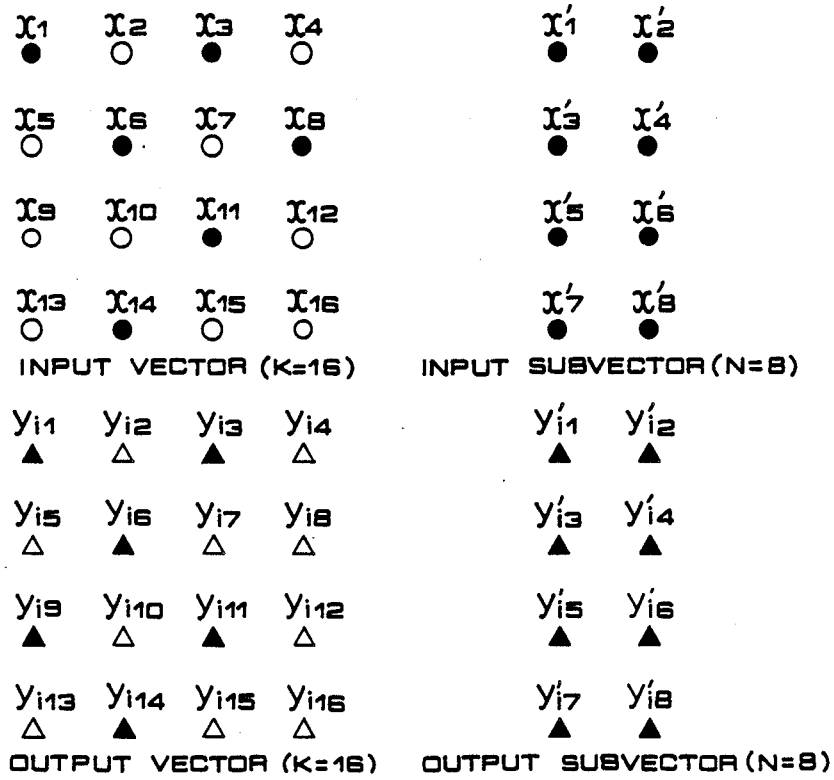
FIG. 23 is an illustration showing, in comparison, the input and output subvectors of a picture signal subsample vector quantizer according to the present invention and the input and output vectors of a conventional picture signal vector quantizer.

FIG. 23 shows the correspondent relation between the input and output vectors of the above-mentioned basic vector quantizer and the input and output vectors of the present vector quantizer. As shown in FIG. 23, the encoder of the present vector quantizer uses input subvectors obtained by subsampling input vectors and output subvectors obtained by subsampling the output vectors obtained by clustering using picture signal sequence.

Figure 24:
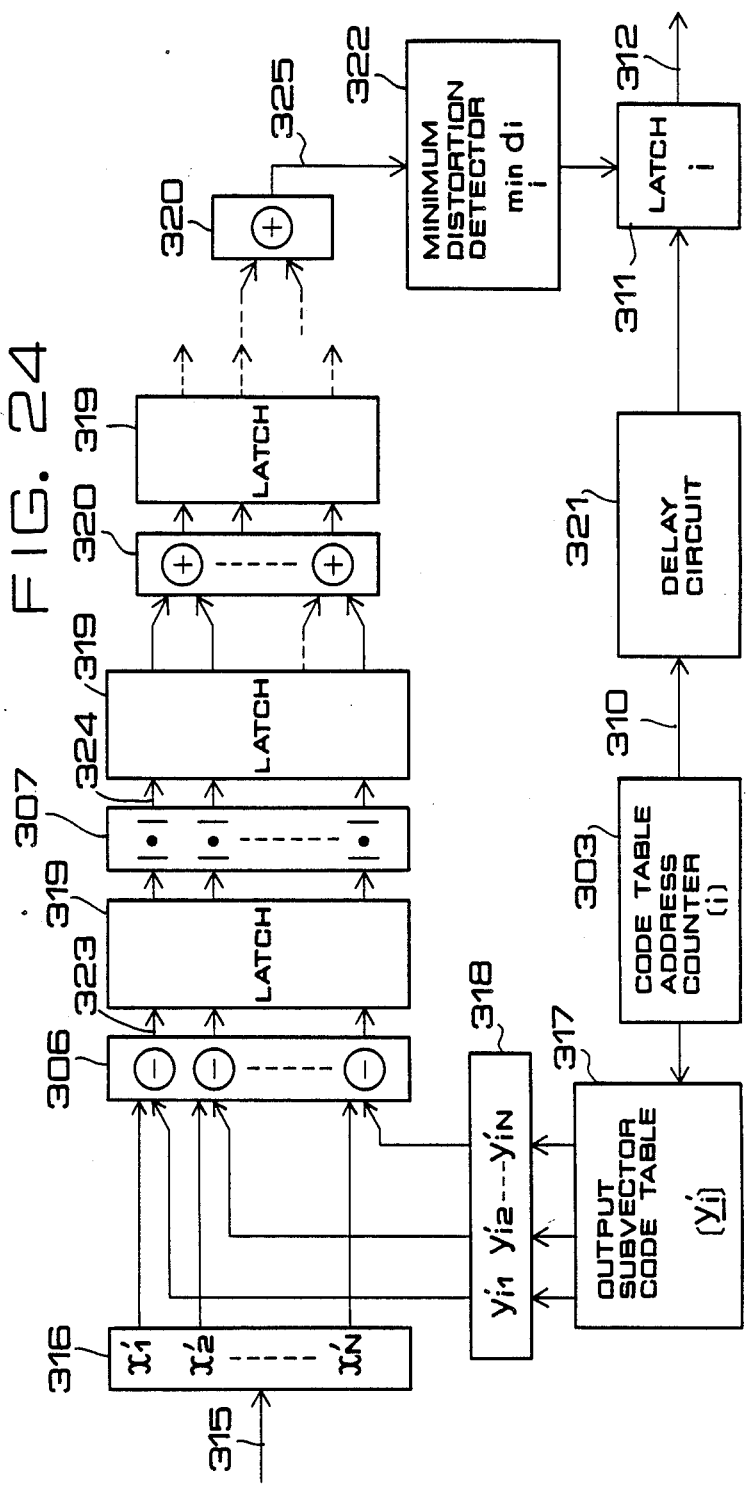
FIG. 24 is a block,diagram showing a picture signal vector quantization encoder of the present invention.

The constitution and the operation of this embodiment of a vector quantizer according to the present invention will be described hereinafter. FIG. 24 shows an exemplary constitution of the encoder of the present vector quantizer. In FIG. 24, indicated at 303 is a code table address counter, at 306 is a parallel subtractor, at 307 is a parallel magnitude arithmetic unit, at 310 is an index signal, at 311 is a latch, at is an encoder output signal, at 315 is an input subvector, at 316 is an input subvector register, at 317 is an output subvector code table memory, at 318 is an output subvector register, at 319 is a latch, at 320 is a parallel adder, at 321 is delay circuit for compensating the delay due to the pipeline connection of the components and at 322 is a minimum distortion detector.

The operation of this vector quantizer will be described hereinafter.

A set of N picture signal sequences are sampled and then blocked to obtain an input subvector $x' = [x_i', x_2', \ldots, x_N']$. This input subvector 315 is first latched by the register 316. The code table address counter 303 reads output subvectors $y_i'$, sequentially from the output subvector code table memory 317 and lets the register 318 latch the output subvectors $y_i'$. The parallel subtractor 306 obtains N differences between the input subvector latched by the register 316 and the output subvectors latched by the register 318.

$$(323) \ldots d_{ij} = x_j' - y_{ij}' \quad (j=1, 2, \ldots, N).$$

Then, the outputs 323 are latched by the register 319 and are converted into magnitudes $|d_{ij}|$ ($j=1, 2, \ldots, N$) 324 by the parallel magnitude arithmetic unit 307. At this time, the inputs $y_{i1}', y_{i2}', \ldots, y_{iN}'$ of the parallel subtractor are updated to $y'_{(i+1)1}, y'_{(i+1)2}, \ldots, y'_{(i+1)N}$. The magnitudes $|d_{ij}|$ ($j=1, 2, \ldots, N$) 324 are then latched by the register 319 and are added sequentially every two inputs. That is, the adder 320 reduces the number of output signals to half the number of the input signals. This process is repeated successively until the number of the output of the adder 320 is reduced to one. The final output 325 of the adder 320 is $$325 \ldots d_1 = \sum_{j=1}^{N} |x_j' - y_{ij}'|.$$

The minimum distortion detector compares the present value d and the succeeding input value $d_i$ and stores the smaller value as d. The minimum distortion detector repeats this comparison until the last input to obtain a minimum distortion $$d = \min_i d_i.$$

The vector that gives the minimum distortion is the vector quantization output for the vector x. When the minimum distortion vector is detected, a strobing signal is given to the latch 311 and an index signal 310 indicating the address of the vector is taken. The latch 311 gives the index as an encoder output signal 312. The same decoder as shown in FIG. 22 is employed. In the decoder, the latch 313 receives the encoder output signal 312, and the index is decoded, an output vector $y_i'$ is read from the code table 314 consisting of output vector sets obtained by clustering using picture signal sequences and the output vector $y_i'$ read is latched by the output vector register 305 and given as an output vector 314. Although the input and the output vectors are obtained by subsampling with N=8 and k=16 in this embodiment, naturally, the values of N and k and the input and the output subvectors can optionally be selected.

The constitution of the subvector quantizer of this embodiment as described hereinbefore reduces the circuit scale of the encoder and the pipeline connection of the components for the successive parallel operation of the minimum distortion detector facilitates realtime processing.

Figure 25:
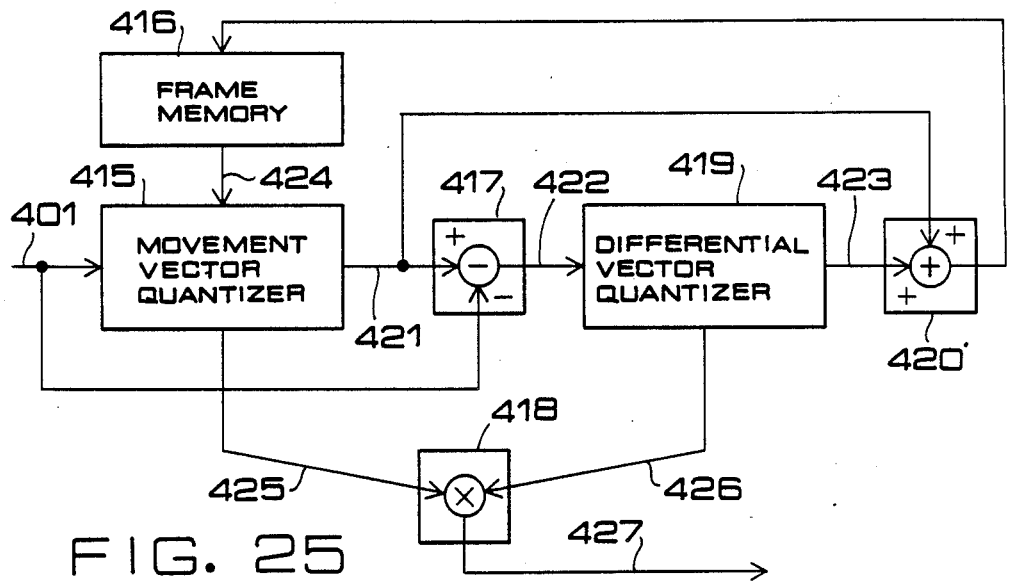
FIG. 25 is a block diagram showing a picture signal movement compensation vector quantization encoder embodying the present invention.

The constitution and the operation of the fourth embodiment of the present invention will be described hereinafter. FIG. 25 shows an exemplary constitution of this embodiment of a movement compensation vector quantizer. In FIG. 25, indicated at 415 is a movement vector quantizer, at 417 is a subtractor to obtain the differential signal 422 between the output signal 421 and the input signal 401 of the movement vector quantizer, at 419 is a differential vector quantizer to vector-quantize the differential signal 422, at 420 is an adder to add the output signal 423 of the differential vector quantizer and the output signal 421 of the movement vector quantizer, at 426 is a differential vector index signal, at 418 is a multiplexer to generate an encoder output 427 by multiplying the code train of the movement vector index signal by the code train of the differential vector index signal and at 416 is a frame memory to store the output signal of the adder 420 given in the processing of the preceding frame.

The operation of this movement compensation vector quantizer will be described hereinafter. The movement vector quantizer 415 executes the movement compensation of the input signal 401 on the basis of the picture information of the preceding frame, i.e., the output signal 424 of the frame memory 416. The constitution and the action of this movement vector quantizer will be described hereunder.

Figure 26:
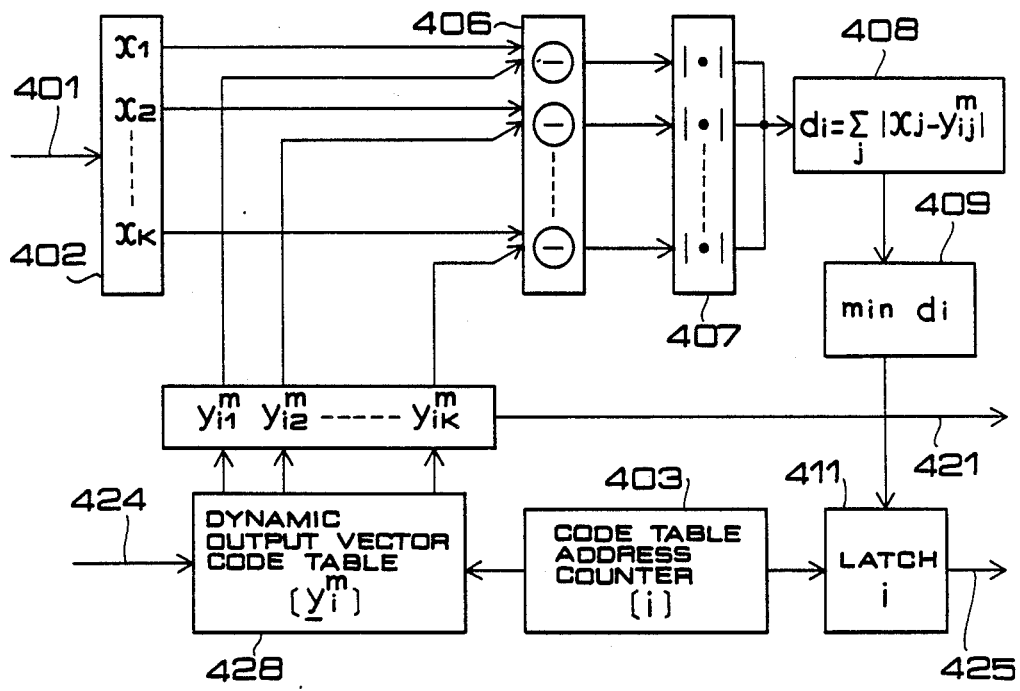
FIG. 26 is a block diagram showing an exemplary constitution of the movement vector quantizer of FIG. 25.

FIG. 26 shows an exemplary constitution of the movement vector quantizer. In FIG. 26, indicated at 428 is a dynamic output vector code table, at 421 is an output movement vector having the minimum error with respect to the pattern of a block to be coded and at 425 is the movement vector index for the output vector having the minimum error. The movement vector quantizer processes dynamic output vector code table produced adaptively from the picture signal of the preceding frame as an output vector set through the same distortion calculation process as that of the conventional vector quantizer. The dynamic output vector code table is produced adaptively at the processing of each block in the manner as described hereunder.

Figure 27:
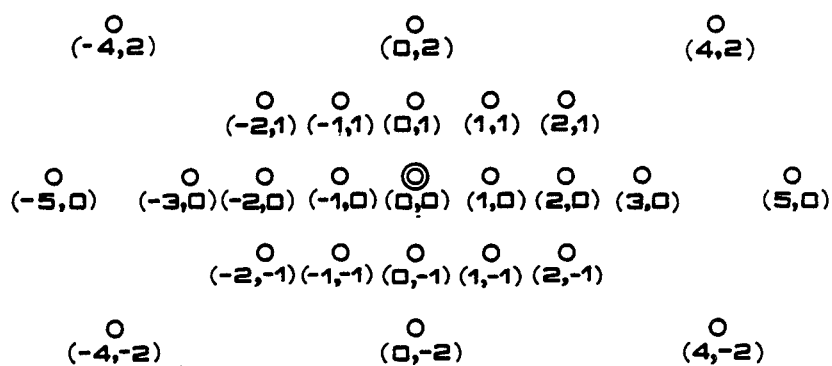
FIG. 27 is a representation showing an example of movement vector arrangement for explaining a dynamic output vector code table producing method according to the present invention.
Figure 28:
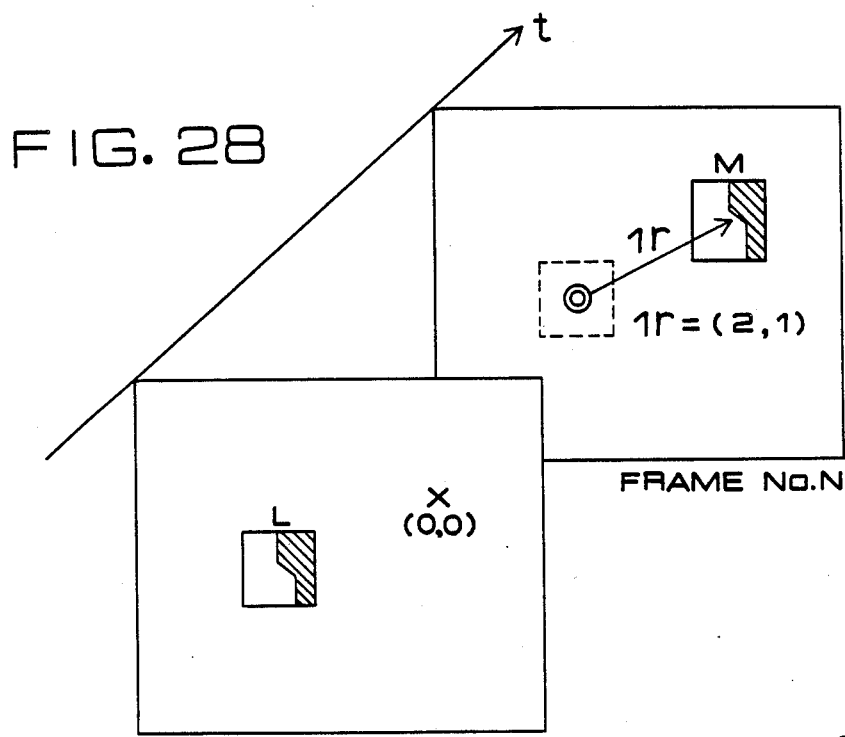
FIG. 28 is a view for explaining the principle of movement vector quantization of the present invention.

As shown in FIG. 28, in vector-quantizing the block No. M of a frame No. N, twenty-five blocks are cut out from the preceding frame, i.e., a frame No. N−1, so that the center of the block is located as shown in FIG. 28 with a point in the frame No. N−1 coinciding with the center of the block, i.e., a point X in FIG. 28, as the origin. These blocks are indexed as a set of movement output vectors and registered in the dynamic output vector code table. The arrangement as shown in FIG. 27 can optically be selected. Furthermore, the movement vector set may be produced by using the blocks cut out from the present frame. The movement vector quantizer searches the vectors registered in the dynamic output vector code table for a vector which provides the minimum distortion. In the example of FIG. 28, when it is decided that the pattern of the block No. M of the frame No. N is the most analogous with the pattern of the block No. L of the frame No. N−1, the direction of the movement vector in the arrangement of FIG. 27 is (2, 1) with respect to the origin. That is, movement detection has been executed for the movement of the block No. L of the frame No. N−1 to the position of the block No. M of the frame No. N. The movement vector quantizer executes an operation to shift the block No. L to the origin (point X) in the frame No. N−1. The movement vector quantizer gives the index 426 of a vector that minimizes the distortion to the multiplexer 418 and gives a movement output vector that minimizes the distortion as a quantized picture signal 421 to the subtractor 417.

Figure 29:
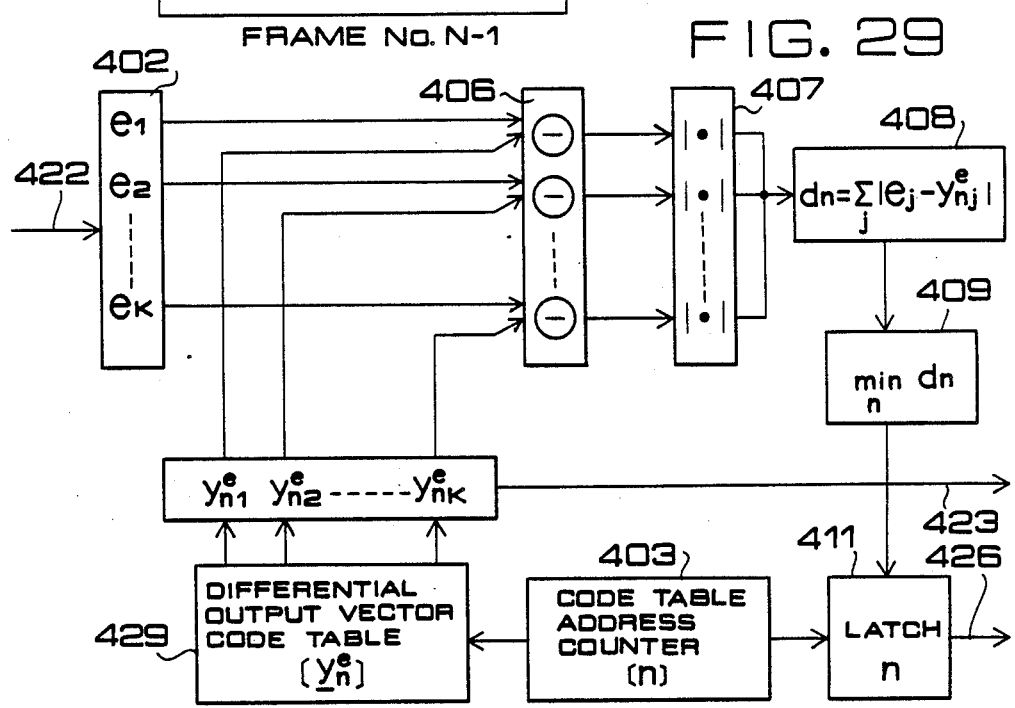
FIG. 29 is a block diagram showing an exemplary constitution of the differential vector quantizer of FIG. 25.
Figure 30:
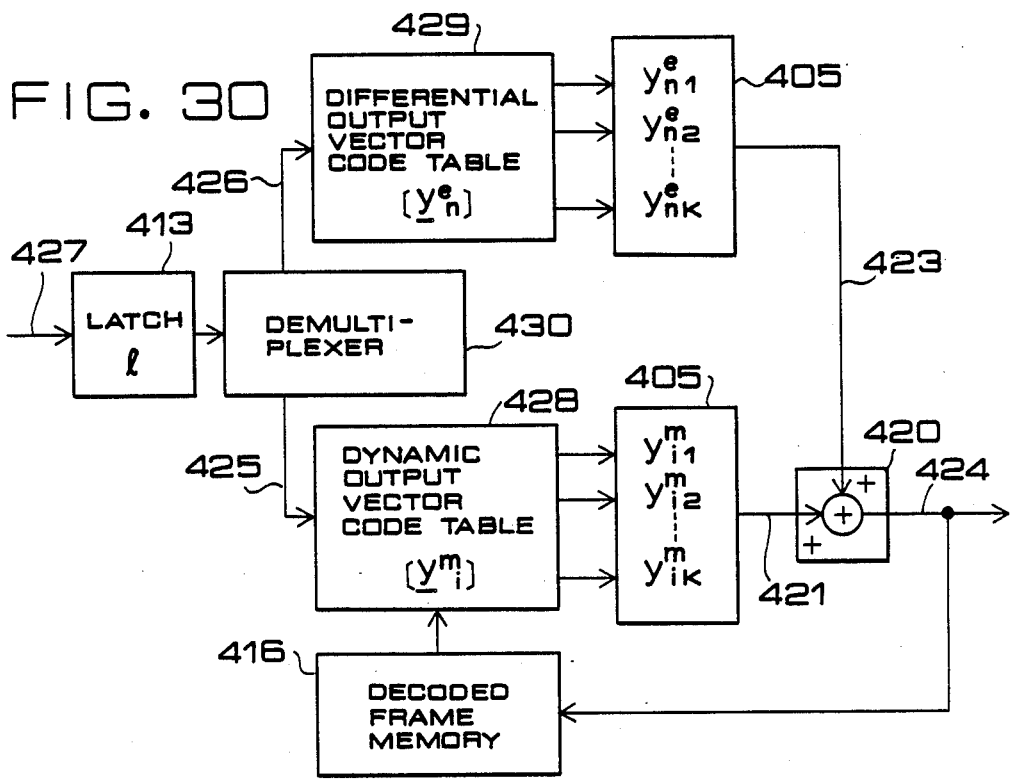
FIG. 30 is a block diagram showing the constitution of a picture signal movement compensation vector quantization decoder according to the present invention.

Referring to FIG. 25, the subtractor 417 calculates the difference between the picture signal 421 quantized by the movement vector quantizer and the original picture signal 401 and gives a differential signal 422. This differential signal 422 is a signal eliminated of the redundant component on the basis of the correlation of the picture signal with the picture signal of the preceding frame. The differential vector quantizer 419 receives the differential signal 422 and executes the same distortion calculation as that of the conventional vector quantizer with a fixed differential output vector code table prepared beforehand through clustering training, as shown in FIG. 29, as a differential output vector set. Finally, the differential vector quantizer 419 gives the index 426 of a differential output vector that minimizes the distortion from the input vector to the multiplexer 418 and gives the corresponding differential output vector to the adder 420 as a quantized differential signal 423.

The adder 420 of FIG. 25 calculates the sum of the picture signal 421 quantized by the movement vector quantizer and the differential signal 423 quantized by the differential vector quantizer and gives the result as a regenerative picture signal to the frame memory 416. The frame memory executes variable delaying. The output signal 424 of the frame memory 416 is used as information for the movement compensation of the next frame. The multiplexer 418 multiplies the code train of the movement vector index 425 by the code train (word) of the differential vector index 426 and gives a code train 427 as an encoder output signal.

In the decoder, the latch 413 receives the encoder output signal 427 and the demultiplexer 430 divides the code train into two parts and regenerates the movement vector index 425 and the differential vector index 426. A differential output vector corresponding to the differential vector index 426 is read from the differential output vector code table 429 to regenerate the quantized differential signal 423. A movement output vector corresponding to the movement vector index 425 is read from the dynamic output vector code table 428 and the picture signal 421 quantized by the movement vector quantizer is regenerated. For this purpose, the same dynamic output vector code table 428 and the differential vector code table 429 as those used in the encoder are used. The adder 420 calculates the sum of the regenerated differential signal 423 and the picture signal 421 to decode the output picture signal 424. This output picture signal 424 is stored in the frame memory 416 to be used as information for the decoding processing of the next frame.

When the movement vector quantizer thus constituted according to the present invention is applied to encoding an animated cartoon, in which quite analogous frames are transmitted successively, since a block similar to the picture element pattern of a block to be encoded is located in the neighborhood of the corresponding position in the preceding frame, a movement output vector consisting of those blocks is produced for every processing of each frame and redundancy based on the correlation between frames is eliminated by the use of the movement output vector quantizer. Accordingly, the contents of the dynamic output vector code table are updated for every frame and the movement vector quantization error signal is quantized through multistage vector quantization, and thereby efficient coding is attained.

A fifth embodiment of the present invention will be described hereinafter.

Figure 31:
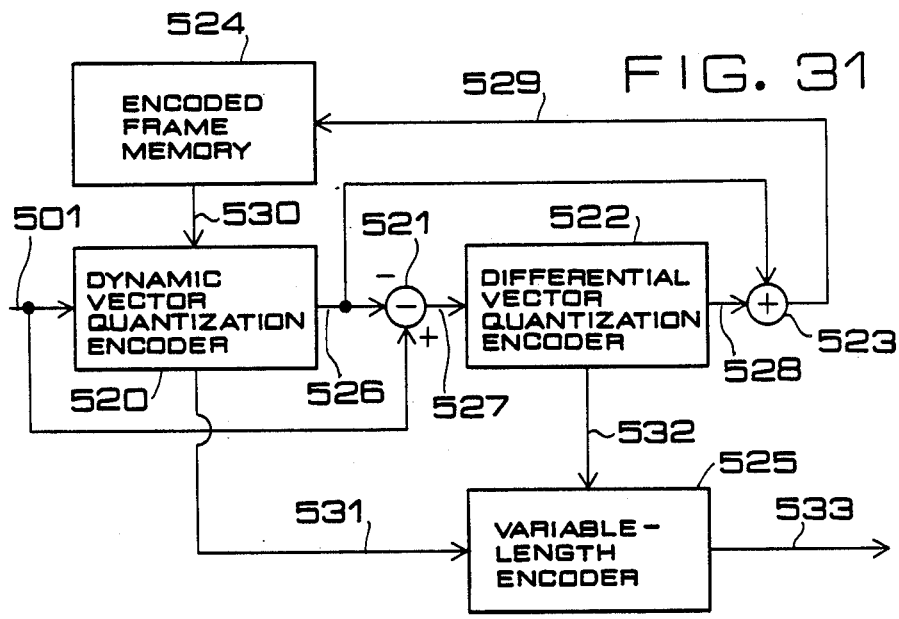
FIG. 31 is a block diagram showing a dynamic multistage vector quantization encoder embodying the present invention.

FIG. 31 shows the constitution of this embodiment. In FIG. 31, indicated at 520 is a dynamic vector quantization encoder, at 521 is a subtractor, at 522 is a differential vector quantization encoder, at 523 is an adder, at 524 is an encoded frame memory and at 525 is a variable-length encoder. This embodiment of the vector quantizer according to the present invention is constituted of a multistage connection of a dynamic vector quantization encoder for encoding initial movement vectors and a secondary differential vector quantizer for vector-quantizing the differential signal between the initial movement vector encoded signal and the present input signal.

First the principle of movement vector encoding in the initial dynamic vector quantization will be described.

The sampling signal sequence of a picture signal is obtained by scanning two-dimensionally arranged picture elements. Therefore, as shown in FIG. 32, when an object A in the preceding frame moves during one-frame scanning cycle and becomes an object B in the present frame, the blocked picture signal sequence L of the preceding frame is identical with the blocked picture signal sequence M of the present frame. Suppose that the horizontal and the vertical coordinates of the two-dimensionally arranged picture elements are given by (m, n) and the displacement of the block M of the present frame from the block L of the preceding frame is given by a movement vector $r=(u, v)$. Then, the relation between the picture signals of the block L and the block M is given, as shown in FIG. 33, by $X(m, n) \cdot Z^{-f} = X(m+u, n+v)$, where $X(m, n)$ is the picture signal at each position of the picture element (m and n are integers) and $Z^{-f}$ is delay corresponding to one-frame cycle. Thus, in vector-quantizing the block M of the picture signal sequences of the present frame, an output vector minimizing the distortion is obtained by the block L of the preceding frame, which block L is apart from the block M by the movement vector $r=(u, v)$. That is, in vector-quantizing an animated picture signal, it is more efficient, as long as the picture of the same object is in the preceding frame, to use the two-dimensional displacement of the block of the picture signal sequences in the preceding frame, namely, to use neighborhood blocks which are apart from the present block by the movement vector $r$ as a set of output vectors before performing encoding by the use of a set of output vectors obtained by clustering input signal sequences. This process is defined as dynamic vector quantization $Q_d$ as follows. Let $\underline{x}$ denote a k-dimensional input vector formed by blocking every k picture input signal sequences of the present frame, $\underline{y}_g$ denote a k-dimensional output vector formed by similarly blocking picture input signal sequences in the preceding frame, which block is apart from the block of the present frame by $r_g$, and $r_g$ denotes a quantized movement vector formed by selecting two-dimensional displacements at random. A set of P quantized movement vectors $r_g$ is given by $r^P = \{r_1, r_2, \ldots, r_P\}$. An index set of the movement vector $r_g$ is given by $G = \{1, 2, \ldots, P\}$. Then, dynamic vector quantization $Q_d$ is expressed by a cascaded connection of coding $C_d$ and decoding $D_d$:

$$Q_d(\underline{x}) = \underline{y}_g \text{ if } d(\underline{x}, \underline{y}_g) < d(\underline{x}, \underline{y}_j) \text{ for all } j$$

$$C_d: \underline{x} \rightarrow g$$

$$D_d: g \rightarrow \underline{y}_g$$

$$Q_d = D_d \cdot C_d.$$

The distortion $d(\underline{x}, \underline{y}_g)$ in a k-dimensional space is expressed in Euclidean norm:

$$d(\underline{x}, \underline{y}_g) = \sum_g (x_j - y_{gj})^2$$

where $x_j$ and $y_{gj}$ are the No. j dimensions of $\underline{x}$ and $\underline{y}_g$ respectively.

Figure 34:
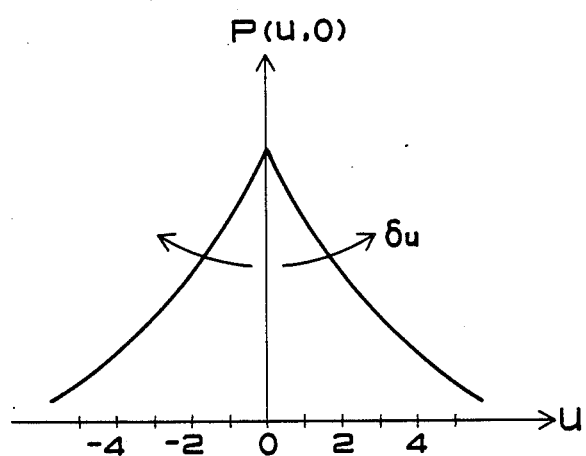
FIG. 34 is a graph showing the probability distribution of movement vectors.
Figure 35:
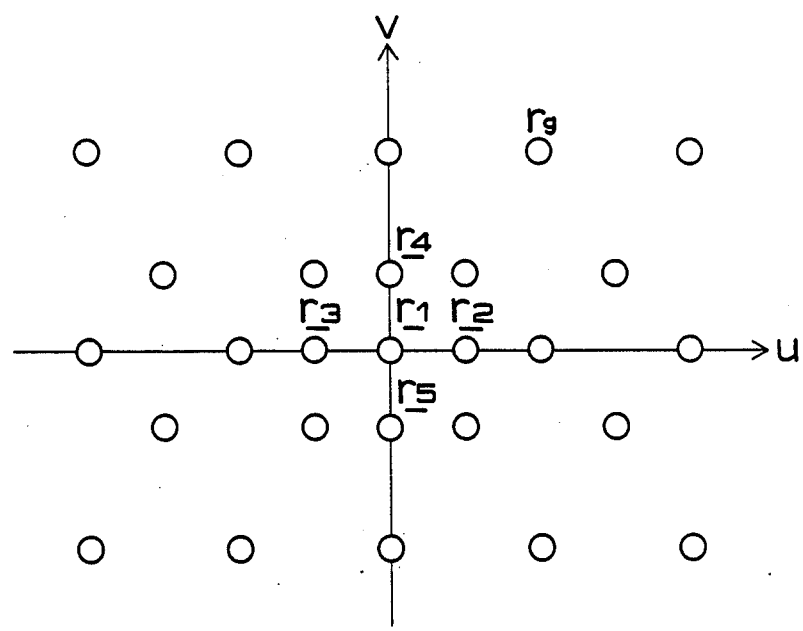
FIG. 35 is a representation explaining the arrangement of movement vectors.

FIG. 34 shows a plot of the horizontal probability distribution $$P(u, o) \text{ of } \min_g d(\underline{x}, \underline{y}_g),$$

namely, the occurrence probability distribution $P(\underline{r}) = P(u, v)$ of a movement vector of minimum distortion over the entire area of several frames. Accordingly, the arrangement of a quantized movement vector $r_g$ is assumed to be that of FIG. 35. In a dynamic vector quantization process according to the present invention, a set $r^P$ of P movement vectors $r_g$ is obtained through the clustering training of actual picture signal sequences so that the total sum of distortions $d(\underline{x}, \underline{y}_g)$ will be minimized, by the use of the input vector $\underline{x}$ of the present frame and the output vectors $\underline{y} = \underline{x}(r) \cdot Z^{-f}$, which is separated by a distance $\underline{r}$, of the preceding frame among picture input sequences over the entire areas of several frames. The initial dynamic vector quantizer maps the input vector $\underline{x}$ of the present frame into one of the sets of dynamic output vectors $\underline{y}_g$, on the basis of the set $r_g$ of optimal movement vectors obtained through the above-mentioned procedure. Furthermore, in the case of dynamic vector quantization, as in the case of scene change, sometimes no appropriate dynamic output vector is found in the preceding frame. This problem is solved by providing a set of a plurality of mean value vectors $\underline{y}_h = \{y_{h1}, y_{h2}, \ldots, y_{hk}\}$ ($y_{hk} = y_{hj}$ for all j).

The dynamic vector quantization signal $\underline{x} = \underline{y}_g$ or $\underline{y}_h$ is subtracted from the input vector $\underline{x}$ of the present frame to give a differential input vector $\underline{\epsilon}$, which is vector-quantized by the next differential vector quantizer to give a differential output vector $\underline{\hat{\epsilon}}$. The differential vector-quantized signal $\underline{\hat{\epsilon}}$ and the dynamic vector-quantized signal $\underline{\hat{x}}$ are added together to give a dynamic multistage vector-quantized signal $\underline{\hat{x}}$. This $\underline{\hat{x}}$ is stored in a frame memory and delayed by one-frame cycle to use the same as a set of dynamic output vectors in dynamic vector quantization.

The above-mentioned actions will be described in connection with FIG. 31.

Let $\underline{x}$ denote the input vector 501 of the present frame, $\underline{\tilde{x}}$ denote a dynamic vector-quantized signal 526, $\underline{\epsilon}$ denote a differential input vector 527, $\underline{\hat{\epsilon}}$ denote a differential vector-quantized signal 528, $\underline{\hat{\hat{x}}}$ denote a dynamic multistage vector-quantized signal 529 and $\underline{y}_g$ denote a dynamic output vector 530. The above-mentioned operations are implemented by a dynamic vector quantizer 520, a subtractor 521, a differential vector quantizer 522, an adder 523 and an encoded frame memory 534.

$$\underline{\hat{x}} = \underline{x} + \underline{q}_d \quad \underline{\epsilon} = \underline{x} - \underline{\hat{x}} = -\underline{q}_d$$

$$\underline{\hat{\epsilon}} = \underline{\epsilon} + \underline{q}_e = -\underline{q}_d + \underline{q}_e$$

$$\underline{\hat{\hat{x}}} = \underline{\hat{x}} + \underline{\hat{\epsilon}} = \underline{x} + \underline{q}_d - \underline{q}_d + \underline{q}_e = \underline{x} + \underline{q}_e$$

$$\underline{y}_g = \underline{\hat{\hat{x}}}(r)_g \cdot z^{-f}$$

where $q_d$ and $q_e$ are dynamic quantized noise and differential vector quantized noise respectively, $z^{-f}$ is frame delay and $\hat{x}(r_g)$ is $\hat{x}$ at a position displaced by $r_g$.

Through the process described above, the dynamic vector quantizer 520 and the differential vector quantizer 522 give g or h as a dynamic vector quantized index 531 and i as a differential vector quantized index 532, respectively, to the variable-length encoder 525. The variable-length encoder converts the reception signals into a variable-length encoded signal 533, w(g·h, i)·w(g·h, i) is a dynamic vector quantization coded output.

A preferred embodiment of the dynamic vector quantizer according to the present invention will be described concretely in connection with FIG. 36.

In FIG. 36, indicated at 534 is an input vector register, at 535 is a dynamic output vector address counter, at 537 is a dynamic output vector register, at 538 is an initial distortion arithmetic unit, at 539 is an initial minimum distortion detector and at 540 is an initial output data latch.

The action of this dynamic vector quantizer will be described hereunder. After the input vector 501 has been latched by the input vector register 534, the dynamic output vector address counter 535 reads sequentially a set of dynamic output vectors 530 which has previously been transferred from the coded frame memory 524 to the dynamic output vector code table 536 and the mean value output vector from the dynamic output vector code table 536. The dynamic vector quantized output vector 543 is latched temporarily by the dynamic output vector register 537. The initial distortion arithmetic unit 538 calculates distortions between the input and the output vectors successively. As soon as the minimum distortion output vector has been detected, the minimum distortion detector 539 provides a strobing signal 546. Then, the initial output data latch 540 latches the dynamic output vector or the mean value output vector 544, and the index 547 corresponding to the address of the dynamic output vector.

Thus the dynamic vector quantized signal 526 and the dynamic vector quantized index 531 representing the minimum distortion dynamic output vector or the mean value vector are provided.

The constitution of an embodiment of the differential vector quantizer will be described hereunder in connection with FIG. 37.

In FIG. 37, indicated at 548 is a differential input vector register, at 549 is a differential output vector address counter, at 550 is a differential output vector code table, at 551 is a differential output vector register, at 552 is a secondary distortion arithmetic unit, at 553 is a minimum distortion detector and at 554 is a secondary output data latch.

The action of this differential vector quantizer will be described hereunder.

Let $\underline{\epsilon} = \{\epsilon_1, \epsilon_2, \ldots, \epsilon_k\}$ denote a differential input vector. The dynamic vector quantized signal, namely, the feedback loop connected to the coded frame memory of FIG. 31, formed by dynamic vector quantization using the picture signal sequences of the present and the preceding frames is removed and differential input vectors are obtained by using dynamic vector quantized signal sequences obtained through a feed-forward mode. Then, a set of N differential output vectors is obtained through the clustering training of the differential input vectors. Let $E = \{\hat{\epsilon}_1, \hat{\epsilon}_2, \ldots, \hat{\epsilon}_N\}$ denote the set of the differential output vectors $\underline{\hat{\epsilon}}_j = \{\hat{\epsilon}_{i1}, \hat{\epsilon}_{i2}, \ldots, \hat{\epsilon}_{ik}\}$ and $I = \{1, 2, \ldots, N\}$ denote an index set of the differential output vectors. Then, differential quantization $Q_e$ is expressed as a cascaded connection of coding $C_e$ and decoding $D_e$ as follows.

$$Q_e(\underline{\epsilon}) = \underline{\hat{\epsilon}}_j \text{ if } d(\underline{\epsilon}, \underline{\hat{\epsilon}}_i) < d(\underline{\epsilon}, \underline{\hat{\epsilon}}_j) \text{ for all } j$$

$$C_e: \underline{\epsilon} \rightarrow i$$

$$D_e: i \rightarrow \underline{\hat{\epsilon}}$$

$$Q_e = D_e \cdot C_e$$

Expressing distortion $d(\underline{\epsilon}, \underline{\hat{\epsilon}}_j)$ in Euclidean norm, $$d(\underline{\epsilon}, \underline{\hat{\epsilon}}_j) = \Sigma(\epsilon_j - \hat{\epsilon}_{ij})^2.$$

Therefore, the differential vector quantizer maps into $$\min_i d(\underline{\epsilon}, \underline{\hat{\epsilon}}_j),$$

i.e., a differential output vector minimizing the distortion.

In the differential vector quantizer shown in FIG. 37, the differential output vector address counter 549 counts up consecutively when the differential input vector 527 is latched by the differential input vector register 548 and reads sets of differential output vectors which have previously been obtained by clustering training consecutively from the differential output vector code table 550. The differential output vector 557 is latched temporarily by the differential output vector register 551. Then, the secondary distortion arithmetic unit 553 calculates $d(\underline{\epsilon}, \underline{\hat{\epsilon}}_j)$ and the secondary minimum distortion detector 553 detects a differential output vector for the minimum distortion $$\min_i d(\underline{\epsilon}, \underline{\hat{\epsilon}}_j).$$

Upon the detection of the minimum distortion output vector, the strobing signal 560 is given to make the secondary output data latch 554 the differential output vector 558 and the address signal 561 corresponding to the differential output vector index. The differential vector quantizer gives $\underline{\hat{\epsilon}}$ as the differential output vector 528 for the minimum distortion and the index i of the differential output vector as the differential vector quantized index 532.

The dynamic multistage vector quantization encoder acts in the processing procedure as described above.

The constitution of an embodiment of the dynamic multistage vector quantization decoder will be described hereinafter in connection with FIG. 38.

In FIG. 38, indicated at 562 is a variable-length decoder, at 563 is a dynamic vector quantized index latch, at 564 is a decoded frame memory and at 565 is a differential vector quantized index latch.

The action of the dynamic multistage vector quantization decoder will be described hereunder.

The variable-length coded signal 533 processed through variable-length encoding by the dynamic multistage vector quantization encoder, i.e., s(g.h, i), is decoded by the variable-length decoder 562 into the dynamic vector quantized index 531, namely, g or h, and a differential vector quantized index, i.e., i. The dynamic vector quantized index latch 563 latches g or h temporarily and reads, by using g or h as an address signal, the corresponding dynamic output vector $\underline{y}_g$ or mean value vector $\underline{y}_h$ as a dynamic vector quantized signal 526, i.e., $\hat{x}$ from the dynamic output vector code table 536. The dynamic output vector $\underline{y}(\underline{r}_g)$ is transferred beforehand from the decoded frame memory 564 to the dynamic output vector code table. The differential vector quantized index latch 565 uses the differential vector quantized index 532 as an address signal to read the corresponding differential output vector $\epsilon_i$ from the differential output vector code table 550 and obtains the differential vector quantized signal 528, i.e., $\epsilon$. The adder 523 adds the differential vector quantized signal 528 and the dynamic vector quantized signal 526 to regenerate and give the dynamic multistage vector quantized signal 530, i.e., x and sends the same to the decoded frame memory 564. Those processes are expressed by the following formulas.

Since $\underline{y}_g = \hat{\underline{x}}(\underline{r}_g) \cdot Z^{-f}$, g or h → $\underline{y}_g$ or $\underline{y}_h = \underline{x} + \underline{q}_d = \hat{\underline{x}}$ i → $\hat{\underline{\epsilon}}_i = -\underline{q}_d + \underline{q}_e = \hat{\underline{\epsilon}}$ $\hat{\hat{x}} = \hat{\underline{x}} + \hat{\underline{\epsilon}} = \underline{x} + \underline{q}_e$.

Thus, when the dynamic output vector code table of the encoder and the differential output vector code table of the decoder, and the coded frame memory and the decoded frame memory of the dynamic multistage vector quantization are constituted and controlled so as to act in the same contents, the variable-length coded signal w(g, h, i) is obtained through highly efficient coding process.

In this process, the maximum amount of information $H_v$ of the dynamic multistage vector quantization is given by $$H_v = K^{-1} \cdot \log_2(P \cdot \mu \cdot N) \text{ bits/sample}$$

where P is the number of dynamic output vectors, $\mu$ is the number of mean value vectors and N is the number of differential output vectors.

With the provision of the encoder on the transmission side and the decoder on the reception side, the dynamic multistage vector quantizer achieves highly efficient coded transmission as a high-efficiency encoder for picture signals.

The dynamic multistage vector quantizer has been described on an assumption that the block size (the number of dimensions of vectors) is the same for the initial multistage vector quantization and for the secondary differential vector quantization, however, the block size may be different between the initial multistage vector quantization and the secondary differential vector quantization. Naturally, the primary differential vectors may be vector-quantized through a plurality of stages to nth differential vectors. Furthermore, when the distortion in vector quantization exceeds a predetermined threshold, it is possible to encode the distortion so as to be identified as an insignificant vector.

A sixth embodiment of the present invention will be described hereinafter.

This embodiment of the present invention is a vector quantizer capable of achieving highly efficient interframe coding by eliminating redundancy resulting from intra-frame and inter-frame correlations of animated picture signals.

The principle on which this embodiment is based will be described prior to the description of the embodiment. Suppose that an object has moved in a scene from a position A to a position B while the frame has changed from a frame No. N−1 to a frame No. N. Then, the picture pattern of k×k lattice block L (k is a plural number) surrounding a part of the object in the frame No. N−1 is approximately the same as the picture pattern of a k×k lattice block M surrounding the same part of the object in the frame No. N. That is, as viewed on the same scene, the center of the block M is located at a distance indicated by a vector r from the center of the block L. This vector is defined as a movement vector. The movement vector r is detected by the following method. k×k Lattice blocks which provide an arrangement of the center of each block are cut out from the frame No. N−1 in the frame No. N with a point (a point indicated by a cross) located in the frame No. N−1 at the same position as that of the center of the objective block M as origin. In this example, twenty-five blocks are produced. These blocks are designated as blocks $S_1$, $S_2$, ..., $S_{25}$ and the degree of identity with the objective block M in the frame No. N is defined by $$D_m = \sum_{j=1}^{k} \sum_{j=1}^{k} |S_m(i,j) - M(i,j)|.$$

The block $S_m$ which minimizes the degree of identity $D_m$ is the block L. The vector from the center of the block L to the origin (0, 0) is detected as a movement vector r=(u, v).

Accordingly, to apply movement compensation in inter-frame predictive coding, when the block M of a picture signal in the frame No. N is given to an inter-frame predictive encoder, a picture signal formed by shifting the block L of a picture signal in the preceding frame, i.e., the frame No. N−1, within the scene by the movement vector r is used to minimize the power of the inter-frame predictive error signal so that coding efficiency is improved.

FIG. 39 shows an exemplary constitution of a device of this kind. In FIG. 39, indicated at 610 is an A/D converter, at 620 is a raster/block scan converter, at 630 is a frame memory, at 640 is a movement vector detector, at 650 is a variable delay circuit, at 660 is a subtractor, at 670 is a scalar quantizer, at 680 is an adder and at 690 is a variable-length encoder.

Figure 40:
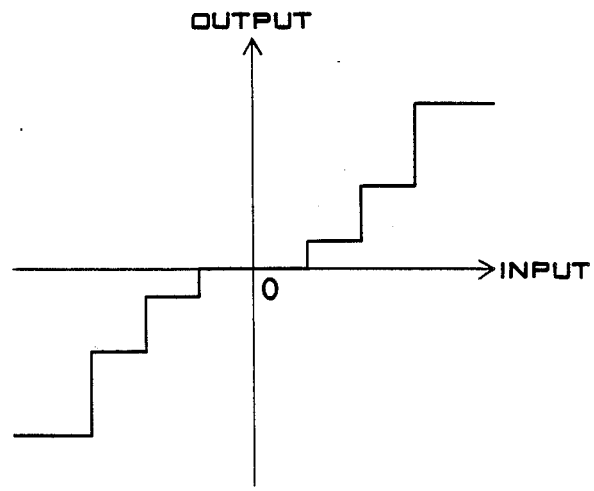
FIG. 40 is a graph showing the input-output characteristics of the scalar quantizer of FIG. 39.

The operation of this device will be described hereinafter. First the A/D converter digitizes an analog picture input signal 600 and gives a picture signal sequence 602 according to the sequence of raster scanning. The raster/block scan converter 620 converts the output procedure on the time sequence of the picture signal of the raster scan digital signal sequence 602 into block scanning and gives a block scan picture image input signal 603 arranged in lattice blocks (the interior of the block is raster scanning) from the top to the bottom and from the left to the right of the scene. A one-frame preceding regenerative picture signal 604 regenerated through inter-frame DPCM loop is read from the frame memory 630. The movement vector detector 640 performs block-matching between the present block scan picture input signal 603 and the one-frame preceding regenerative picture signal 604 and gives the movement vector 605 r=(u, v) of the one-frame preceding picture signal 604 minimizing the degree of identity. The elements u, v of the movement vector correspond to the horizontal and the vertical shifts of the picture element of the block respectively. The variable delay circuit 650 gives a picture signal which is the nearest to the present block scan picture input signal 603, namely, a picture signal formed by block-shifting the one-frame preceding regenerative picture signal 604 by the movement vector, as a predictive picture signal 606. The subtracter 660 calculates the difference between the block scan picture input signal 603 and the predictive picture signal 606 and gives a predictive error picture signal 607 to the scalar quantizer 670. The scalar quantizer 670 having a scalar quantization characteristic, for example, such as shown in FIG. 40, scalar-quantizes the predictive error picture signal 607 which is reduced in electric power through the previous movement compensation and gives a predictive error quantized picture signal 608 which is reduced in the quantization level of each picture element. The adder 680 adds the predictive error quantized picture signal 608 and the predictive picture signal 606 and gives a regenerative picture signal 609 containing a scalar quantization error to the frame memory 630. The frame memory 630 delays the present regenerative picture signal 609 by one-frame cycle.

Figure 41:
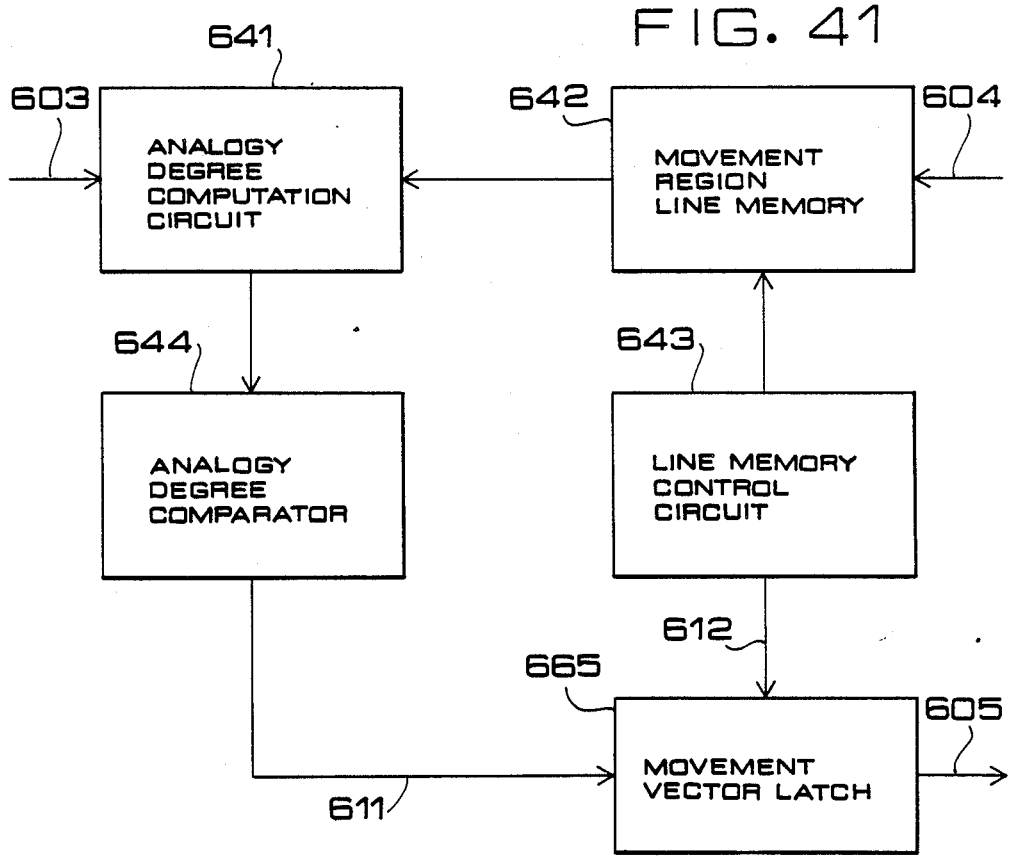
FIG. 41 is a block diagram showing the constitution of the movement vector detector of FIG. 39.

FIG. 41 shows an exemplary constitution of the movement vector detector 640 for movement compensation. In FIG. 41, at 641 is an analogy degree computation circuit, at 642 is a movement region line memory, at 643 is a line memory control circuit, at 644 is an analogy degree comparator and at 645 is a movement vector latch.

The analogy degree computation circuit 641 of the movement vector detector 640 receives a block M formed by blocking a plurality of the present picture input signal sequences 603. At this time, lines of the one-frame preceding regenerative picture signal 604 of the frame memory 630, corresponding to the search range for the movement region of the block M are stored in the movement region line memory 642. The line memory control circuit 643 reads sequentially the block L and a plurality of blocks arranged around the block L with the block L as the center, each of the one-frame preceding regenerative picture signal 604, from the movement region line memory 642 and gives the same to the identity degree calculating circuit 641. The analogy degree computation circuit 641 calculates the degree of identity $D_m$ of the block M with a plurality of blocks including the block L read from the movement region line memory 642 and the analogy degree comparator 644 detects the smallest degree of identity $$\min_m D_m.$$

The coordinates (u, v) of the center of the block giving the $$\min_m D_m$$

with the center of the block L as the origin correspond to the horizontal and the vertical address shifts, respectively, of the movement region line memory 642. Therefore, when the degree of identity is minimized, the analogy degree comparator 644 gives a movement detection strobing signal 611 to the movement vector latch 665 to make the movement vector latch 665 receive a movement vector address 612. The movement vector latch 654 sends a movement vector 605 r from the center of the block L to the coordinates (u, v) of the center of the block which minimizes the degree of identity $D_m$ within the movement region line memory 642 to the variable delay circuit 650 and the variable-length encoder 690 of FIG. 41.

The variable-length encoder 690 of FIG. 39 processes the movement vector 605 and the predictive error quantized picture signal 608 through variable-length coding to curtail the amount of picture signal information. This process enables low bit rate transmission of the movement compensation inter-frame coded output 601.

Thus the movement compensation inter-frame encoder being constituted, movement compensation is operated for each block and inter-frame DPCM is performed for every picture element. Accordingly, the minute variation of the scene can not be identified from noise and the variable-length coding of the movement vector and the predictive error quantized picture signal is difficult. Furthermore, since the total sum of the differential magnitude of each picture element within the block is selected as an evaluation function for identity calculation at the movement detector, the accuracy of block matching for portions such as the edge portion where sharp variation occurs is not satisfactory. Stilll further, since the control of the variation of the amount of generated information resulting from the variation of the movement is difficult, the signal transmission through a transmission channel of a fixed transmission capacity entails a large loss and the coding of the predictive error quantized picture signal for every picture element is inefficient. Since the movement compensation system is liable to be influenced adversely by transmission channel error, the frame memory needs to be reset for repeating transmission when a transmission channel error occurs, which requires a long resetting time.

Figure 42:
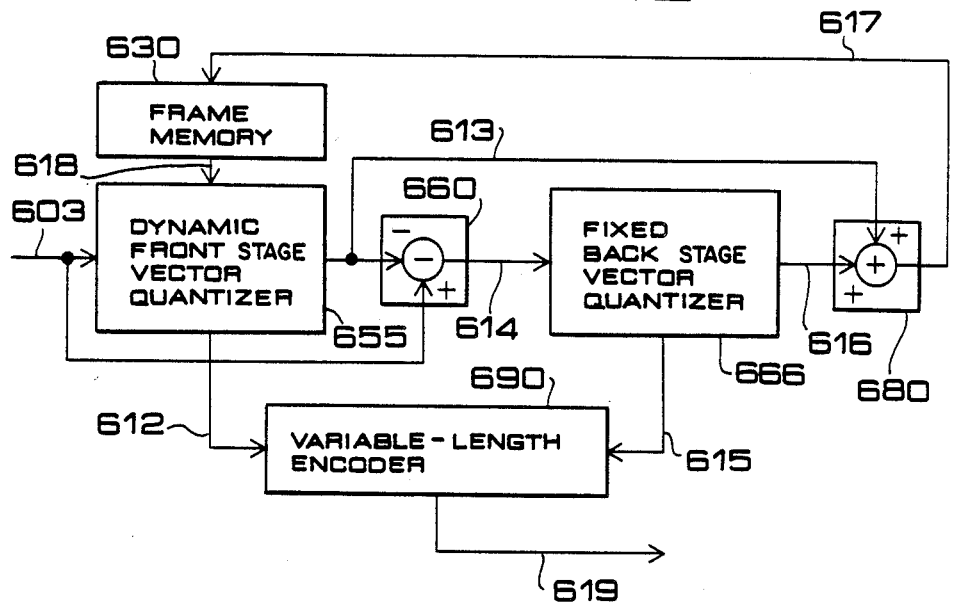
FIG. 42 is a block diagram showing the constitution of the encoder of a vector quantizer embodying the present invention.
Figure 43:
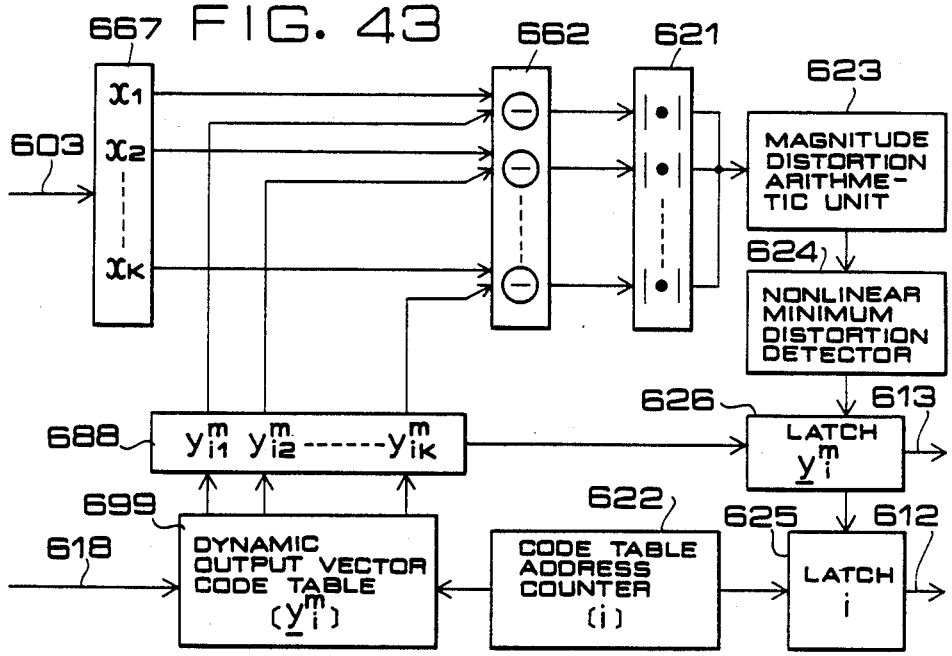
FIG. 43 is a block diagram showing the constitution of a dynamic front vector quantizer of the present invention.

FIG. 42 shows a constitution of an embodiment of the present invention formed on the basis of the abovementioned principle. In FIG. 42, indicated at 655 is a dynamic front stage vector quantizer and at 666 is a fixed back stage vector quantizer. Like reference characters designate like or the corresponding parts through FIGS. 39 and 42. FIG. 43 shows the constitution of the dynamic front stage vector quantizer employed in this embodiment of the present invention and FIG. 47 shows the constitution of the fixed back stage vector quantizer employed in this embodiment of the present invention. In FIGS. 43 and 47, indicated at 667 is an input vector register, at 668 is an output vector register, at 669 is a dynamic output vector code table, at 662 is a parallel subtracter, at 621 is a parallel magnitude arithmetic and logic unit, at 622 is a code table address counter, at 623 is a magnitude distortion arithmetic and logic unit, at 624 is a nonlinear minimum distortion detector, at 625 is an index latch, at 626 is a vector latch, at 627 is a minimum distortion detector, at 628 is a differential output vector code table, at 629 is a mean value separation amplitude normalization circuit and at 663 is a significant block decision circuit. The operation of this dynamic multistage vector quantizer embodying the present invention will be described hereinafter in connection with FIG. 42.

Blocks each of a plurality of block scan picture signal input signals 603 processed through A/D conversion and raster/block scan conversion are sent to the dynamic front stage vector quantizer 655 and the subtractor 660. The dynamic front stage vector quantizer 655 produces a dynamic output vector on the basis of the picture input signal 603 and the regenerative picture signal 618 of the preceding frame and forms a predictive picture signal 613 corresponding to the position of the block of the picture input signal 603 on the scene through vector quantization and gives the same to the subtractor 660 and, at the same time, a front output vector index 612 to the variable-length encoder 690. Every plurality of the output signals of the subtractor 660, i.e., inter-frame differential picture signals 614 are blocked and are processed by the fixed back stage vector quantizer 666 for mean value separation amplitude normalization and vector quantization. The fixed back stage vector quantizer 666 sends a differential output vector as an inter-frame differential vector quantized picture signal 616 together with mean value information and amplitude information to the adder 680 and sends a differential output vector index 615 together with the mean value information and the amplitude information to the variable-length encoder 690. The adder 680 adds the predictive picture signal 613, which is one of the output signals of the dynamic front vector quantizer 655, and the inter-frame differential vector quantized picture signal 616, which is one of the output signals of the fixed back stage vector quantizer 666, to send a regenerative picture signal 617 to the frame memory 630.

Since all those dynamic multistage vector quantization processes are executed for each block, the sample sequence within each block is defined as a picture element vector. The principle of vector quantization on which this embodiment is based will be explained hereunder.

Suppose $R_1, R_2, \ldots, R_N$ are N partitions of $R^k$ for an input vector $\underline{x} = [x_1, x_2, \ldots, x_k]$ in k-dimensional signal space $R^k$, $Y = [\underline{y}_1, \underline{y}_2, \ldots, \underline{y}_N]$ is a set of input vectors $\underline{y}_i = [y_{i1}, y_{i2}, \ldots, y_{ik}]$, which are the output points in a partition $R_i$, and $I = [1, 2, \ldots, N]$ is an index set for $\underline{y}_i$. Then, vector quantization $V_Q$ is expressed by a cascaded connection of coding C and decoding D:

$V_Q(\underline{x}) = \underline{y}_i$ if $\underline{x} \in R_i$

C: $\underline{x} \to i$ if $d(\underline{x}, \underline{y}_i) < d(\underline{x}, \underline{y}_j)$ for all j D: $i \to \underline{y}_i$.

The distortion measure $d(\underline{x}, \underline{y}_i)$ indicates the distance between the input and the output vector within k-dimensional signal space and, for example, the magnitude distortion measure is given by $$d(\underline{x}, \underline{y}_i) = \sum_{j=1}^{k} |x_j - y_{ij}|.$$

Figure 44:
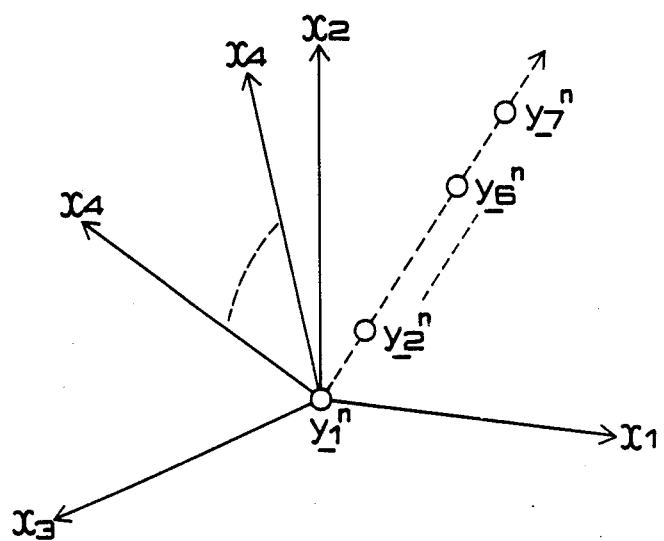
FIG. 44 is a graphical illustration showing the arrangement of fixed output vectors in multi-dimensional space.

In this condition, the data rate of the index i, i.e., the vector quantization coded output, is $K^{-1}\log_2 N$ bit/picture element. Accordingly, vector quantization achieves highly efficient coding through coding process using the input vector $\underline{x}$ and the index of the output vector $\underline{y}_i$ providing a minimum distortion min $d(\underline{x}, \underline{y}_i)$. Decoding is attained merely by converting the coded signal into an output vector $\underline{y}_i$ corresponding to the index i. The set Y of the output vectors $\underline{y}_i$ is obtained through the clustering training of actual input vectors $\underline{x}$ or from a predetermined probability model. FIG. 44 shows the relation between the input and the output vectors.

Figure 45:
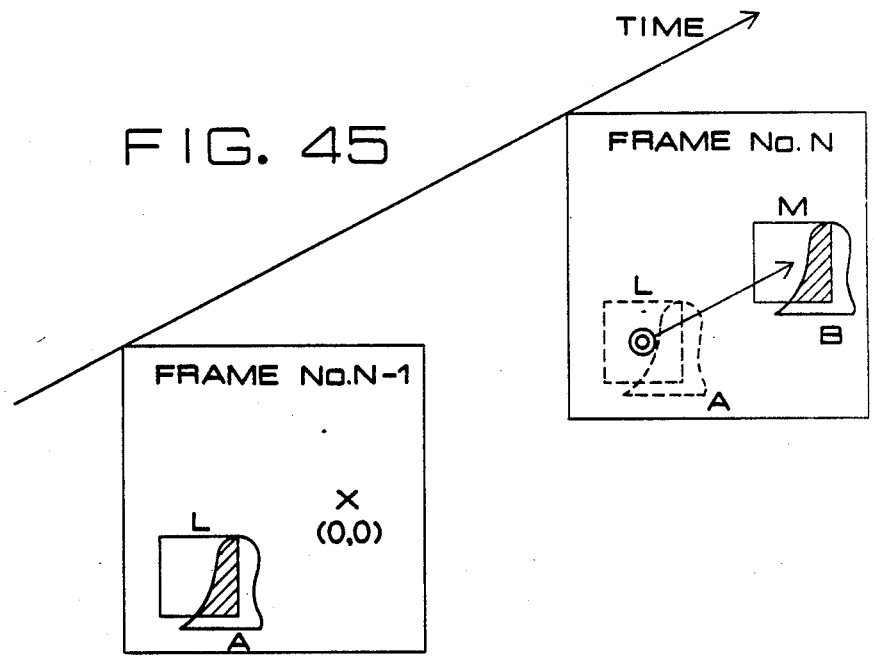
FIGS. 45 and 46 are explanatory representations showing an example of a rewritable output vector code table producing method.
Figure 46:
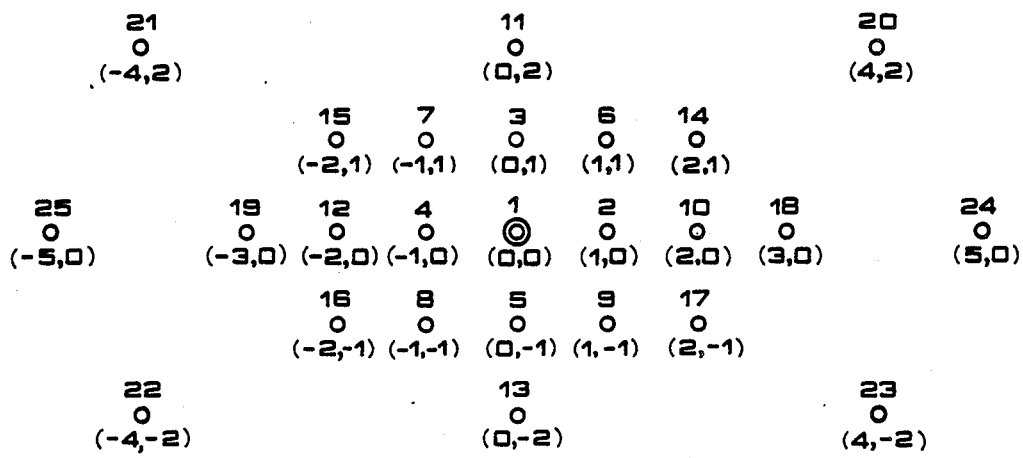

The action of the dynamic front stage vector quantizer 655 will be described hereinafter in connection with FIGS. 43, 44, 45 and 46. The dynamic front stage vector quantizer 655 processes the output signals 618 of the frame memory storing the regenerative picture signals of the preceding frame to produce sequentially dynamic output vector code tables 669, detects an output vector which provides the minimum distortion between the input and the output vectors and forms a predictive picture signal 613. The dynamic output vector code table 669 comprises a fixed output vector code table and a rewritable output vector code table having contents which is updated at every block processing. The content of the fixed output vector code table is a set $[\underline{y}^n]$ of seven mean value vectors (vectors with the same vector elements) arranged as shown in FIG. 44. The rewritable output vector code table is produced and updated through the following process. As shown in FIG. 45, in the vector quantization of a block M in a frame No. N, with the center (point X) of the block of regenerative signals of the preceding frame (frame No. N−1) on the scene locating at the same position as that of the block M as origin (0, 0), the center of each block constitutes a plurality of shift blocks from block 1 to block 25 arranged as shown in FIG. 46. A set $[\underline{y}^m]$ of these blocks and the set $[\underline{y}^n]$ of the mean value vectors are indexed as sets of dynamic output vectors and registered in the dynamic output vector code table. The arrangement of the shift blocks as shown in FIG. 46 is arbitrary. Every k picture input signal sequences 603 are blocked and the block of the picture input signal sequences is latched as an input vector $\underline{x} = [x_1, x_2, \ldots, x_k]$ by the register 667. The code table address counter 622 first reads sequentially the output vectors $\underline{y}_i^m$ in the rewritable output vector code table from the dynamic output vector code table 669. The output vectors $\underline{y}_i^m$ are latched by the register 688. The magnitude distortion arithmetic unit 623 receives the outputs of the parallel subtractor 662 and the parallel magnitude arithmetic unit 621 and calculates distortions $d_i$ between the input and the output vectors by the use of a formula $$d_i = d(\underline{x}, \underline{y}_i^m) = \sum_j |x_j - y_{ij}^m|.$$

The nonlinear minimum distortion detector 624 executes, for example, the following process. First the minimum distortion d among all the $d_i (i = 1, 2, \ldots, 25)$ is detected. The minimum distortion $$d = \min_i d_i$$

The process is divided into three processes for three cases respectively on the basis of the relation between the value of d and thresholds $T_1$ and $T_2$.

| | |
|---|---|
| When $d > T_1$ | Process ①  |
| $T_2 \leq d \leq T_1$ | Process ② |
| $d_1 < T_2$ | Process ③ |

The Process ① decides that any appropriate output vector for the input vector is found in the output vector code table and changes over to the fixed output vector code table, reads output vectors $y_i^m$ sequentially from the fixed output code table and executes the above-mentioned distortion calculation to obtain a new minimum distortion d. The Process ② adopts the previously obtained d as a minimum distortion. The Process ③, to avoid noise causing minimum distortion error, defines minimum distortion d by $$d = d_1 = d(x, y_1^m) = \sum_j |x_j - y_1^m{}_j|$$

and adopts the distortion from a vector consisting of the picture elements of a block 1 located with a point (0, 0) on the scene of the frame No. N-1, i.e., the point (0, 0) in FIG. 46, as the center.

After the minimum distortion has been detected, strobing signals are sent to the latches 625 and 626. Then, the latch 625 gives an output vector index 612 indicating the address of the output vector, while the latch 626 makes the output vector $y_i^m$ or $y_i^n \cdot y_1^m$ become the vector quantized output of the vector x and gives the predictive picture signal 613.

The information sent out from the dynamic front vector quantizer to the transmission line is an output vector index and the maximum amount of information is $$\log_2(I+J)/K [\text{bit/pel}]$$

where J is the number of fixed output vectors, I is the number of rewritable output vectors and K is the number of dimensions of the vectors. For example, when I=25, J=7 and K=64 (block size: 8×8), an amount of information $$\log_2(25+7)/64 = 0.08 [\text{bit/pel}] \text{ or less}$$

is given by the dynamic front vector quantizer.

The action of the fixed back stage vector quantizer 666 will be described hereunder in connection with FIG. 47. Every k inter-frame differential signals 614, namely, the outputs of the subtractor 660, are blocked and given in the form of a differential input vector $\underline{\epsilon} = [\epsilon_1, \epsilon_2, \ldots, \epsilon_k]$. The differential input vector $\underline{\epsilon}$ is processed through mean value separation normalizing process by the mean value separation normalizing circuit 629 using a mean value $\mu$ and an amplitude $\sigma$ defined by the following formulas to obtain an input vector $e = [e_1, e_2, \ldots, e_k]$.

$$\mu = K^{-1} \sum_{j=1}^{k} \epsilon_j$$

$$\sigma = K^{-1} \sum_{j=1}^{k} |\epsilon_j - \mu|$$

$$e_j = (\epsilon_j - \mu)/\sigma \quad (j = 1, 2, \ldots, k)$$

The amplitude may be calculated by the use of the following formulas.

$$\sigma = \left[ K^{-1} \sum_{j=1}^{k} (\epsilon_j - \mu)^2 \right]^{\frac{1}{2}}$$

$$\sigma = \max_j |\epsilon_j - \mu|$$

Through mean value separation normalization process, the input vectors can be distributed at random within a limited region of k-dimensional signal space, and thereby vector quantization efficiency is improved. In implementing this process, sets of output vectors need to be prepared on the basis of the distribution of the input vectors processed through mean value separation normalizing process. After the output vectors have been read in the decoding section, processes reverse to mean value separation normalization, such as amplitude regeneration and mean value regeneration, need to be implemented. Naturally, vector quantization may be a vector quantization without this process. Differential output vectors prepared through clustering training using the mean value separation normalized input vectors are stored beforehand in the differential output vector code table 628. When the mean value separation normalized vector e is given, the code table address counter 622 gives sequentially the indices of the vectors of the differential output vector code table to read differential output vectors $\underline{y}_i^e = [y_{i1}^3, y_{i2}^e, \ldots, y_{ik}^e]$ (i: index) from the differential output vector code table 628 and gives the same to the register 688. The same operation as the distortion calculation in the dynamic movement vector quantizer is implemented to detect a differential output vector providing the minimum distortion from the mean value separation normalized input vector. Since the differential input vectors $\underline{\epsilon}$ are blocked inter-frame differential signals, the center of distribution thereof is a zero vector. Accordingly, the amount of data to be transmitted can be reduced greatly by setting a threshold not to transmit the information of the indices, mean values and amplitudes of input vectors distributed near the zero vector. The significant block decision circuit 663 decides, on the basis of the mean value $\mu$ and the amplitude $\sigma$, whether or not the blocks of the differential signal sequences are significant, namely, whether the blocks of the differential signal sequences need to be transmitted as information. A method of this decision is, with $T_\theta$ as a threshold, when $\mu > T_\theta$ or $\sigma > T_\theta$ the block is significant and when $\mu \leq T_\theta$ and $\sigma \leq T_\theta$ the block is not significant.

When significant, the significant block decision circuit gives the differential output vector $\underline{y}_i^e$ providing the minimum distortion, the mean value $\mu$ and the amplitude $\sigma$ as the inter-frame differential vector quantized picture signal 616 to the adder 680 and the latch 625 gives signals indicating a significant block, i.e., the index of the differential output vector minimizing the distortion, the mean value $\mu$ and the amplitude $\sigma$ to the variable-length encoder 690. When not significant, the significant block decision circuit 663 gives the zero vector and the latch 625 gives only a signal indicating insignificant block.

The output of the encoder thus given includes the output vector index, the differential output vector index and the variable-length coded signal 619 produced by processing the information of the mean value and the amplitude through variable-length coding.

Suppose a certain blocked input picture signal sequences 603 in the frame No. N is a signal source vector $S_N = \{S_1, S_2, \ldots, S_k\}_N$, the block of the predictive picture signal 613 given by the dynamic front vector quantizer is $\hat{S}_N$, the block of inter-frame differential picture signals is $\underline{\epsilon}_N$, the block 616 of the inter-frame differential vector quantized picture signals given by the fixed back stage vector quantizer is $\hat{\underline{\epsilon}}_N$ and the block of the regenerative picture signal sequences is $\underline{\hat{S}}_N$. Then the general action of the encoder is given by the following formulas.

$$\underline{\epsilon}_N = S_N - \hat{S}_N$$

$$\hat{\underline{\epsilon}}_N = \underline{\epsilon}_N + \underline{q}$$

$$\underline{\hat{S}}_N = \hat{S}_N + \hat{\underline{\epsilon}}_N = (S_N - \underline{\epsilon}_N) + (\underline{\epsilon}_N \underline{q}) = S_N + \underline{q}$$

where $\underline{q}$ is a fixed back stage vector quantization error. Accordingly, the smaller the fixed back stage vector quantization error $\underline{q}$ the more the regenerative picture signal approaches the input picture signal.

Figure 48:
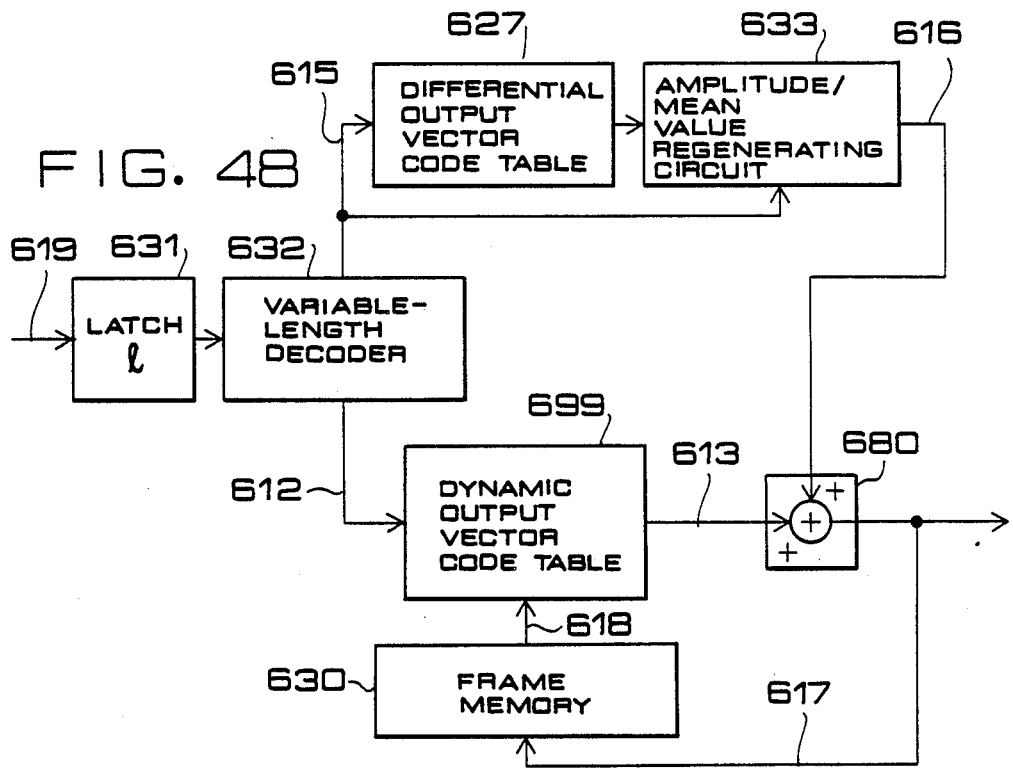
FIG. 48 is a block diagram showing the constitution of the decoder of a vector quantizer embodying the present invention.

The constitution and the action of the decoder of the dynamic multistage vector quantizer embodying the present invention will be described hereinafter. FIG. 48 shows the decoder, in a preferred embodiment, of the dynamic multistage vector quantizer. In FIG. 48, indicated at 631 is a latch, at 632 is a variable-length decoder and at 633 is a mean value and amplitude regenerating circuit. Like reference characters designate like or corresponding parts through FIGS. 42, 43, 44 and 48. The decoder receives the output signal 619 of the encoder by the latch 631 and the variable-length decoder 632 separates the code signals into two parts and regenerates the dynamic output vector index 612 m significance signal, the insignificance signal, the differential output vector index, the mean value $\mu$ and the amplitude $\sigma$ 615 by decoding. The variable-length decoder 632 also reads an output vector corresponding to the output vector index from the dynamic output vector code table 669 and regenerates the predictive picture signal 613. On the other hand, when the significance signal is received, the variable-length decoder 632 reads a differential output vector corresponding to the differential output vector index. The amplitude and mean value regenerating circuit 633 multiplies the differential output vector by the amplitude and adds the mean value to regenerate the inter-frame differential vector quantized picture signal 616. For this purpose, a dynamic output vector code table and a differential output vector code table produced through the same process employed in the encoder section are used. The adder 680 calculates the sum of the regenerated predictive picture signal 613 and the inter-frame differential vector quantized picture signal 616 to give a regenerated picture signal 617 as an output picture signal. Furthermore, the regenerated picture signal 617 is stored in the frame memory 630 and is used as information for the decoding process for the next frame.

A seventh embodiment of the present invention will be described hereinafter.

This embodiment is an inter-frame vector quantizer capable of performing highly efficient coding of picture signals by the use of the correlation between picture signals in consecutive scenes.

Prior to the concrete description of this embodiment, the fundamental constitution of the inter-frame vector quantizer will be explained. FIG. 49 is a block diagram showing the constitution of an encoder. In FIG. 49, indicated at 701 is a digitized picture signal sequence, at 702 is a raster/block scan converter for blocking every plurality of picture signal sequences 701 arranged along the direction of raster scanning, at 703 is blocked picture signal sequence, at 704 is a subtracter, at 705 is the predictive error signal sequence of the blocked picture signal, at 706 is a movement detection vector quantized encoder, at 707 is a vector quantization coded output, at 708 is a vector quantization decoder, at 709 is a vector quantization decoded output, i.e., a regenerative predictive error signal sequence, at 710 is an adder, at 711 is a block of regenerated picture signal sequences, at 712 is a frame memory, at 713 is a block of regenerative picture signal sequences delayed by a one-frame cycle and also is a block of predictive signal sequences for predicting the block 730 of picture signal sequences, at 714 is a transmission buffer, at 715 is a feedback control signal and at 716 is the output of the encoder. FIG. 50 shows the details of an exemplary constitution of the vector quantization encoder 706. In FIG. 50, indicated at 717 is a mean value separating circuit, at 718 is an amplitude normalizing circuit, at 719 is the inter-frame difference of the block of picture signal sequences normalized with respect to amplitude after separating the mean value, at 720 is a mean value calculated by the mean value separating circuit 717, at 721 is the amplitude calculated by the amplitude normalizing circuit 718, at 722 is a movement detection circuit for deciding, on the basis of the mean value 720 and the amplitude 721, whether or not the blocked picture signal sequences which are presently being processed have made any significant movement with respect to the block of picture signal sequences located at the same position in the one-frame cycle preceding frame, at 723 is the decision signal given by the movement detection circuit 722, at 724 is a code table address counter, at 725 is a code table index, at 726 is an output vector code table memory, at 727 is a code table output vector, at 728 is a distortion calculating circuit, at 729 is a minimum distortion detecting circuit, at 730 is a signal indicating the minimum distortion and at 731 is a transmission latch.

Figure 51:
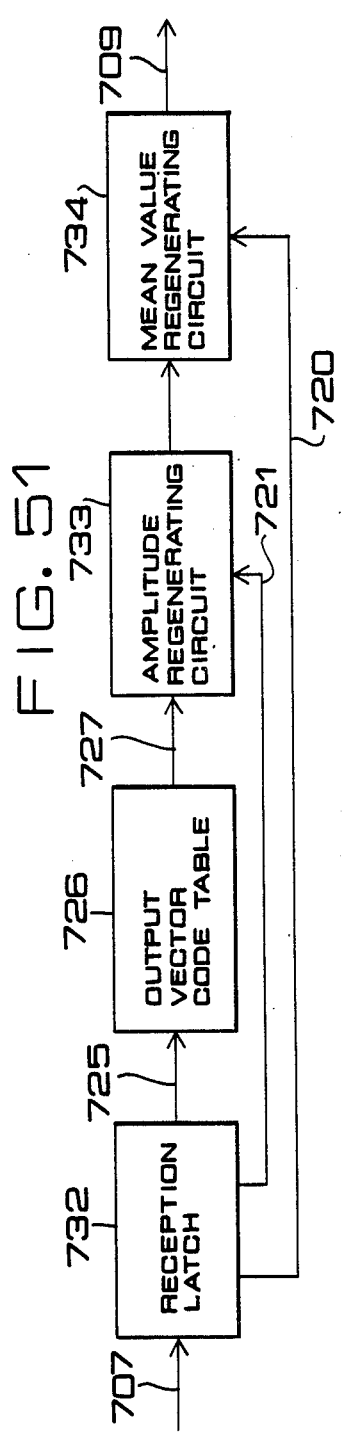
FIG. 51 is a block diagram showing the constitution of the vector quantization decoder of FIG. 49.

FIG. 51 shows the details of the constitution of the vector quantization decoder 708. In FIG. 51, indicated at 732 is a reception latch, at 733 is an amplitude regenerating circuit and at 734 is a mean value regenerating circuit.

Figure 52:
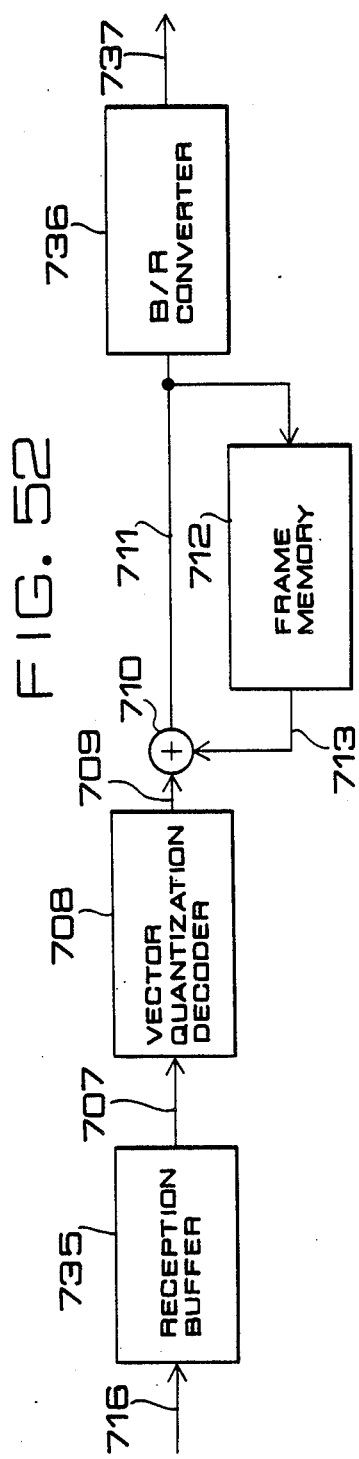
FIG. 52 is a block diagram showing the constitution of the decoder of an inter-frame vector quantizer.

FIG. 52 shows an exemplary constitution of the decoder. In FIG. 52, indicated at 735 is a reception buffer, at 736 is a block/raster scan converter which acts reversely to the raster/block scan converter 702 and at 737 is a regenerated picture signal sequences.

Figure 53:
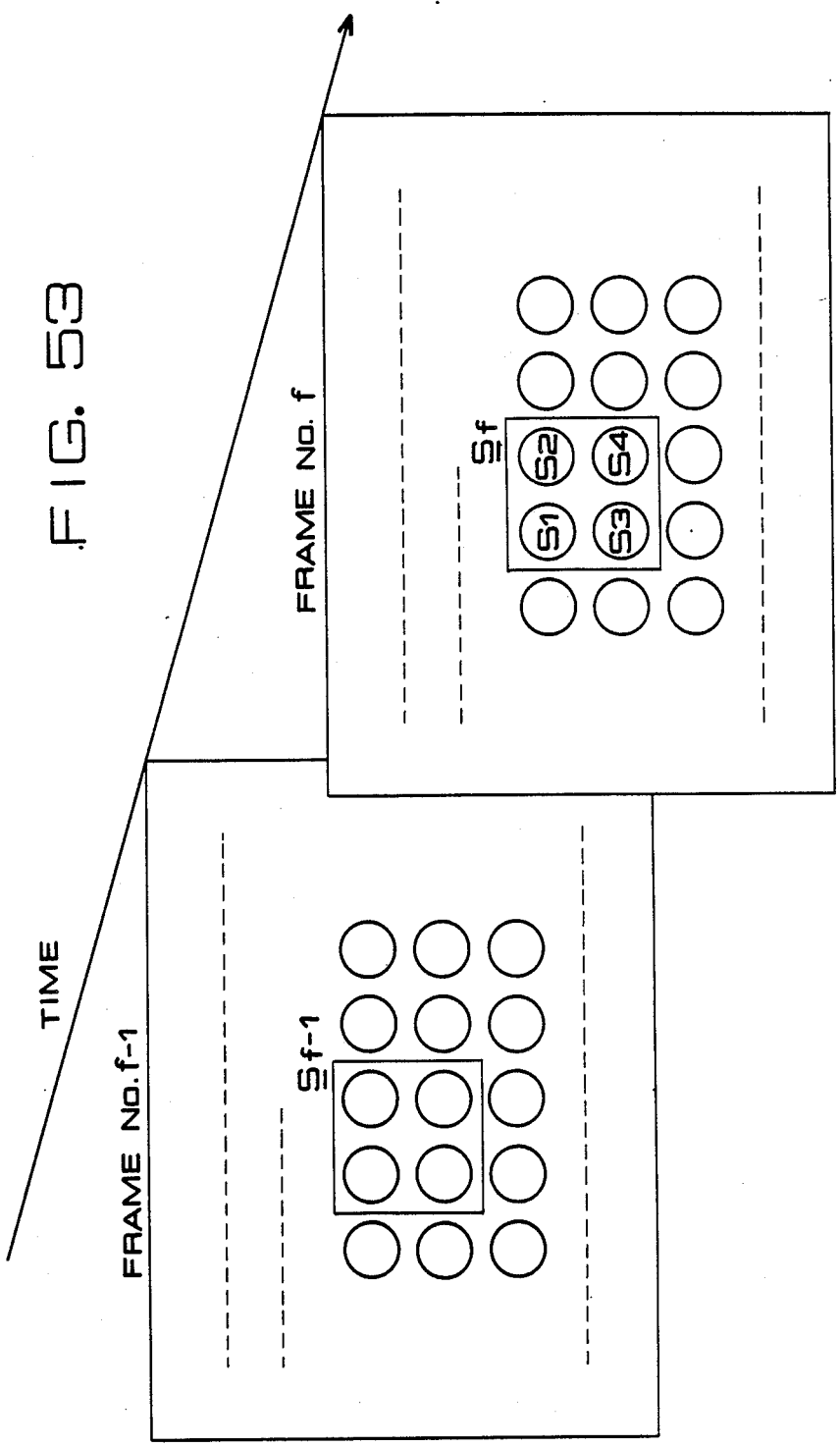
FIG. 53 is an explanatory representation for the explanation of a picture signal blocking process.
Figure 55:
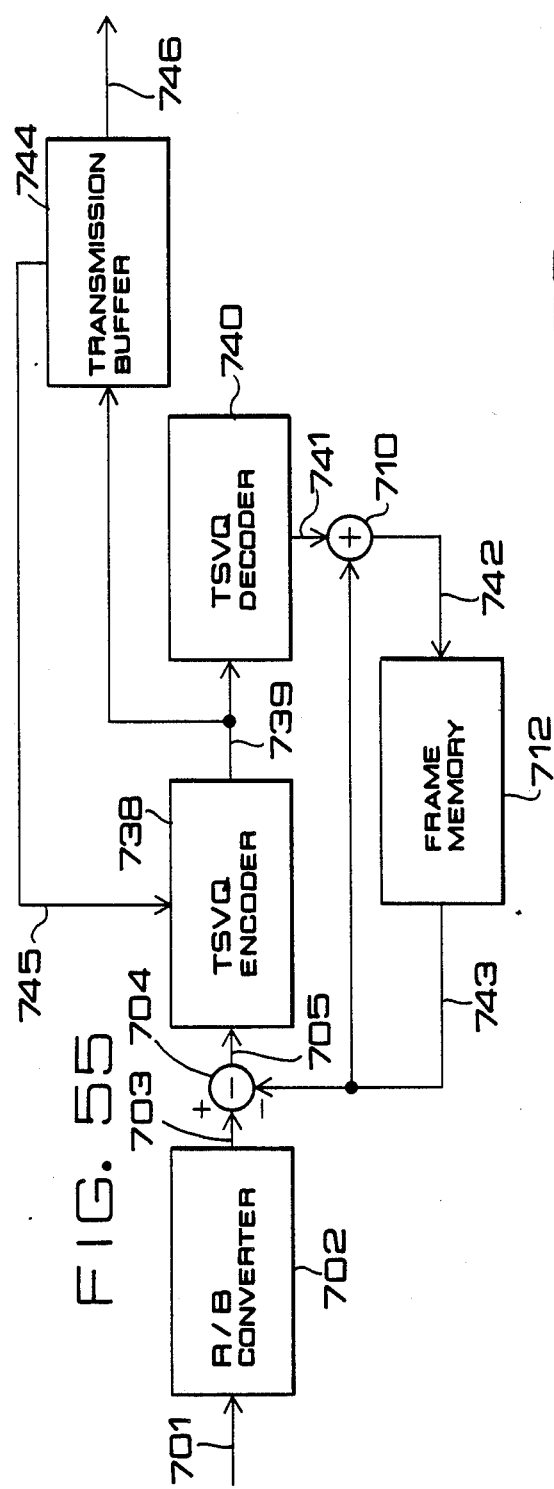
FIG. 55 is a block diagram showing the constitution of the encoder of a serial approximation vector quantizer embodying the present invention.

The actions of the components will be described hereinafter. First the general actions of the encoder will be described in connection with FIG. 49. Basically, this encoder is based on the conception of the inter-frame DPCM system. On a scene, the digitized picture signal sequences 701 are regarded as square lattice samples, however, the input is given in an order along the raster scanning direction. The raster/block scan converter 702 partitions the picture signal sequences 701 in blocks as shown in FIG. 53 and provides these blocks as output signal. Suppose the blocked picture signal sequences 703 of a frame No. f is expressed by a signal source vector $S_f = \{S_1, S_2, \ldots, S_k\}_f$. In FIG. 55, k=5. Further, suppose the differences 705 between the signal source vectors 703 and the blocks 713 of the predictive signal sequences calculated by the subtractor 704 is $\epsilon_f$, the blocks 709 of the regenerative differential signal sequences formed by the vector quantization encoder 706 and the vector quantization decoder 708 is $\hat{\epsilon}_f$ and the predictive signal sequences 713 given by the frame memory 712 is $P_f$. Then, the general actions of the encoder shown in FIG. 51 are expressed by $$\left. \begin{array}{l} \epsilon_f = S_f - P_f \\ \hat{\epsilon}_f = \epsilon_f + Q \\ \hat{S}_f = P_f + \hat{\epsilon}_f = S_f + Q \\ P_f = S_f \cdot Z^{-f} \end{array} \right\} \quad (1)$$

where Q is a vector quantization error and $Z^{-f}$ is a delay of one-frame cycle caused by the frame memory 712. Accordingly, $P_f$ is equal to the regenerative signal sequence $\hat{S}_{f-1}$ of the block $S_{f-1}$ of picture signal sequences one-frame cycle before the signal source vector 703, namely, the picture signal sequence at the same position in the frame No. f−1. The vector quantization coded output 707 obtained through the above-mentioned process is the difference between the signal source vector 703 and the block 713 of the predictive signal sequences namely, a result of data-compression of the block $\epsilon_f$ 705 of the predictive error signals by the vector quantization encoder 706 and the output 707 is given to the transmission buffer 714, and then given to the transmission line as the encoder output 716. The actions of the vector quantization encoder 706 and the vector quantization decoder 708 will be described in connection with FIGS. 50 and 51. In vector quantization, a block composed of k pieces of samples (k is the plural number) is regarded as an input vector in k-dimensional signal space, output vectors which have minimum distortion with respect to input vectors which are given sequentially are selected from a set of output vectors prepared previously on the basis of the probability distribution of input vectors so that the distortion with respect to the input vector is generally minimized, and the indices attached to the selected output vectors are quantized and given as outputs. In the decoding section, output vectors corresponding to the indices are read from the same set of output vectors prepared also in the decoding section. The input vector given is the block $\epsilon_f = \{\epsilon_1, \epsilon_2, \ldots, \epsilon_k\}_f$ 705 of the predictive error signals. The mean value separating circuit 717 substracts the mean value $\mu$ 720 operated by the use of a formula $$\mu = K^{-1} \sum_{j=1}^{k} \epsilon_j \quad (2)$$

from the block $\epsilon_f$ 705, the amplitude normalizing circuit 718 normalizes the output of the mean value separating circuit 717 by the amplitude $\sigma$ 721 calculated by the use of a formula $$\sigma = K^{-1} \sum_{j=1}^{k} |\epsilon_j - \mu| \quad (3)$$

to form a mean value separation normalized input vector $\underline{X} = \{X_1, X_2, \ldots, X_k\}$ 719. That is, $$X_j = (\epsilon_j - \mu)/\sigma \, (j = 1, 2, \ldots, k) \quad (4)$$

The amplitude may be calculated by formulas other than formula (3), such as, for example, $$\sigma = \left[ K^{-1} \sum_{j=1}^{k} |\epsilon_j - \mu|^2 \right]^{\frac{1}{2}} \quad (5)$$

$$\sigma = \max_{j} |\epsilon_j - \mu|$$

Through the mean value separation normalizing process, the input vectors can be distributed at random within a limited range in k-dimensional signal space, and thereby the efficiency of vector quantization is improved. In implementing the mean value separation normalizing process, the set of output vectors needs to be prepared on the basis of the distribution of the input vectors processed through the mean value separation normalizing process and, after the output vectors have been read in the decoding section, processes reverse to the mean value separation normalizing process, such as amplitude regeneration and mean value regeneration, need to be implemented. Naturally, vector quantization may be such a vector quantization omitting those reverse processes. Mean value separation normalized output vectors prepared on the basis of the probability distribution density of the mean value separation normalized input vector so that the distortion from the mean value separation normalized input vectors is generally minimized are written previously in the output vector code table memory 726. When a mean value separation normalized input vector $\underline{X}$ 719 is given, the code table address counter 724 sequentially gives indices of vectors stored in the output vector code table memory 726, i.e., code table addresses 725, to read the mean value separation normalized output vectors $\underline{y}_\tau = \{y_{\tau 1}, y_{\tau 2}, \ldots, y_{\tau k}\}$ ($\tau$=index) 727 from the output vector code table memory 726. The distortion calculating circuit 728 calculates the difference between the mean value separation normalized input vector $\underline{S}$ 719 and the mean value separation normalized output vector $\underline{y}_\tau$ 727. Several distortion calculating methods are available, for example, such as those shown below.

$$d(\underline{X}, \underline{y}_\tau) = \sum_{j=1}^{k} |X_j - y_{\tau j}| \quad (6)$$

$$d(\underline{X}, \underline{y}_\tau) = \sum_{j=1}^{k} |X_j - y_{\tau j}|^2$$

$$d(\underline{X}, \underline{y}_\tau) = \max |X_j - y_{\tau j}|$$

where $d(\underline{X}, \underline{y}_\tau)$ is distortion. The minimum distortion detecting circuit 729 gives a strobing signal 730 when a distortion $d(\underline{X}, \underline{y}_\tau)$ which is smaller than the past minimum distortion is found. At the same time, the latch 731 stores the index 725. At a stage where the code table address counter has given all of a series of indices, the index i of a mean value separation normalized output vector which minimizes distortion from the mean value separation normalized input vector is stored in the latch 731. The index, the mean value $\mu$ 720 and the amplitude $\sigma$ 721 form the vector quantization coded output. The data is compressed further by the use of the correlation between successive scenes. Since the input vectors are blocked predictive error signals, the input vectors are distributed around a zero vector. The amount of data can be reduced considerably by setting a threshold to regard input vectors distributed near the zero vector as zero vectors and providing neither index, mean value nor amplitude. The movement detecting circuit 722 receives the mean value $\mu$ 720 and the amplitude $\sigma$ 721 and decides whether or not the block of the predictive error signal sequences can be regarded as a zero vector, namely, whether the present block has made any significant variation (movement) with respect to the corresponding block in the one-frame cycle preceding frame. This decision is made by examining the mean value and the amplitude with respect to a threshold $T_\theta$ as when $\mu \leq T_\theta$ and $\sigma \leq T_\theta$, significant movement has not been made and when $\mu > T$ or $\sigma > T_\theta$, significant movement has been made.

Accordingly, the latch 731 gives only a signal indicating "no movement" when a code indicating "no movement" is given as the result 723 of movement detection and gives the index 725, the mean value 720 and the amplitude 721 in addition to a signal indicating "movement" as a vector quantization coded output signal 707. The transmission buffer 714 keeps monitoring the amount of information transmitted and gives a feedback control signal 715 to control the threshold $T_\theta$. Thus the amount of information transmitted is controlled. In the vector quantization decoder 708, the latch 732 receives the vector quantization coded output 707. Upon the reception of a signal indicating "movement", the latch 732 reads a mean value separation normalized output vector $y_\tau$ 727 from the output code table memory 726 according to the index i 725. The amplitude regenerating circuit 733 multiplies the mean value separation normalized output vector 727 by the amplitude 721 and the mean value regenerating circuit adds the mean value 720 to the output of the amplitude regenerating circuit 733 and gives an output vector, namely, regenerated predictive error signal sequences $\hat{\epsilon}_f$ 709. That is, $$\hat{\epsilon}_f = \sigma \cdot y_{\tau j} + \mu (j=1, 2, \ldots, k) \quad (7)$$

Upon the reception of a signal indicating "no movement", the latch 731 gives zero for the mean value 720 and amplitude 721. In this case, the output vector is a zero vector. The operation of the decoder will be described in connection with FIG. 52. The reception buffer 735 receives the encoder output 716 and decodes the vector quantization coded output signal 707. The vector quantization decoder 708 decodes, as described above, the output vector, i.e., the predictive error signal sequences $\epsilon_f$ 709, and the adder 710 and the frame memory 712 regenerate the block $\hat{S}_f$ 711 of regenerated picture signal sequences through operation based on the following formulas, $$\left. \begin{array}{l} \hat{S}_f = \underline{P}_f + \hat{\epsilon}_f = S_f + Q \\ \underline{P}_f = \hat{S}_f \cdot Z^{-f} \end{array} \right\} \quad (8)$$

where $Q$ is vector quantization error and $Z^{-f}$ is a delay of one-frame cycle. The block/raster converter 736 scans in the raster scanning direction and converts the blocked regenerated picture signal sequences $\hat{S}_f$ 711 to provide regenerated picture signal sequences 737.

The constitution as described hereinbefore of this basic inter-frame vector quantizer has problems such that the threshold $T_\theta$ becomes large to stabilize the amount of information, when the picture varies sharply and, consequently, the region changed from that of the preceding scene remains as in the preceding scene with some blocks, and thereby the boundary between blocks becomes conspicuous.

Figure 54:
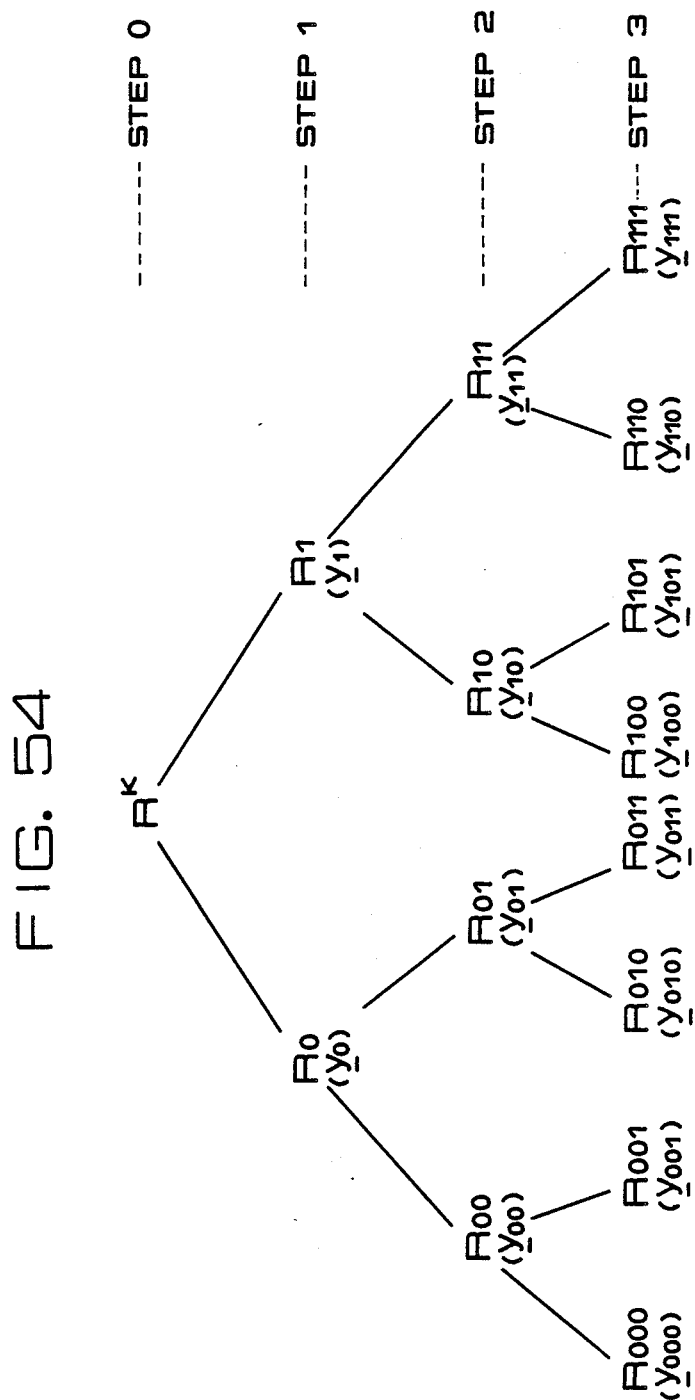
FIG. 54 is an explanatory representation of a tree search vector quantitation.
Figure 56:
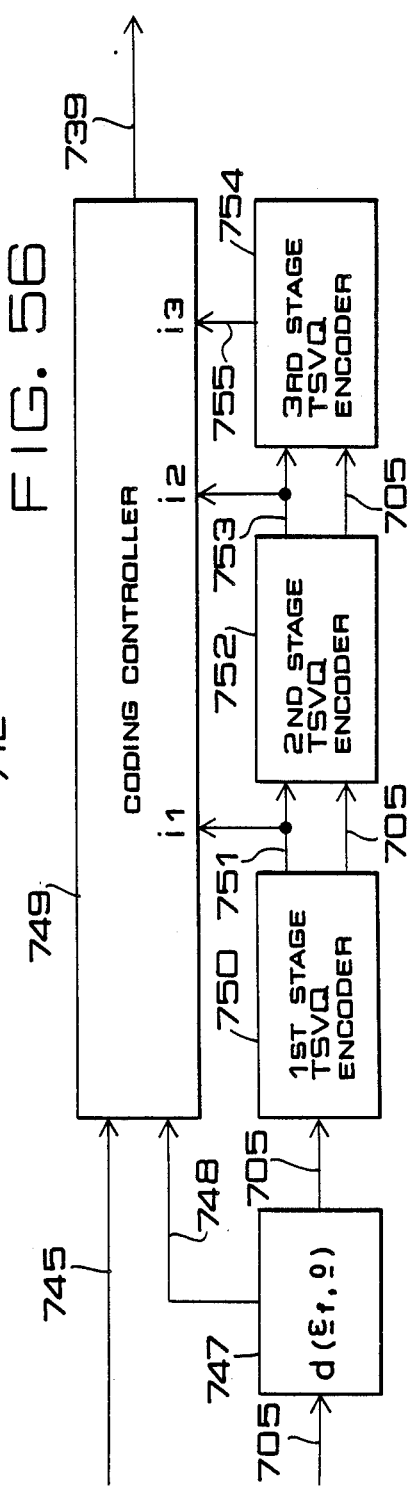
FIG. 56 is a block diagram showing the constitution of the TSVQ encoder of FIG. 55.
Figures 57, 58, 59:
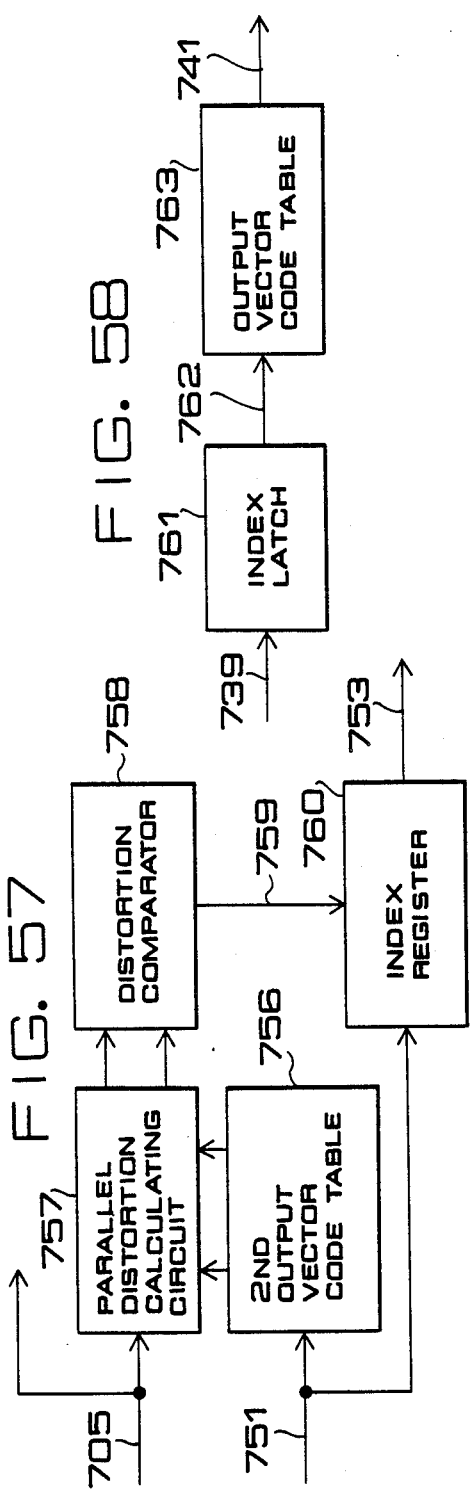
FIG. 57 is a block diagram showing the constitution of the second-stage TSVQ encoder of FIG. 56.
FIG. 58 is a block diagram showing the constitution of the TSVQ decoder of FIG. 56.
FIG. 59 is a block diagram showing the constitution of the decoder of a serial vector quantizer.

The embodiment of the present invention based on the basic principle will be described in connection with the accompanying drawings. Consider a binary tree as shown in FIG. 54. The root of the tree and each node correspond to k-dimensional signal space $R^k$ and to a space formed by partitioning $R^k$ in steps respectively. Each node has a representative point, which is the output vector of k dimensions. The output vectors of each step are produced on the basis of the distribution of input vectors so that the total sum of distortions between the input vectors and the output vectors is minimized. That is, the stepped partition of the space is made on the basis of the distribution of input vectors in $R^k$. When an input vector is given, an output vector corresponding to the last node is selected by comparing the distortions of two output vectors branched from a node from the input and selecting a branch leading to an output vector having a smaller distortion from the input vector, from the first step through the last step. When the last step is the $n^{th}$ step, the binary tree has $2^n$ nodes in the last step. In FIG. 54, n=3. The description given above explains the principle of tree search vector quantization (TSVQ). FIG. 57 shows an exemplary constitution of an encoder according to the present invention. In FIG. 55, indicated at 701 are digitized picture signal sequences, at 702 is a raster/block scan converter, at 703 are blocked picture signals, at 704 is a subtractor, at 705 is a block of predictive error signals, at 738 is a TSVQ encoder based on the above-mentioned principle, at 739 is a TSVQ encoder output, at 740 is a TSVQ decoder, at 741 is a TSVQ decoder output, at 710 is an adder, at 742 is a block of regenerated picture signals, at 712 is a frame memory, at 743 is an output of the frame memory 712, i.e., a block of predictive signals, at 744 is a transmission buffer, at 745 is a feedback control signal and at 746 is an encoder output. FIG. 56 shows the details of an exemplary constitution of the TSVQ encoder 738. In FIG. 56, indicated at 747 is a limiter which measures the distance between an input vector and the origin and quantizes the input vector into a zero vector when the distance is smaller than a threshold, at 748 is a zero vector detection signal given when an input vector is quantized into a zero vector by the limiter 747, at 749 is a coding controller, at 750 is a first-stage TSVQ encoder, at 751 is an output vector index given at a stage where the search has been made as far as the first-stage TSVQ encoder, at 752 is a second-stage TSVQ encoder, at 753 is an output vector index given at a stage where search has been made as far as the second-stage TSVQ encoder 752, at 754 is a third-stage TSVQ encoder and at 755 is an output vector index given at a stage where the search has been made as far as the third-stage TSVQ encoder 754. FIG. 57 shows the further details of an exemplary constitution of the second-stage TSVQ encoder 752. In FIG. 57, indicated at 756 is a second-stage output vector code table memory, at 757 is a parallel distortion calculating circuit, at 758 is a distortion comparator, at 759 is a resultant signal of comparison given by the distortion comparator 758 and at 760 is an index register. FIG. 58 shows an exemplary constitution of the TSVQ decoder 740. In FIG. 58, indicated at 761 is an index latch, at 762 is an output vector index and at 763 is an output vector code table memory. FIG. 59 shows an exemplary constitution of a decoder according to the present invention. In FIG. 59, indicated at 764 is a reception buffer and at 765 are regenerated picture signal sequences.

First the operation of the encoder will be described hereunder.

Digitized picture signal sequences 701 are samples given sequentially along the direction of raster scanning. The raster/block scan converter 702 blocks every k picture signal sequences and scans and converts the blocks sequentially. Suppose the blocked picture signal sequences 703 in a frame No. f are expressed by a signal source vector $S_f = \{S_1, S_2, \ldots, S_k\}_f$. When $\epsilon_f$ is the difference 705 between the signal source vector 703 and the block 743 of predictive signals, calculated by the subtracter 704, $\hat{\epsilon}_f$ is a TSVQ decoded output formed by the TSVQ encoder 738 and the TSVQ decoder 739, i.e., a block 741 of the regenerated predictive error signals, $\hat{S}_f$ is a block of regenerated signals, and $P_f$ is a block 743 of predictive signals obtained as a block of regenerated picture signals delayed by one-frame cycle by the frame memory 713. Then, the basic actions of the encoder shown in FIG. 55 are expressed by:

$$\left. \begin{array}{l} \epsilon_f = S_f - P_f \\ \hat{\epsilon}_f = \epsilon_f + Q \\ \hat{S}_f = P_f + \hat{\epsilon}_f = S_f + Q \\ P_f = \hat{S}_f \cdot Z^{-1} \end{array} \right\} \quad (9)$$

where Q is a vector quantization error and $Z^{-1}$ is a delay of one-frame cycle caused by the frame memory 712. Basically, the encoder is constituted on the basis of the inter-frame DPCM system. The transmission buffer 744 receives a TSVQ coded output 739 and gives a coded output 746 to a transmission line. The transmission buffer 744 monitors the amount of transmitted information and controls the amount of coded data in the TSVQ encoder 738 according to the feedback control signal 745. The mode of this control, the TSVQ encoder and the TSVQ decoder will be described in connection with FIGS. 56, 57 and 58. Suppose an output vector set Y of a binary tree structure as shown in FIG. 54 is obtained. Y is formed previously on the basis of the distribution of input vectors so that the total sum of the distortions of the vectors belonging to each step of the binary tree from the input vectors is minimized. Tree search vector quantization is the repetition of comparison for distortion between paired two output vectors and an input vector to decide the paired two output vectors to be compared at the next step.

The three steps of the tree shown in FIG. 54 correspond to the first-stage TSVQ encoder 750, the second-stage TSVQ encoder 752 and the third-stage TSVQ encoder 754 of FIG. 56. The block $\epsilon_f$ 705 of predictive error signals is given as an input vector. The limiter 747 calculates the distortion of the input vector from the origin (zero vector) and regards the input vector 705 as a zero vector when the distortion is smaller than a predetermined threshold and gives a zero vector detection signal 748. This process is expressed by:

$$\text{when } d(\epsilon_f, \underline{0}) \leq T_\theta, \epsilon_f \rightarrow 0 \quad (10)$$

where $T_\theta$ is a threshold, $\epsilon_f$ is an input vector and $d(\epsilon_f, \underline{0})$ is the distortion of the input vector from the zero vector. When the distortion is greater than the threshold $T_\theta$, the input vector 705 is sent to the first-stage TSVQ encoder 750. The distortion may be defined by various ways. Several ways of defining the distortion are shown below by way of example.

$$\left. \begin{array}{l} d(\underline{a}, \underline{b}) = \Sigma |a_j - b_j|^2 \\ d(\underline{a}, \underline{b}) = \Sigma |a_j - b_j| \\ d(\underline{a}, \underline{b}) = \max_j |a_j - b_j| \end{array} \right\} \quad (11)$$

where $d(\underline{a}, \underline{b})$ is the distortion between a vector $\underline{a} = \{a_1, a_2, \ldots, a_k\}$ and a vector $\underline{b} = \{b_1, b_2, \ldots, b_k\}$. The input vectors which have not been regarded as a zero vector are processed through the first-, the second- and the third-stage TSVQ encoders for tree search vector quantization. At each stage, the distortion between the input vector and paired two output vectors assigned through the distortion comparison at the preceding stage is calculated to select one of the paired two vectors which has a smaller distortion from the input vector than the other. This information is added to the results of comparison given by the preceding stages and is sent to the next stage. At the first stage, since only one pair of output vectors is given, the result of comparison at the previous stages is neither necessary nor available. Suppose the result of distortion comparison at the first stage is $i_1$ 751. At the second stage, the distortion between the input vector and a pair of output vectors assigned on the basis of $i_1$ is calculated. The result of the calculation is added to $i_1$ to form $i_2$. The third stage receives the input vector $\epsilon_f$ and $i_2$ and gives an index $i_3$. For example, as shown in FIG. 54, suppose "zero" is assigned when the left branch is selected and "1" is assigned when the right branch is selected. Then, $i_1$, $i_2$ and $i_3$ are expressed by one-digit, two-digit and three-digit binary numbers respectively corresponding to the indices of the output vectors. In the encoder of this invention, the number of stages of tree search vector quantization is controlled variably by the feedback control signal for variable-length coding. The coding controller 749 receives the feedback control signal 745, the zero vector detection signal 748, the index $i_1$ 751, the index $i_2$ 753 and the index $i_3$ 755 and, when the input vector is regarded as a zero vector, codes a code corresponding to zero vector. When the input vector is not regarded as a zero vector, the coding controller codes $i_1$, $i_2$ or $i_3$ on the basis of the feedback control signal 745 as an output vector index. When the transmission line, namely, the consecutive approximation of the input vector at each stage, has no reserve, the output of a stage closer to the first stage is coded and, when the transmission line has a reserve, the output of the last stage is coded. The amount of information of the input of a stage closer to the first stage is smaller, therefore, the amount of information to be coded is controlled in the manner as mentioned above.

FIG. 57 shows an exemplary constitution of the second-stage TSVQ encoder 752. Output vectors corresponding to the second step of the output vector set Y are stored in the second-stage output vector code table memory 756. The second-stage output vector code table memory 752 provides a pair of output vectors assigned by the index 751 of the preceding stage.

The parallel distortion calculating circuit 757 calculates the distortions of the pair of output vectors from the input vector 705 and the distortion comparator 758 compares the distortions and gives the result of comparison as a control signal 759. Several distortion calculating methods are available as described in connection with the limiter 747. The index register 760 adds the result of distortion comparison at the second stage to the index 751 given by the preceding stage and gives a second-stage index 753. The actions of the first stage and the third stage are almost the same as that of the second stage, except that the respective output vector code table memories of the first, second and third stages store output vector sets corresponding to the first, second and third stages respectively and that the first stage is not provided with the index of the preceding stage. All the output vectors belonging to the output vector set Y and zero vectors are stored in the output vector code table memory 763 of the TSVQ decoder 740. The index latch 761 decodes the code of the zero vector or the index of the output vector on the basis of the TSVQ coded output 739 and reads a TSVQ decoded output 741 from the output vector code table memory 763. The operation of the decoder of this invention will be described in connection with FIG. 59.

The reception buffer 764 receives the encoder output 746 and decodes the TSVQ coded output 739. The TSVQ decoder 740 decodes the output vectors as described earlier and the adder 710 and the frame memory 712 regenerate the block $\hat{S}_f$ of regenerative picture signal sequences through operation given by:

$$\hat{\underline{S}}_f = \underline{P}_f \hat{\underline{e}}_f = \hat{\underline{S}}_f + \underline{Q}$$

$$\underline{P}_f = \underline{S}_f Z^{-1} \quad (12)$$

where $\underline{Q}$ is a vector quantization error, $Z^{-1}$ is a delay of one-frame cycle caused by the frame memory 712 and $\hat{\underline{e}}_f$ is a block of regenerative predictive error signals obtained as output vectors. The block/raster scan converter 736 scans the block $\hat{S}_f$ 742 along the direction of raster scanning and converts the same into a regenerated picture signal sequences 765. Although three-stage tree search vector quantization has been described by way of example, naturally, in practice, the number of stages is arbitrary and, generally, the number of stages is greater than three.

This embodiment is applicable to wide technical range relating to television transmission without being limited particularly to inter-frame coding and is also applicable to a sequential approximation quantizer capable of controlling the amount of data.

What is claimed is:

1. A vector quantizer comprising:
a vector quantization encoder including a subvector register which stores picture signal sequences to be coded, samples every N (N=a plural number) picture signal sequences in blocks to store the input picture signal sequences as input subvectors and a coding code table memory for sampling output vectors obtained previously by clustering using picture input signal sequences to form blocks of the output vectors and for reading the blocks as output subvectors, said encoder including a distortion computation circuit and a minimum distortion detector for selecting an output subvector having a minimum distortion from the input subvectors from a set of output subvectors stored in the code table memory, said encoder coding the address of the selected output subvector and giving the corresponding index of the output subvector; and
a decoder which reads the corresponding output vector by using the index given by the encoder as the address of the output vector from a decoding code table memory storing a set of output vectors obtained by clustering or the like using picture input signal sequences, and then decodes the output vector.

2. The vector quantizer as set forth in claim 1, wherein the distortion computation circuit for calculating the distortion between the input and the output vectors is of the pipeline system constituted by the cascaded connection of a parallel subtractor, a parallel magnitude operator, a register and a parallel adder, to enhance the speed of operation of the calculation of the distortion between the input and the output vectors.

3. A vector quantizer comprising:
a movement vector quantizer including:
an input vector register which stores picture input signal sequences to be coded and stores input vectors formed by blocking every K (K=a plural number) input picture signal sequences;
a variable-delay frame memory which stores the picture signal sequences of a one-frame cycle or more preceding frame; and
a rewritable dynamic output vector code table memory for properly extracting a plurality of adjacent blocks lying around a block located at the same position as that of the picture input signal sequences in the frame memory from the frame memory and reading the same sequentially as movement output vectors; and
said movement vector quantizer selecting a movement output vector having a minimum distortion from the input vector from a set of movement output vectors stored in the dynamic output vector code table memory, and sending an address corresponding to the movement output vector as a movement vector index to a multiplexer;
a coder comprising:
a subtractor which obtains the difference between the input vector and the selected movement output vector and gives a differential signal;
a differential input vector register which blocks every L (L=a plural number) output signal sequences of the subtractor and stores the same as differential input vectors;
a differential input vector code table memory which stores a differential output vector set produced previously by clustering using the differential input signal sequences;
a differential vector quantizer which selects a differential output vector having a minimum distortion from among a set of the differential output vectors, sends the selected differential output vector to an adder, and provides an address corresponding to the differential output vector as a differential vector index to said multiplexer;
said adder adding the movement output vector and the differential output vector, and sending a regenerated output signal to the frame memory; and
said multiplexer multiplying the code sequence of the movement vector index by the code sequence of the differential vector index to produce coded output signal sequences;
a demultiplexer which partitions the signal sequence transmitted by the encoder to obtain a code sequence of decoded movement vector index and a code sequence of the decoded differential vector index;

a variable-delay decoding frame memory for storing the picture output signal sequences of a frame preceding at least one-frame cycle;

a rewritable decoded dynamic output code table memory for reading a movement vector corresponding to the movement vector index transmitted thereto by the decoding frame memory;

a decoded differential output vector code table memory storing the same contents as those of the differential output vector code table of the coder; and a decoder which reads a differential output vector corresponding to the differential vector index transmitted thereto from the decoded differential output vector code table memory, and adds the same to the decoded movement output vector to decode and regenerate the picture output signal sequences;

whereby animated picture coding efficiency is enhanced.

4. A vector quantizer comprising:
a coder comprising:
a first frame memory for storing the picture signals of a frame preceding at least by one-frame cycle;

a dynamic vector quantizer which uses a dynamic output vector set consisting of input vectors formed by blocking every K (K=a plural number) picture signal sequences of a present frame and a plurality of blocks of picture signal sequences formed by displacing the input vectors by a predetermined picture element in the first frame memory and a fixed memory and a fixed mean value output vector set as a dynamic output vector set, and codes a dynamic output vector or a mean value output vector having a minimum distortion from the input vector in K-dimensional signal space into a first index;

a subtractor which subtracts the dynamic output vector or the mean value output vector having the minimum distortion from the input vector to obtain a differential input vector;

a differential vector quantizer which codes the differential input vector into a second index of a differential output vector having the minimum distortion among a differential output vector set obtained previously;

a first adder which adds the dynamic output vector or the mean value vector which has the minimum distortion and the differential output vector to regenerate the block of the picture signal sequence and transmits a signal to the first frame memory;

a variable-length encoder which processes the first index and the second index through variable-length encoding;

a decoder comprising:
a variable-length decoder which decodes the output of the variable-length encoder into the first index and the second index;

a dynamic output vector quantization decoder which receives the first index and transmits a regenerated dynamic output vector or a regenerated mean value corresponding directly to that of the coder among the dynamic output vector set or the mena value output vector set;

a differential vector quantization decoder which receives the second index and transmits a regenerated differential output vector corresponding directly to that of the coder among the differential output vector set;

a second adder which adds the regenerated dynamic output vector or the regenerated mean value vector and the differential output vector to obtain the block of regenerated picture signal sequences; and a second frame memory which delays the regenerated picture signal sequences given by the second adder by one-frame cycle and gives a plurality of blocks of the regenerated picture signal sequences displaced by a predetermined picture element to the dynamic vector quantization decoder as a dynamic output vector.

5. A vector quantizer according to claim 4, wherein said dynamic vector quantizer uses a set of a plurality of movement vectors produced by dynamic vector-quantizing actual picture signals between frames repeating clustering processes so that the total sum of the distortions between output vectors and the dynamic output vectors is minimized, as a plurality of two-dimensional displacement vectors which define the set of dynamic output vectors.

6. A vector quantizer comprising:
a frame memory for storing past picture signals of at least one frame;

a subtractor which calculates the difference between a block of predictive signals formed by blocking the picture signal sequences of one-frame cycle preceding frame read from the frame memory and a block of picture signal sequences formed by blocking every K (K=a plural number) present picture signal sequences to provide a predictive error signal block;

a limiter which receives the predictive error signal block given by the subtractor as an input vector, regards the input vector as a zero vector when the distortion of the input vector from the zero vector is smaller than a predetermined threshold and gives a zero vector detection signal;

an output vector code table memory which stores the respective output points of $2^n$ partitions of K-dimensional signal space including the input vector, formed in a binary tree structure of n steps (n=a positive integer) by repeating binary partitions, as a set of output vectors;

a parallel distortion calculating circuit which calculates the distortions between the input vector and two output vectors of each step of the binary tree structure;

a distortion comparator which compares distortions between the two output vectors and the input vector and selects the output vector which has smaller distortion from the input vector;

an index register which stores indices corresponding to addresses for reading the output vectors in steps according to the result of the comparison implemented by the distortion comparator and updates the index every time the distortion comparison result for each step is given;

a coding controller which receives the index for each step, controls the amount of data by controlling the number of steps, and processes the zero vector detection signal and the index through variable-length coding;

a second code table memory having the same contents as that of the output vector code table memory;

a decoder which receives the output of the coding controller processed through variable-length coding, decodes the zero vector detection signal and the index, reads an output vector from the second code table memory, and transmits the output vector or the zero vector as a regenerative predictive error signal block;

an adder which adds the regenerated predictive error signal block and the predictive signal block to calculate regenerated picture signals to be used as past picture signals after being delayed by one-frame cycle or more by the frame memory; and a transmission buffer which controls the number of steps by feedback control.

7. A vector quantizer comprising:

a front stage vector quantizer comprising:

a variable-delay frame memory which stores the picture signal sequence of a frame preceding by one-frame cycle or more;

a dynamic output vector code table consisting of an input vector register which stores input vector blocks formed by blocking every K (K=a plural number) picture input signal sequences to be coded; a rewritable first output vector code table which extracts properly a plurality of adjacent blocks lying around a block located at the same position in the frame memory as the position of the picture input signal sequences from the frame memory and reads the same sequentially as output vectors; and a fixed second output vector code table for sequentially reading output vectors from a plurality of mean value vectors of different levels;

said front stage vector quantizer selecting a first output vector having the minimum distortion from the input vector from a set of output vectors stored in the rewritable first output vector code table; selecting a second output vector having the minimum distortion from set of output vectors stored in the fixed second output vector code table when the distortion of the first output vector is greater than a predetermined upper threshold; selecting an output vector consisting of the picture elements of a central block among a plurality of blocks extracted from the frame memory when the distortion of the first output vector is smaller than a predetermined threshold; selecting the first output vector selected from the rewritable first output vector code table when the distortion of the first output vector is less than or equal to the upper threshold and greater than or equal to the lower threshold; and transmitting the selected output vector and the corresponding address as an output vector index;

a fixed back stage vector quantizer comprising:

a subtractor which calculates the difference between the input vector and the output vector selected under the condition defined by the thresholds and transmitted by the dynamic front stage vector quantizer and transmits an inter-frame differential signal;

a differential input vector register which stores the output signal sequences transmitted by the subtractor as a differential input vector after blocking every L (L=a plural number) output signal sequences of the subtractor, separating the intrablock mean value from the blocks and normalizing the blocks after separating the intrablock mean value by an amplitude gain; and a differential output vector code table storing differential output vectors produced previously using inter-frame differential signal sequences;

said fixed back stage vector quantizer selecting a differential output vector having the minimum distortion from the differential output vector code table to obtain the address of the selected differential output vector as a differential output vector index; deciding whether or not the inter-frame differential signal block to be coded is significant by comparing the mean value and the amplitude gain with a significance decision threshold; and transmitting the selected differential output vector, a significance identification label and, when significant, the mean value and the amplitude gain;

an adder which adds the output vector given by the dynamic front stage vector quantizer and the output vector given by the fixed back stage vector quantizer to give regenerated picture signals to the frame memory; and a variable-length encoder which processes the output vector index given by the dynamic front stage vector quantizer, the significance identification label given by the fixed back stage vector quantizer, the mean value, the amplitude gain and the differential output vector index together through variable-length coding.

* * * * *

UNITED STATES PATENT AND TRADEMARK OFFICE
CERTIFICATE OF CORRECTION

PATENT NO. : 4,670,851

DATED : June 2, 1987

INVENTOR(S) : Tokumichi Murakami et al.

It is certified that error appears in the above-identified patent and that said Letters Patent is hereby corrected as shown below:

Column 5, line 52, "block,diagram" should be --block diagram--.

Column 6, line 63, "quantitation" should be --quantization--.

Column 7, line 1, "diagraa:" should be --diagram--.

Column 8, line 14, delete the numeral "32", and insert -- = --.

Column 13, line 23, delete the letter "i".

Column 18, line 31, "e,uns/x/$\epsilon$" should be --$\underline{x}_\epsilon$--.

Column 20, line 26, "Y=[y$_1$, Y$_2$,..., y$_N$]" should be --Y=[$\underline{y}_1$, $\underline{y}_2$,..., $\underline{y}_N$]--.

Column 29, line 28, "$\epsilon$" should be --$\hat{\underline{\epsilon}}$--;

line 29, "differ ential" should be --differential--;

line 32, "$\underline{x}$" should be --$\hat{\underline{x}}$--.

UNITED STATES PATENT AND TRADEMARK OFFICE
CERTIFICATE OF CORRECTION

PATENT NO. : 4,670,851

DATED : June 2, 1987

INVENTOR(S) : Tokumichi Murakami et al.

It is certified that error appears in the above-identified patent and that said Letters Patent is hereby corrected as shown below:

Column 45, line 31, "$\hat{\underline{S}}_f = \underline{P}_f \underline{\epsilon}_f = \hat{\underline{S}}_f + \underline{Q}$" should be --$\hat{\underline{S}}_f = \underline{P}_f + \hat{\underline{\epsilon}}_f = \underline{S}_f + \underline{Q}$--.

Signed and Sealed this

Twenty-third Day of February, 1988

*Attest:*

DONALD J. QUIGG

*Attesting Officer*  *Commissioner of Patents and Trademarks*